US006290439B1

(12) United States Patent
Bludis et al.

(10) Patent No.: US 6,290,439 B1
(45) Date of Patent: Sep. 18, 2001

(54) METHOD AND APPARATUS FOR FORMING PARTS FROM A CONTINUOUS STOCK MATERIAL AND ASSOCIATED FORGE

(75) Inventors: Thomas Trevor Bludis, Reisterstown; Stephen R. Crosby, Whitehall; Timothy T. McKenzie, Baltimore, all of MD (US); Paul Andrew Stone, Glen Rock, PA (US); Jeffrey W. Tartamella, Charlotte, NC (US); Rickey James Thomas, Lineboro, MD (US); Richard Alan Adams, Fayetteville, NC (US)

(73) Assignee: Black & Decker, Inc., Newark, DE (US)

( * ) Notice: Subject to any disclaimer, the term of this patent is extended or adjusted under 35 U.S.C. 154(b) by 0 days.

(21) Appl. No.: 09/215,159

(22) Filed: Dec. 18, 1998

Related U.S. Application Data

(63) Continuation-in-part of application No. 09/143,630, filed on Aug. 28, 1998, now abandoned, which is a continuation of application No. 08/662,665, filed on Jun. 14, 1996, now Pat. No. 5,842,267, and a continuation-in-part of application No. 08/514,071, filed on Aug. 11, 1995, now Pat. No. 5,697,738, which is a continuation-in-part of application No. 08/366,986, filed on Dec. 30, 1994, now Pat. No. 5,700,113.

(51) Int. Cl.[7] ..................................................... B23B 51/02
(52) U.S. Cl. ........................... 408/224; 408/225; 408/227
(58) Field of Search .................................. 408/224, 225, 408/227, 228

(56) References Cited

U.S. PATENT DOCUMENTS

| 85,107 | 12/1868 | LeCount . |
| D. 240,263 | 6/1976 | Southall . |
| D. 278,065 | 3/1985 | Sydlowski et al. . |

(List continued on next page.)

FOREIGN PATENT DOCUMENTS

| 1097104 | 3/1981 | (CA) . |
| 2 636 182 | 2/1978 | (DE) . |
| 4 207 964 | 3/1992 | (DE) . |

(List continued on next page.)

OTHER PUBLICATIONS

PCT–International Search Report dated Oct. 29, 1997, No. PCT/US97/10384.

\* cited by examiner

*Primary Examiner*—Daniel W. Howell
(74) *Attorney, Agent, or Firm*—Alston & Bird LLP

(57) ABSTRACT

The present invention provides a method and apparatus for forming a plurality of parts, such as spade-type boring bits, from a continuous stock material. Thus, the various steps of the forming method of the present invention can be performed to predetermined portions of the continuous stock material prior to separating the continuous stock material into discrete parts, thereby enhancing the efficiency of the forming process. The present invention also provides an improved forge for forming portions of the continuous stock material into parts having a predetermined shape. The forge can be designed to provide a clearance region proximate the forward end of the ram to permit slight flexing of the forward end of the ram in a radially outward direction during forging operations. The forge can also include a lubrication system for lubricating its various components. In addition, the forge can incrementally rotate the ram after one or more parts have been forged. By repeating the incremental rotation of the ram, the forge will eventually rotate the ram a full 360°. An improved forging die is also provided which includes a back surface having a conical medial section and a pair of conical lateral sections that are recessed relative to the medial section such that forces will principally be applied to the medial section during forging operations.

10 Claims, 34 Drawing Sheets

U.S. PATENT DOCUMENTS

| | | |
|---|---|---|
| 606,319 | 6/1898 | Watrous . |
| 1,004,902 | 10/1911 | Potter . |
| 1,017,352 * | 2/1912 | Wagner ................................ 408/224 |
| 1,047,466 * | 12/1912 | Wagner ................................ 408/224 |
| 1,335,908 | 4/1920 | Mueller . |
| 1,418,485 | 6/1922 | Smith . |
| 1,483,082 | 2/1924 | Dosimont . |
| 1,595,588 | 8/1926 | Tuttle . |
| 1,625,131 | 4/1927 | Miller . |
| 1,738,032 | 12/1929 | Behrman et al. . |
| 2,063,753 | 12/1936 | Pohlman . |
| 2,091,128 | 8/1937 | Anderson . |
| 2,159,842 | 5/1939 | Cook . |
| 2,206,292 | 7/1940 | Rosenberg . |
| 2,225,345 | 12/1940 | Lamoreaux . |
| 2,310,675 | 2/1943 | Boyce . |
| 2,326,106 | 8/1943 | Van Ness et al. . |
| 2,332,295 | 10/1943 | Bouchal . |
| 2,335,791 | 11/1943 | Rea . |
| 2,360,080 | 10/1944 | Steinberg . |
| 2,403,651 | 7/1946 | Fulke . |
| 2,526,489 | 10/1950 | Liddicoat . |
| 2,543,206 * | 2/1951 | Smith ................................ 408/224 |
| 2,627,292 | 2/1953 | Kronwall . |
| 2,645,138 | 7/1953 | Mitchart . |
| 2,659,406 | 11/1953 | Locke . |
| 2,681,673 | 6/1954 | Mackey . |
| 2,692,627 | 10/1954 | Stearns . |
| 2,697,951 | 12/1954 | Müller . |
| 2,748,460 | 6/1956 | Ulrich . |
| 2,765,760 | 10/1956 | Lyon . |
| 2,782,824 | 2/1957 | Robinson . |
| 2,794,468 | 6/1957 | Huxtable . |
| 2,883,888 | 4/1959 | Stewart . |
| 2,905,031 | 9/1959 | Appel et al. . |
| 2,962,066 | 11/1960 | Deliso . |
| 2,978,932 | 4/1961 | Frueauff, Jr. . |
| 3,045,515 | 7/1962 | Kralowetz . |
| 3,154,978 | 11/1964 | Baker . |
| 3,292,412 | 12/1966 | Costabile . |
| 3,354,690 | 11/1967 | Beckwell . |
| 3,381,515 | 5/1968 | Orloff . |
| 3,504,575 | 4/1970 | Makino et al. . |
| 3,603,130 | 9/1971 | Ruget . |
| 3,613,432 | 10/1971 | Schenk et al. . |
| 3,802,244 | 4/1974 | Jackman . |
| 3,805,580 | 4/1974 | Leiker . |
| 3,824,026 | 7/1974 | Gaskins . |
| 3,850,494 | 11/1974 | Nebendorf . |
| 3,920,350 | 11/1975 | Southall . |
| 3,972,585 | 8/1976 | Dalgleish et al. . |
| 3,997,279 | 12/1976 | Porter . |
| 4,004,446 | 1/1977 | Dalgleish et al. . |
| 4,012,970 | 3/1977 | Hintz et al. . |
| 4,050,841 | 9/1977 | Hildebrandt . |
| 4,107,964 | 8/1978 | Smith . |
| 4,252,011 | 2/1981 | MacNitt, Jr. et al. . |
| 4,265,105 | 5/1981 | MacNitt, Jr. et al. . |
| 4,286,904 | 9/1981 | Porter et al. . |
| 4,306,442 | 12/1981 | Schröck . |
| 4,312,211 | 1/1982 | MacNitt, Jr. et al. . |
| 4,339,940 | 7/1982 | MacKay et al. . |
| 4,530,229 | 7/1985 | Walker . |
| 4,531,396 | 7/1985 | MacNitt, Jr. et al. . |
| 4,578,982 | 4/1986 | Schröck . |
| 4,620,822 | 11/1986 | Haque et al. . |
| 4,625,593 | 12/1986 | Schmotzer . |
| 4,682,917 | 7/1987 | Williams, III et al. . |
| 4,722,216 | 2/1988 | Fencl . |
| 4,753,558 | 6/1988 | Jansson . |
| 4,774,828 | 10/1988 | Schröck . |
| 4,796,456 | 1/1989 | Schmoll et al. . |
| 4,836,006 | 6/1989 | Brown . |
| 4,838,062 | 6/1989 | Prenn . |
| 4,942,756 | 7/1990 | Charzewski . |
| 4,950,111 | 8/1990 | Thomas . |
| 4,984,445 | 1/1991 | Ohuchi et al. . |
| 4,996,863 | 3/1991 | Keeler . |
| 5,010,759 | 4/1991 | Yokomizo et al. . |
| 5,056,967 | 10/1991 | Hageman . |
| 5,061,127 | 10/1991 | Thomas . |
| 5,092,152 | 3/1992 | Miller et al. . |
| 5,099,933 | 3/1992 | Schimke et al. . |
| 5,145,018 | 9/1992 | Schimke et al. . |
| 5,149,234 | 9/1992 | Durfee, Jr. . |
| 5,184,689 | 2/1993 | Sheirer et al. . |
| 5,193,951 | 3/1993 | Shimke . |
| 5,221,166 | 6/1993 | Bothum . |
| 5,286,143 | 2/1994 | Schimke . |
| 5,291,806 | 3/1994 | Bothum . |
| 5,299,441 | 4/1994 | Shinjo . |
| 5,323,697 | 6/1994 | Schröck . |
| 5,335,530 | 8/1994 | Homm . |
| 5,433,561 | 7/1995 | Schimke . |
| 5,452,970 | 9/1995 | Sundstrom et al. . |
| 5,697,738 | 12/1997 | Stone et al. . |
| 5,700,113 | 12/1997 | Stone et al. . |
| 5,842,267 * | 12/1998 | Biederman et al. ................. 408/228 |

FOREIGN PATENT DOCUMENTS

| | | |
|---|---|---|
| 118 806 | 9/1984 | (EP) . |
| 1 277 117 | 7/1972 | (GB) . |
| 2 130 935 | 6/1984 | (GB) . |
| 2 271 948 | 5/1994 | (GB) . |
| 56-74343 | 6/1981 | (JP) . |
| 57-59602 | 4/1982 | (JP) . |
| 61-85405 | 6/1986 | (JP) . |
| 63-52730 | 3/1988 | (JP) . |
| 547268 | 4/1977 | (RU) . |

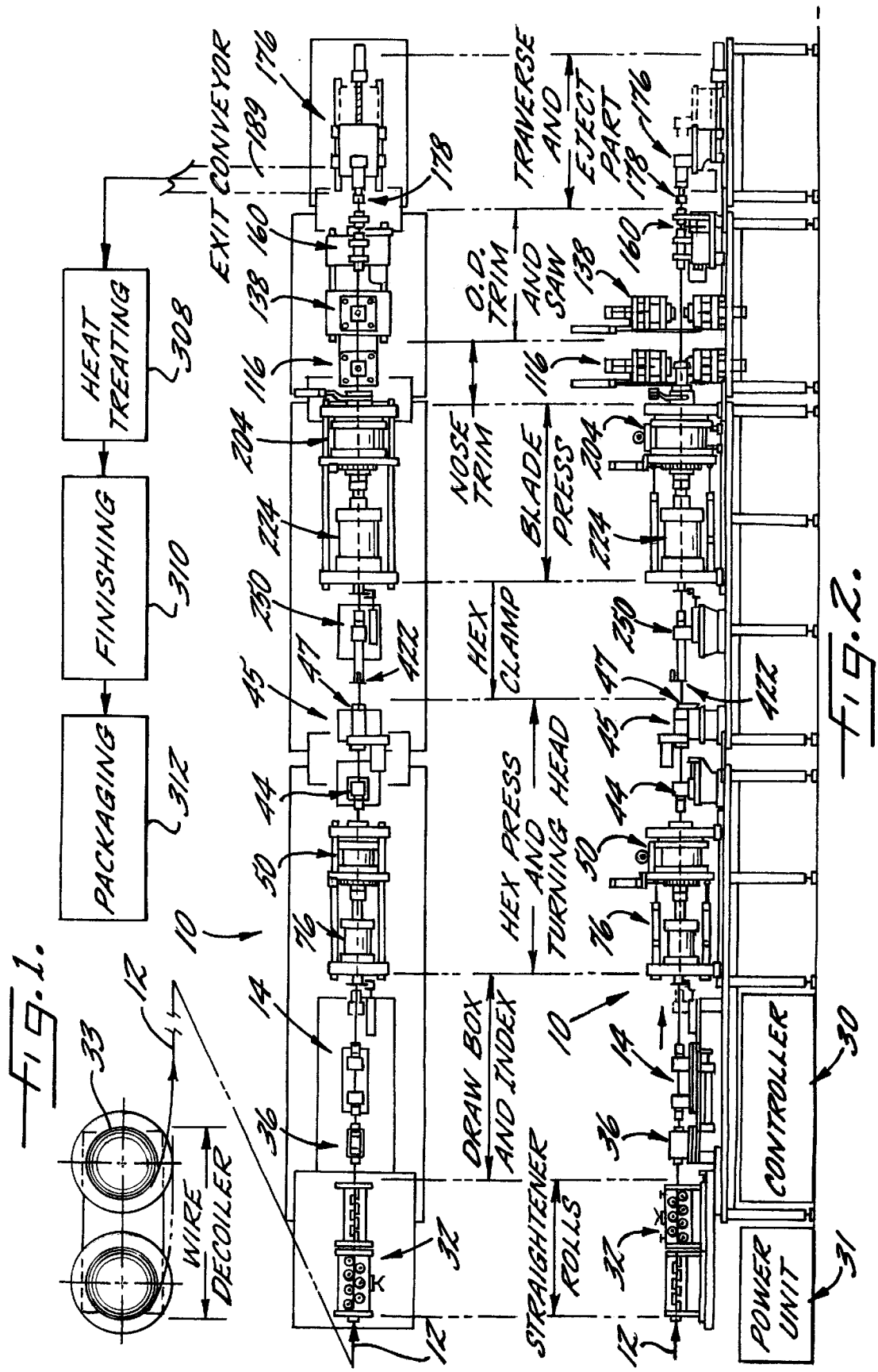

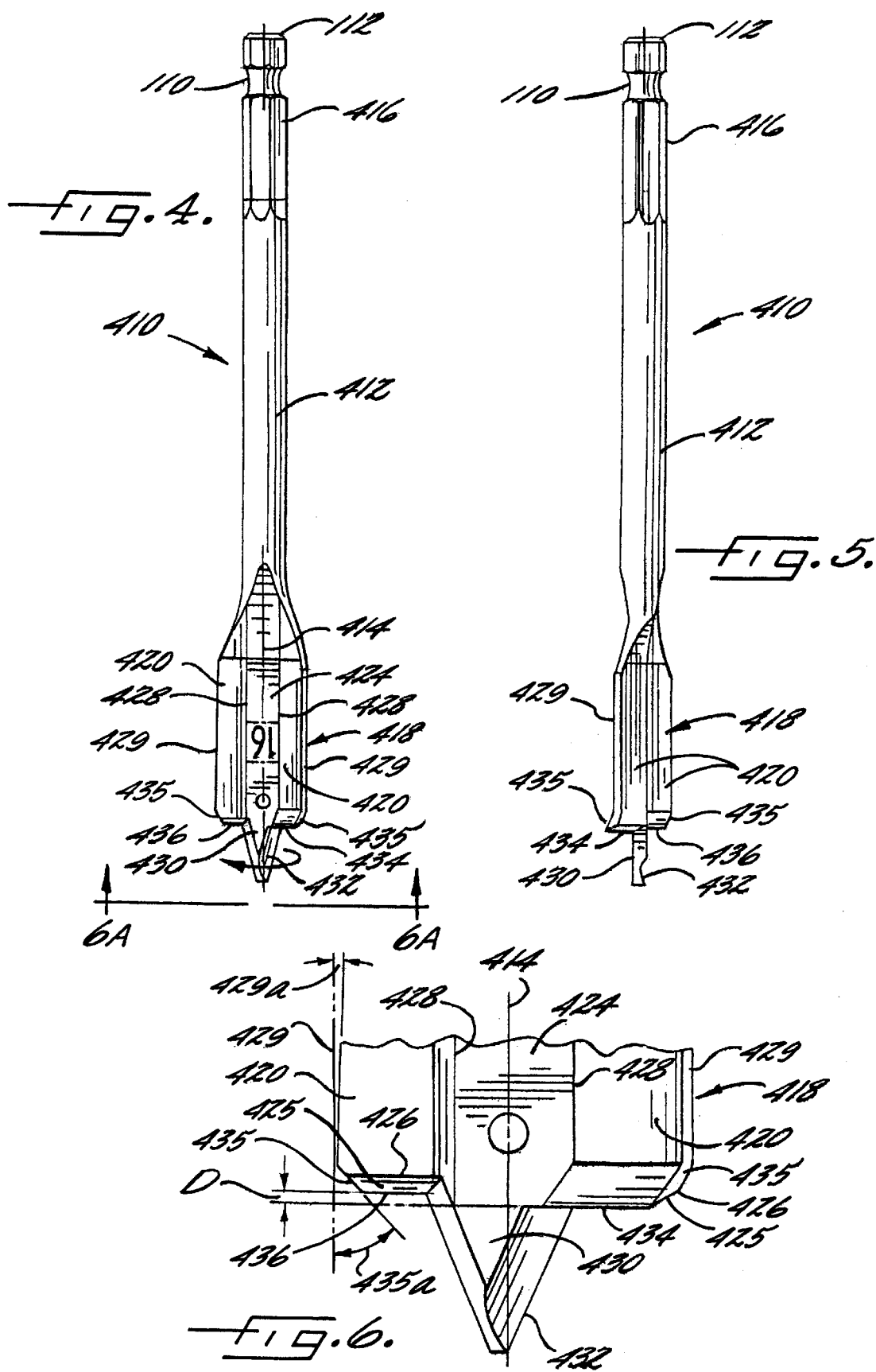

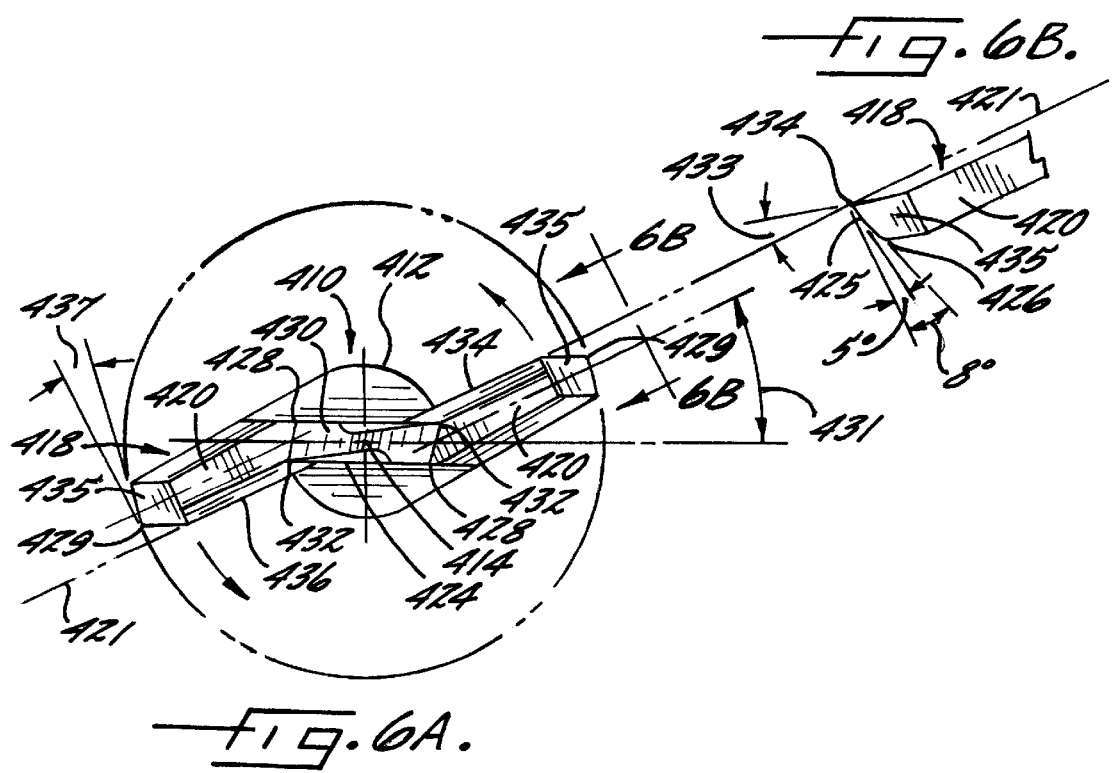

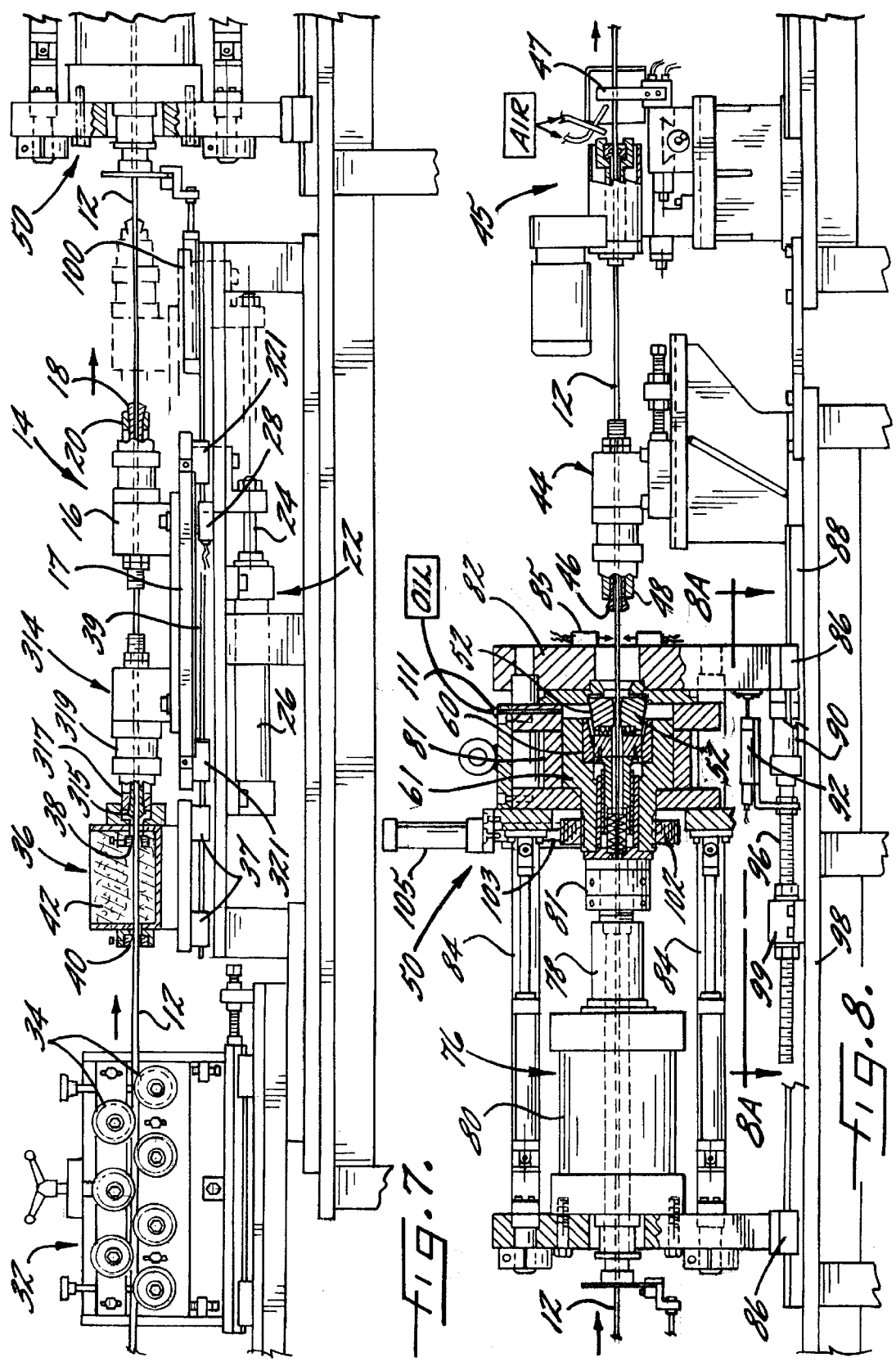

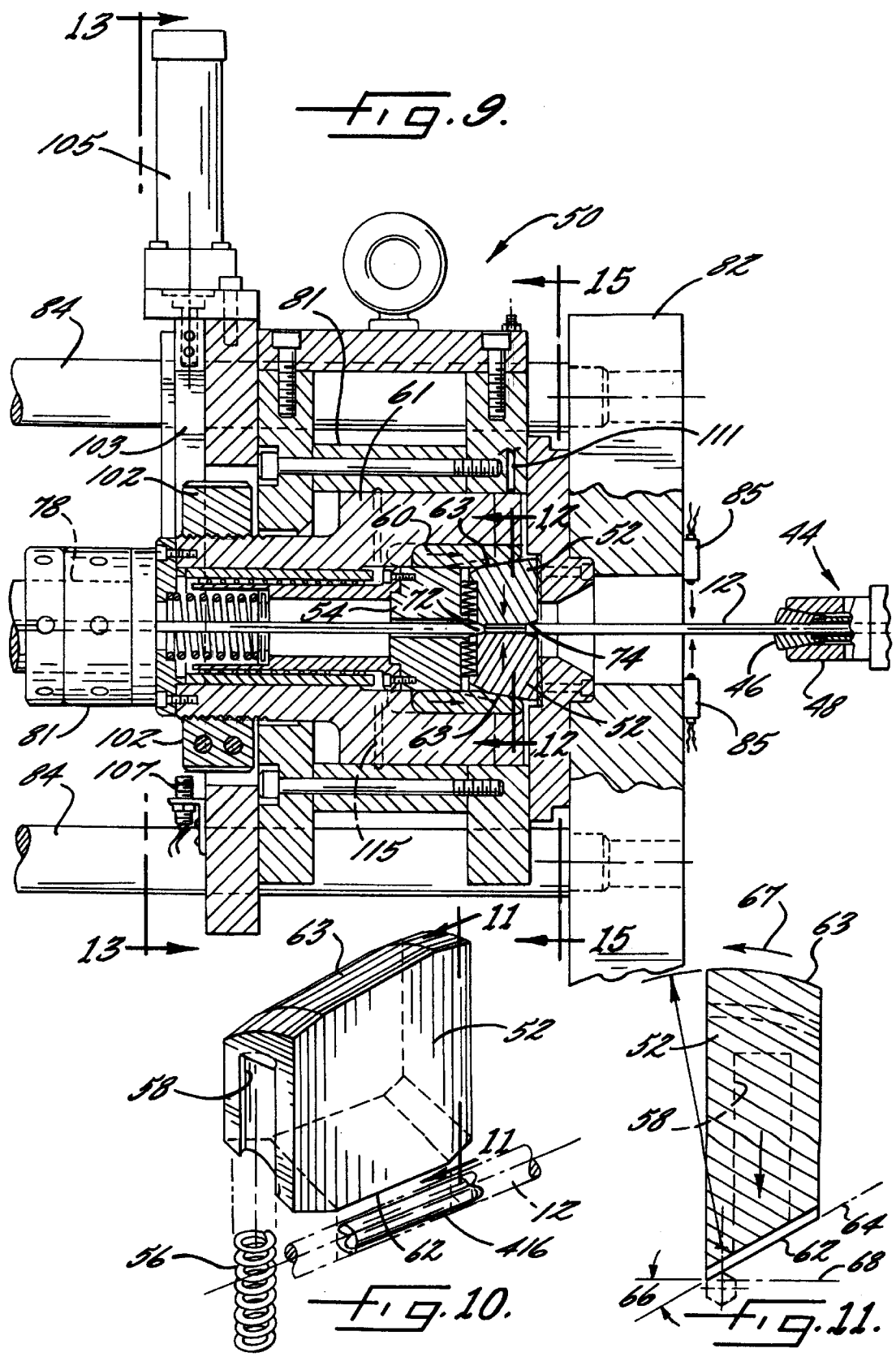

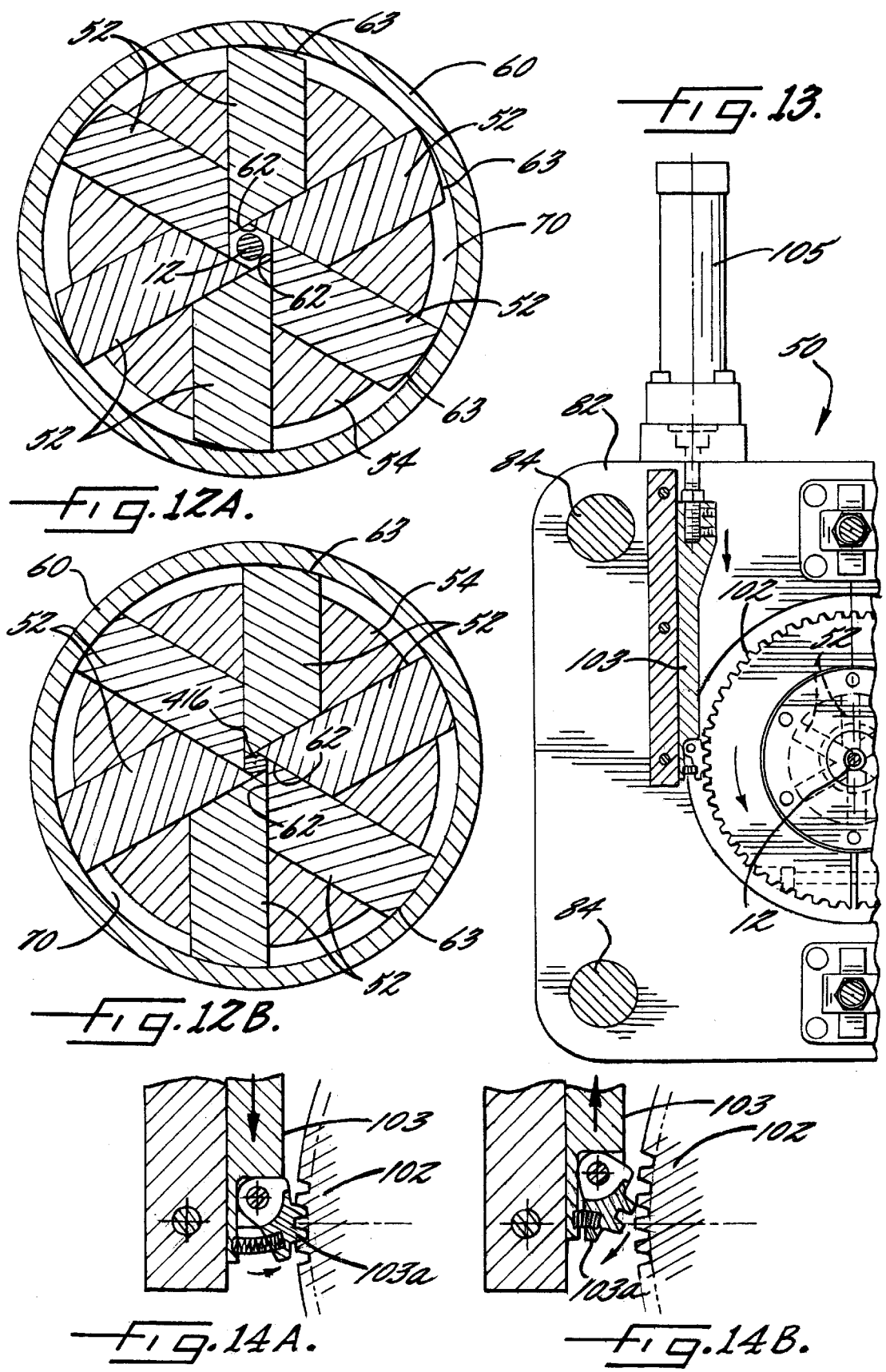

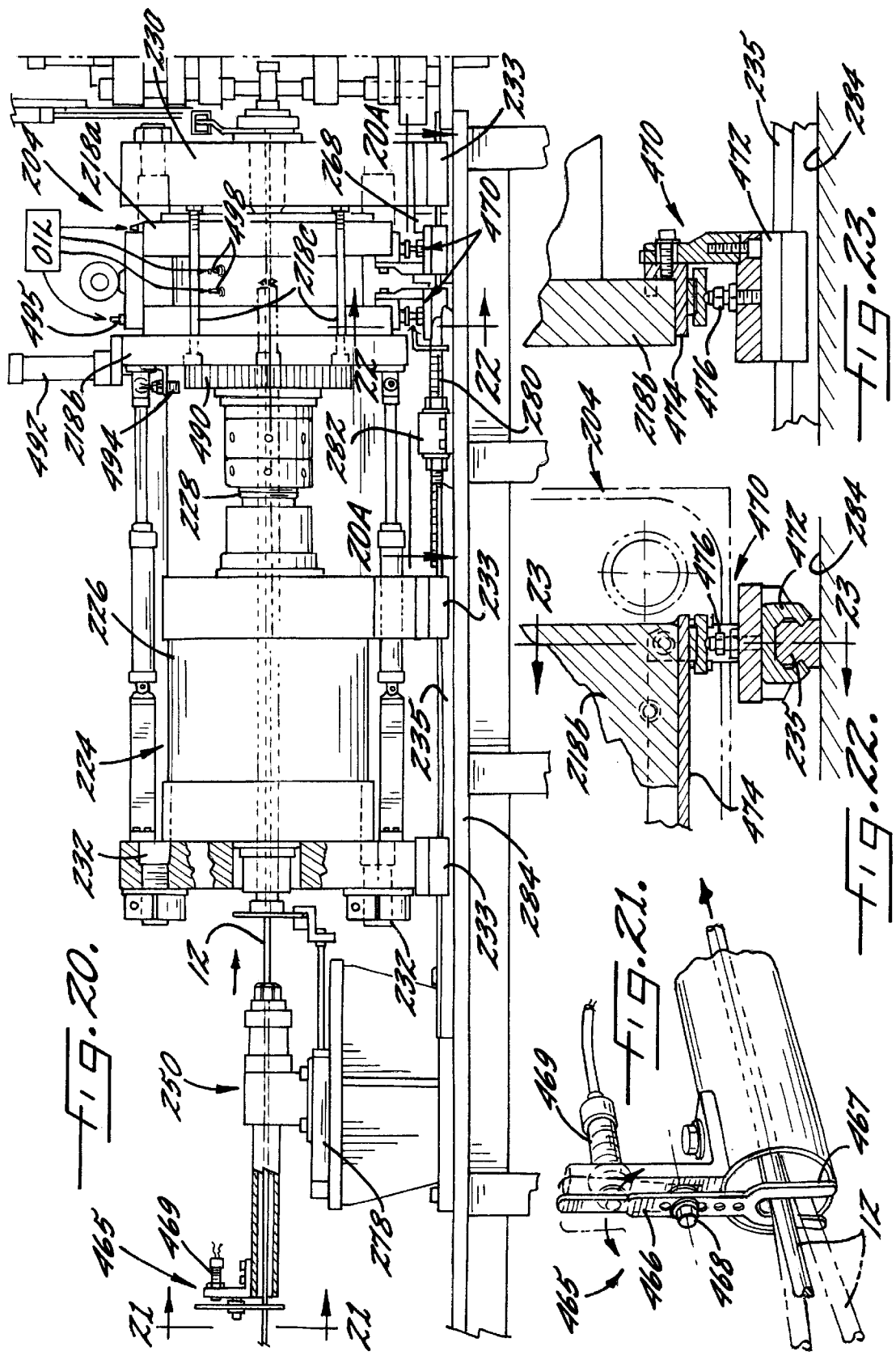

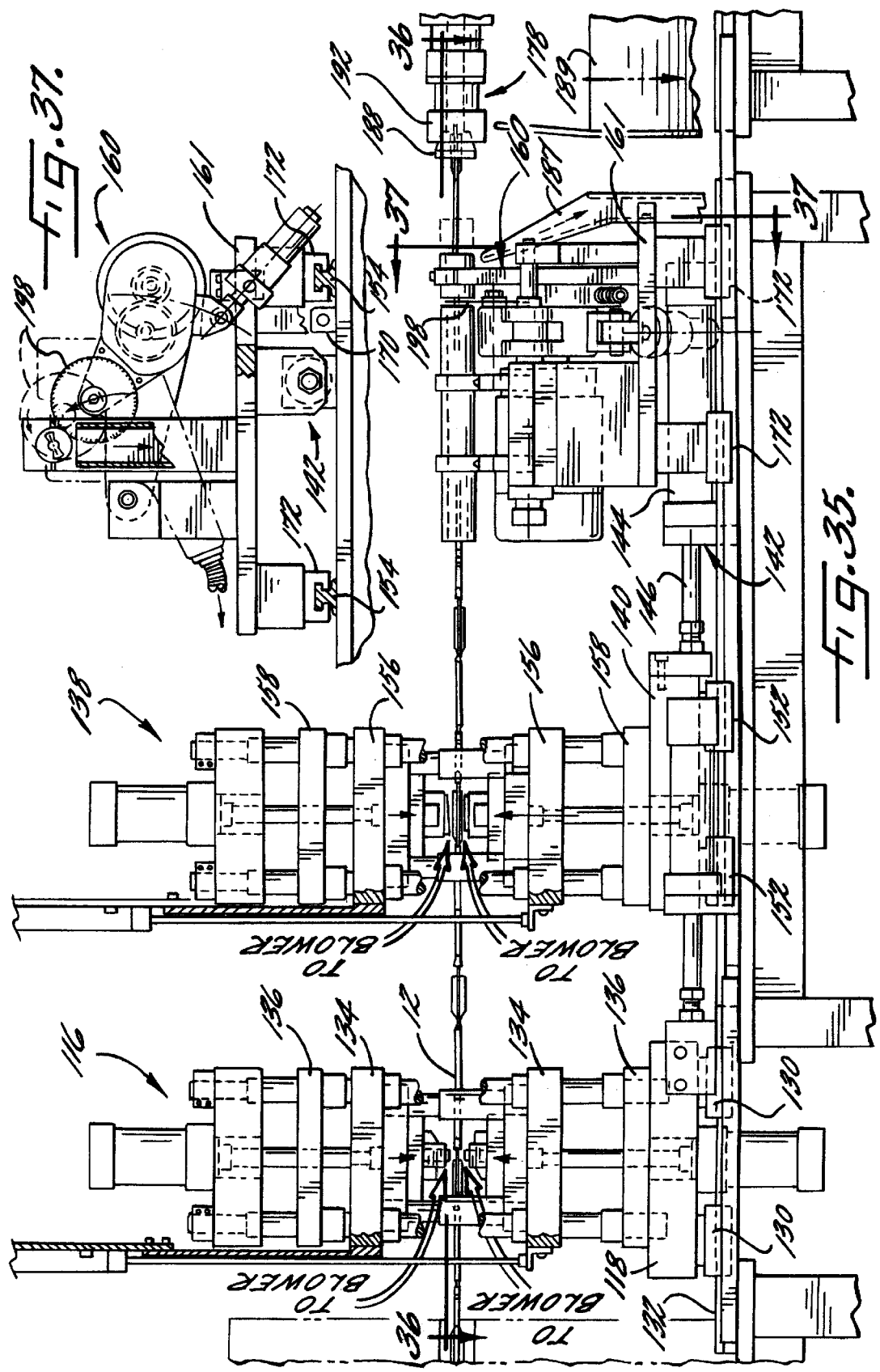

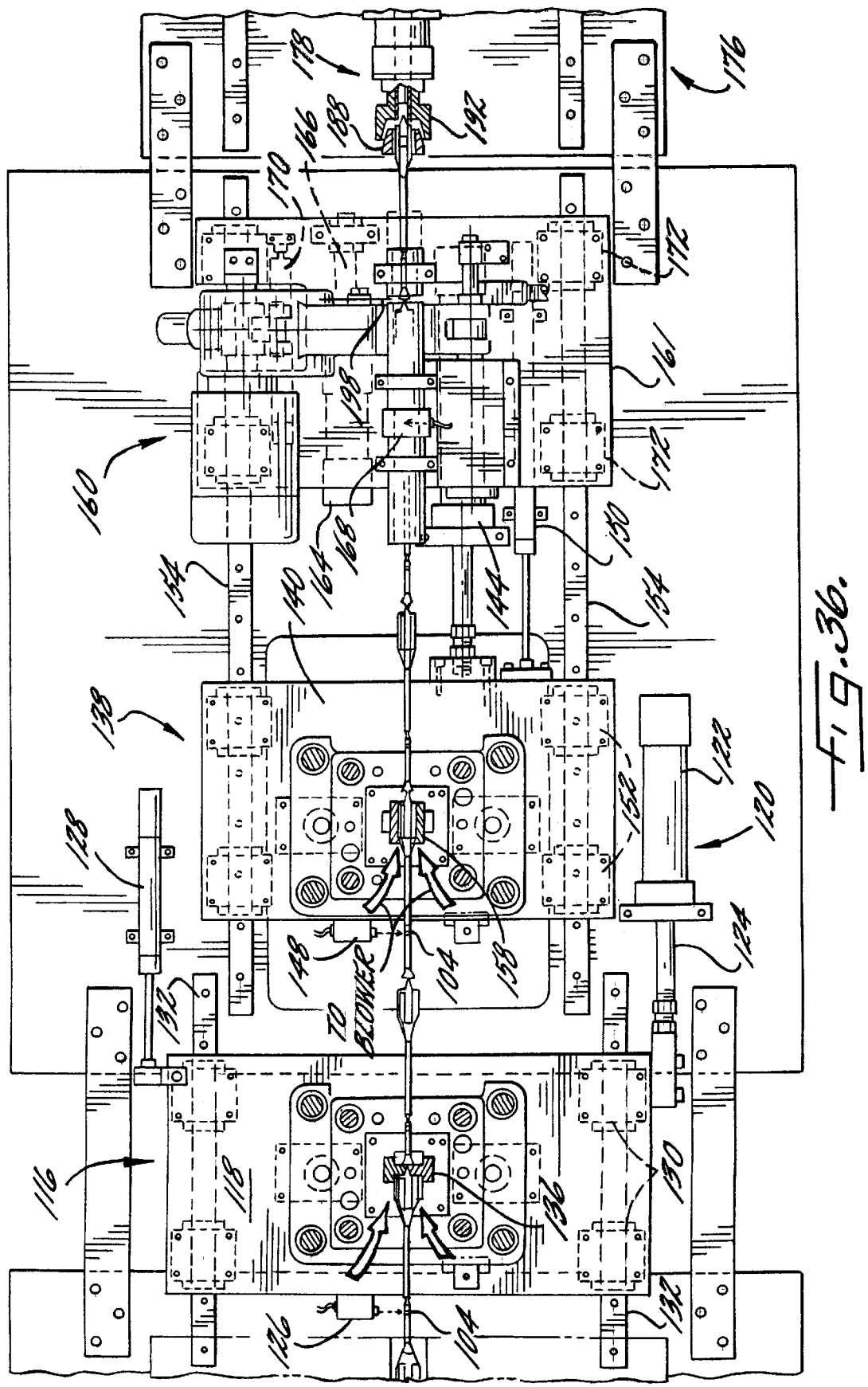

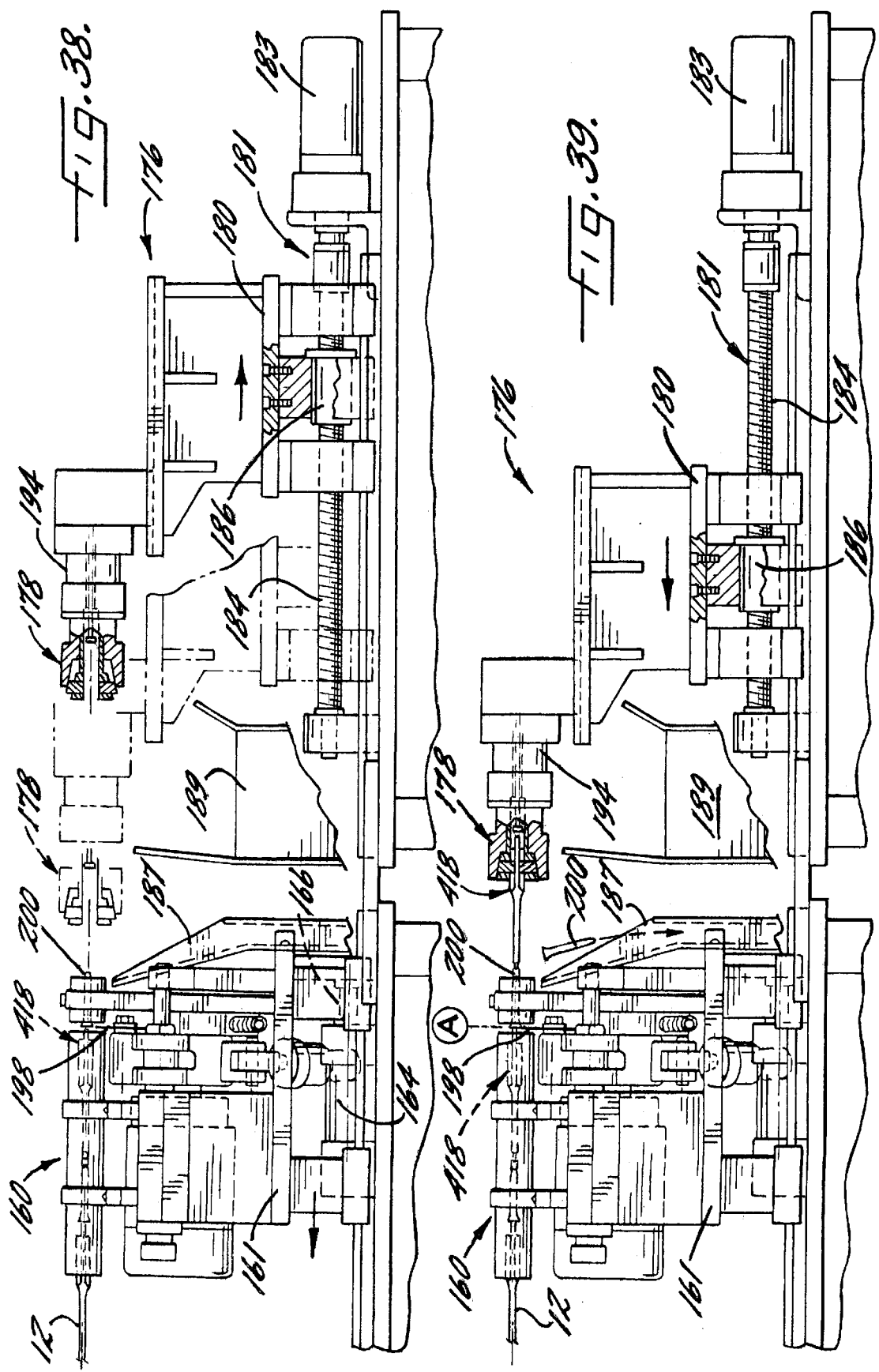

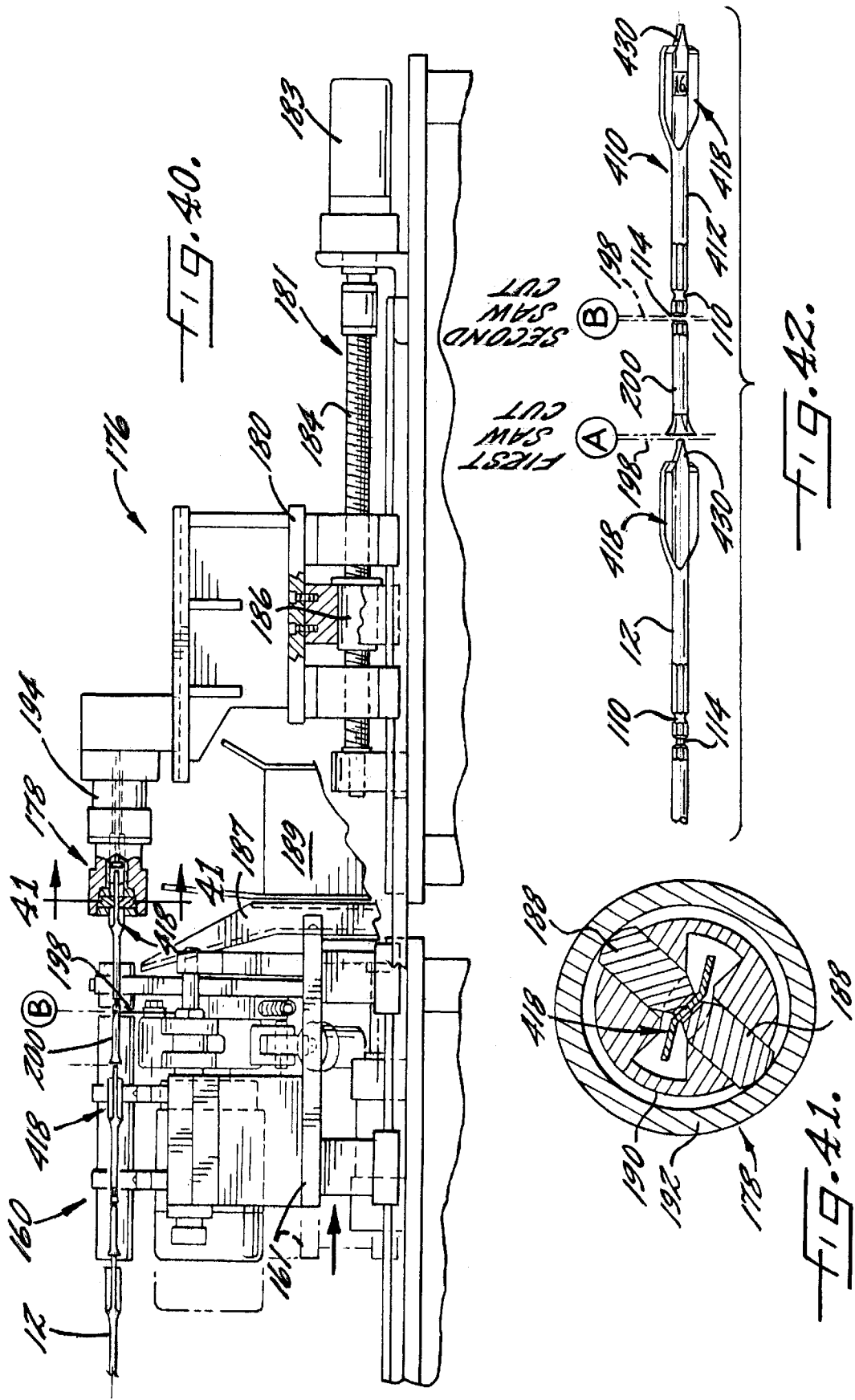

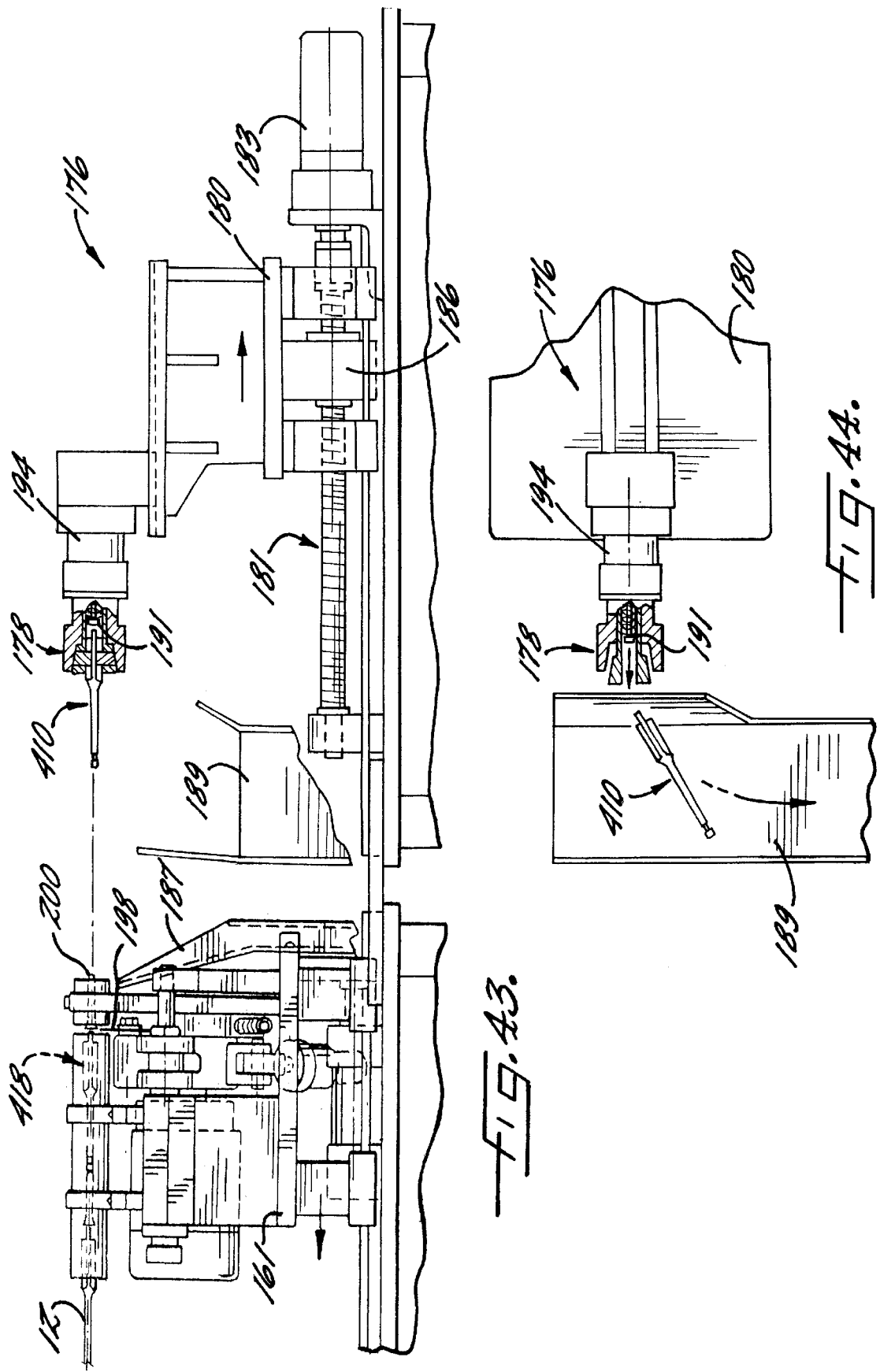

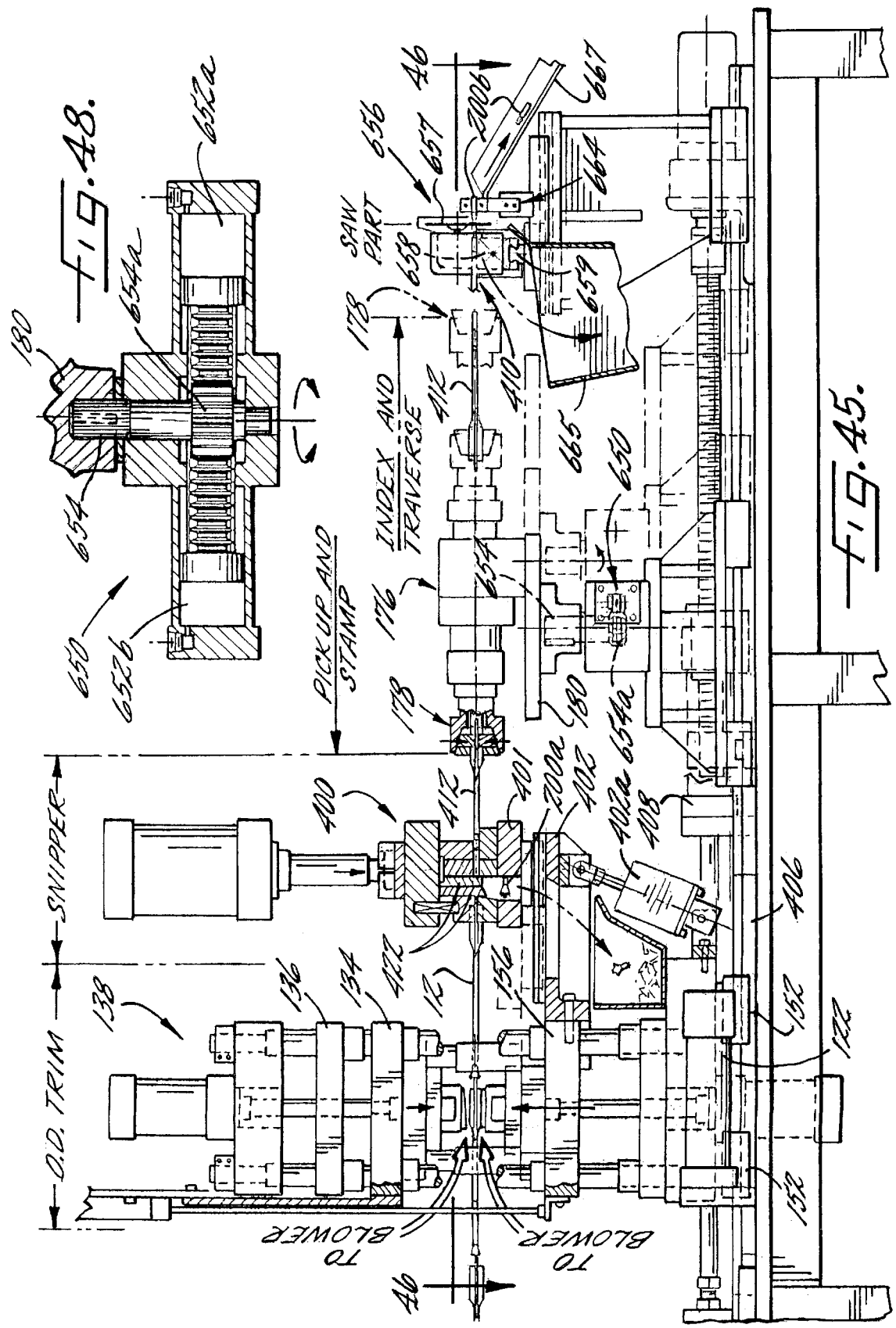

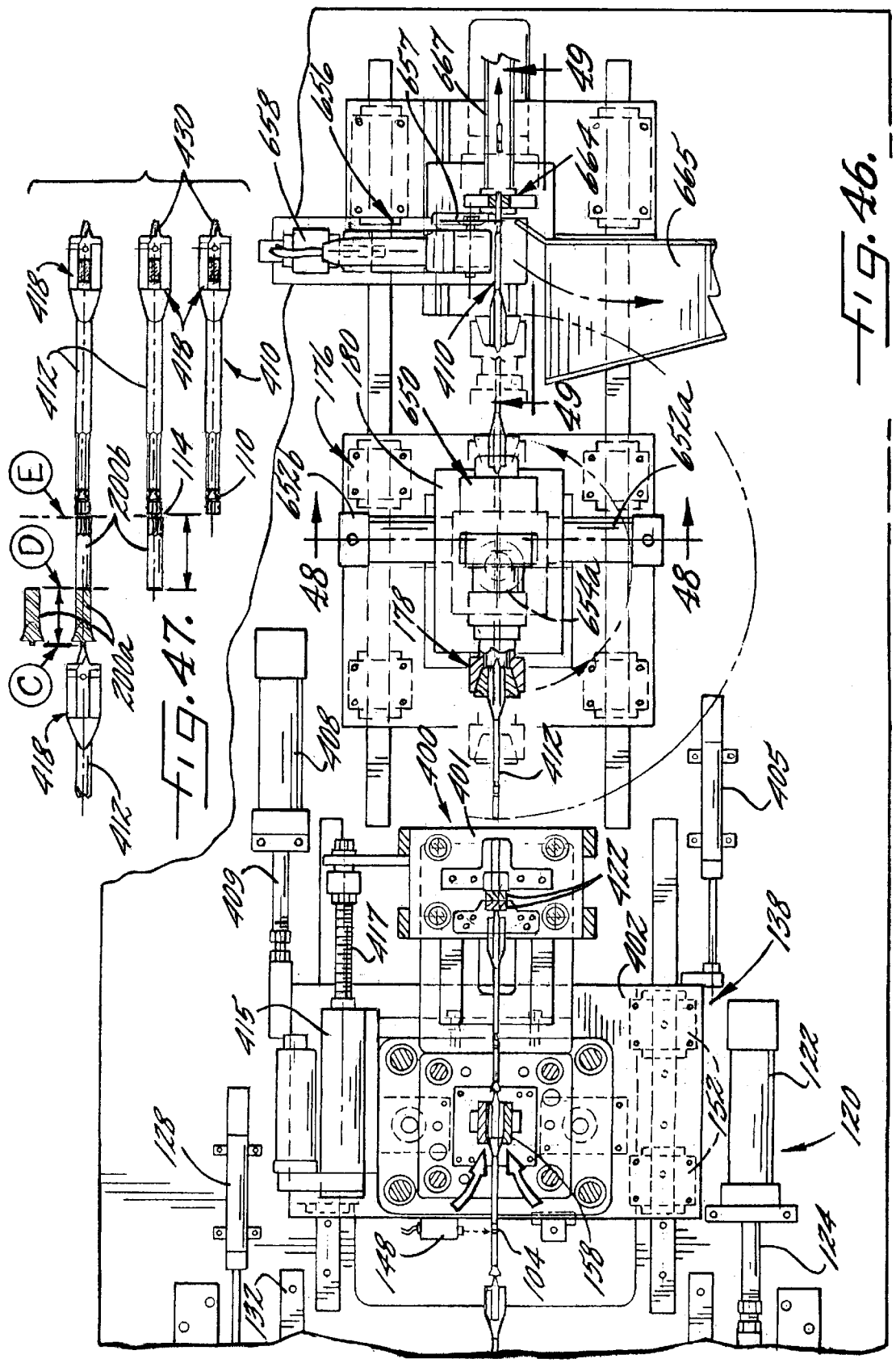

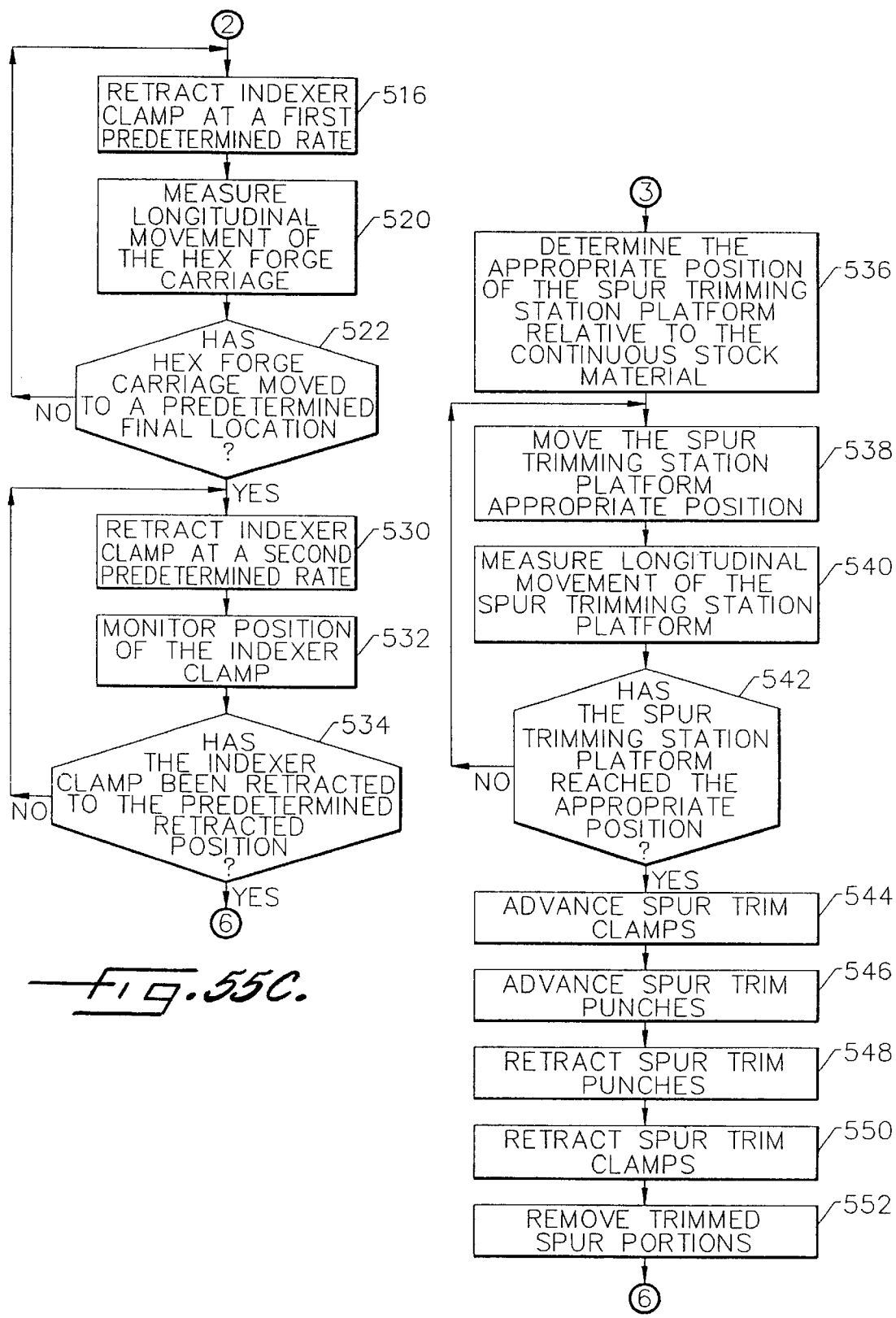

METHOD AND APPARATUS FOR FORMING PARTS FROM A CONTINUOUS STOCK MATERIAL AND ASSOCIATED FORGE

RELATED APPLICATIONS

This application is a continuation-in-part of U.S. patent application Ser. No. 09/143,630, filed Aug. 28, 1998 now abandoned, which is a continuation of U.S. patent application Ser. No. 08/662,665, filed Jun. 14, 1996 and now issued as U.S. Pat. No. 5,842,267 which is a continuation-in-part of U.S. patent application Ser. No. 08/366,986, filed Dec. 30, 1994 and now issued as U.S. Pat. No. 5,700,113 and U.S. patent application Ser. No. 08/514,071, filed Aug. 11, 1995 and now issued as U.S. Pat. No. 5,697,738, the contents of each being expressly incorporated in their entirety herein.

FIELD OF THE INVENTION

The present invention relates generally to methods and apparatus for forming parts of a predetermined shape, such as drill bits and, more particularly, spade-type boring bits, from a continuous stock material. The present invention also relates generally to improved forges for forming parts of a predetermined shape, such as drill bits and, more particularly, spade-type boring bits.

BACKGROUND OF THE INVENTION

Each day, a myriad of metal and plastic parts of a variety of predetermined shapes are manufactured, such as by a forging process in which a permanent change in the shape of the part occurs. These parts are oftentimes manufactured in large quantities and are used in many different applications. For example, a number of tools, such as drill bits, screwdriver bits, router bits, percussion bits and jigsaw and reciprocating saw blades, are produced in mass quantities every day. Likewise, a number of other parts, such as fasteners, impact wrench anvils, coil and ballpoint chisels, gears, shafts, equalizer beams and actuator rods, are also manufactured in large quantities every day.

Accordingly, a number of manufacturing processes have been developed to form parts of a predetermined shape in large numbers. These manufacturing processes generally include a number of independent operations or steps which are performed in a predetermined sequence in order to create parts of the desired shape. For example, typical processes for manufacturing metal parts generally include forging operations, trimming operations, heat-treating operations and grinding and other finishing operations.

These manufacturing processes are typically designed to form a number of discrete workpieces into respective parts of a predetermined shape. Thus, these conventional manufacturing processes generally include an initial step of providing a number of discrete workpieces of the desired size and length. For example, a metal wire or rod can be cut into a number of discrete pieces prior to beginning the actual manufacturing process. Thereafter, the plurality of discrete workpieces are individually processed in order to create a plurality of parts of the predetermined shape.

As a result, each discrete part must generally be collected following every operation of these conventional manufacturing processes such that the part can be transported to the next stage or operation of the manufacturing process. In addition, since the parts must generally be aligned in a predetermined manner during each operation of these manufacturing processes, each part must generally be individually oriented prior to each next stage of the manufacturing process. Thus, even though parts are generally collected and transported between stages of these manufacturing processes in batches, these conventional manufacturing processes still generally require extensive handling of the parts in order to collect, transport and properly orient the parts between each stage of these manufacturing processes. These conventional manufacturing processes also typically require a relatively large number of parts to be in process at all times due to the batch-type processing. As will be apparent, the time and labor required to collect, transport and properly orient parts during these conventional manufacturing processes decreases the efficiency with which these parts are fabricated and, correspondingly, increases the cost of the resulting parts.

The inefficiencies created by handling and processing a plurality of discrete parts and the increased costs of maintaining a relatively large number of partially formed parts in process are particularly significant for those manufacturing processes which are designed to produce a large number of parts each day, such as tens of thousands, if not hundreds of thousands, of parts each day. For example, conventional manufacturing processes which produce metallic parts, such as drill bits, router bits, fasteners, percussion bits, jig saw and reciprocating saw blades, impact wrench anvils, coil and ballpoint chisels, gears, shafts, screwdriver bits, equalizer beams and actuator rods, generally produce parts at rates up to thousands or more per day.

In order to demonstrate the inherent inefficiencies of these conventional manufacturing processes which individually process a large number of discrete parts, the manufacturing process employed to form spade-type boring bits (hereinafter referred to as "spade-bits") is described hereinafter. Spade bits are typically formed by a hot forging process. According to this process, a coil of wire stock of a given diameter is cut into pieces, each of which is approximately the length of an individual spade bit. Each piece is then headed to form a portion of material with an increased diameter at the first end of the segment, i.e., a bulb of material having an increased diameter over a shorter length at the first end. Either during this initial heated process or following further heating of the bulb of material, the part is forged by compressing the heated bulb of material between a pair of opposed dies. Typically, the pair of opposed dies are closed in a rectilinear manner such that the heated bulb of material is subjected to compressive forces which displace the material into the predetermined fixed boundary shape defined by the dies. The forged part can then be trimmed and finished to produce spade bits such as those described above. An identification mark can also be stamped on the spade bit during its processing.

By initially cutting the wire stock and/or billets into a number of discrete pieces, however, the parts must be individually handled and processed throughout the hot forging process, thereby decreasing the efficiency with which the spade bits are fabricated and, correspondingly, increasing the resulting costs of the spade bits. For example, each individual part must be collected following each stage of the fabrication process and transported to the next stage. In addition, each individual part must be appropriately aligned during each step of the process to ensure that the input shape of the part serves as a proper and admissible preform to satisfy the requirement of each subsequent die operation, including die fill, such that the resulting spade bits meet the desired product tolerances.

SUMMARY OF THE INVENTION

A method and apparatus is therefore provided according to the present invention for forming a plurality of parts, such as spade bits, from a continuous stock material. Thus, the various steps of the forming method of the present invention can be performed to predetermined portions of the continuous stock material, prior to separating the continuous stock material into a number of discrete parts. The efficiency of the forming process is thereby enhanced since individual parts need not be transported and oriented numerous times during the forming operations. By not requiring that the individual parts be handled during the forming operations, the quality and tolerance control of the parts formed by the forming method and apparatus of the present invention will also be enhanced since such handling of individual parts generally increases the opportunities for misalignment and contributes to poor tolerance control during the manufacturing process. In addition, the forming method and apparatus of the present invention effectively reduces the number of parts in process at any one time during the manufacturing process by limiting the number of batch operations required in comparison to conventional fabrication processes.

According to the forming method and apparatus of the present invention, a plurality of indexers are synchronized to incrementally advance the continuous stock material along a predetermined path such that the stock material advances longitudinally in a downstream direction. Following each intermittent advance of the continuous stock material, a portion of the continuous stock material is formed, such as with a forge, into a first predetermined shape.

According to this embodiment of the present invention, the plurality of indexers include an upstream indexer for intermittently pushing the continuous stock material in the downstream direction from a location spaced in an upstream direction from the forge. Additionally, the plurality of indexers include a downstream indexer for intermittently pulling the continuous stock material in a downstream direction from a location spaced in the downstream direction from the forge. By synchronizing the intermittent pushing and pulling, the continuous stock material is advanced longitudinally in the downstream direction along the predetermined path. By synchronously pushing and pulling the continuous stock materials from locations that are upstream and downstream of the forge, respectively, the forming method and apparatus of the present invention advances the continuous stock material more smoothly in the downstream direction and significantly reduces the possibility that the continuous stock material will kink or bend relative to conventional forming processes which utilize a single upstream indexer.

Preferably, the upstream indexer intermittently pushes continuous stock material by a predetermined distance in the downstream direction and the downstream indexer intermittently pulls the continuous stock material by the same predetermined distance in the downstream direction. As such, the continuous stock material can be intermittently advanced by the predetermined distance each time that the continuous stock material is pushed and pulled by the respective indexers. Additionally, the upstream and downstream indexers are preferably synchronized such that the upstream and downstream indexers concurrently pull and push the continuous stock material in a downstream direction, respectively.

The forming method and apparatus generally includes a clamp for securely gripping and holding a fixed portion of the continuous stock material while another portion of the continuous stock material is formed into the first predetermined shape. According to the present invention, the clamp and, more particularly, the fixed portion of the continuous stock material held by the clamp is disposed in a predetermined longitudinal direction relative to the formed portion of the continuous stock material which is shaped into the first predetermined shape.

As a result of processing a continuous stock material, the continuous stock material grows in both longitudinal directions during the forming operations. According to the present invention, however, the longitudinal growth of the continuous stock material created during the forming operation is at least partially compensated for by allowing movement of the continuous stock material in a longitudinal direction opposite the predetermined longitudinal direction established by the relative positions of the fixed portion of the continuous stock material and the formed portion of the continuous stock material. By compensating for the longitudinal growth of the continuous stock material, the forming method and apparatus of the present invention can form the continuous stock material into a plurality of parts prior to separating the stock material into the plurality of discrete parts, thereby increasing the manufacturing efficiency of the parts.

The forming apparatus of the present invention also preferably includes a longitudinal growth monitor for monitoring the longitudinal growth of the continuous stock material during forming operations. The forming apparatus also advantageously includes a controller, responsive to the longitudinal growth monitor, for terminating forming operations once the longitudinal growth of the continuous stock material is at least as great as a predetermined growth threshold. Accordingly, the forming method and apparatus of the present invention can readily manufacture parts of a predetermined shape and size in a precisely controlled fashion.

According to one embodiment, the forge includes a die assembly including a plurality of dies disposed about the continuous stock material and means for at least partially closing the plurality of dies about the stock material. Once closed, the plurality of dies define a cavity of a predetermined shape which, in turn, defines the shape of at least a portion of the resulting part. According to the present invention, the plurality of at least partially closed dies also define entry and exit ports through which the continuous stock material extends.

The means for at least partially closing the plurality of dies about the continuous stock material preferably includes a ram having a die housing which defines a die cavity opening through the forward end of the ram and adapted to receive and circumferentially encompass the plurality of dies, thereby structurally reinforcing the forging dies during the forging process. Thus, by at least partially inserting the plurality of dies within the die cavity defined by the ram, the plurality of dies can be at least partially closed about the continuous stock material.

The forge also generally includes a head which defines a passageway extending lengthwise through at least a portion of the head and defining a lengthwise extending axis. As such, the ram can be alternately advanced and retracted within the passageway defined by the head during forging operations. During the lengthwise advancement of the ram, the die assembly will be further inserted into the die cavity and the forging dies will be correspondingly forced radially inward in order to forge the part of the predetermined shape. Similarly, during the retraction of the ram following completion of the forging operations, the die assembly will be at least partially removed or withdrawn from the die cavity such that the forging dies can move radially outwardly away from the continuous stock material.

The forge of the present invention also preferably includes a carriage on which the head, the ram and the plurality of dies are mounted. The carriage is mounted to move in a longitudinal direction relative to the continuous stock material. As a result, the carriage can move in a longitudinal direction opposite the predetermined longitudinal direction established by the relative positions of the fixed portion of the continuous stock material and the formed portion of the continuous stock material in order to further compensate for the longitudinal growth of the continuous stock material created during the forming operations. In particular, the carriage is adapted to move to compensate for the longitudinal growth of that portion of the continuous stock material between the formed portion of the continuous stock material and the fixed portion of the continuous stock material. As a result of this longitudinal movement of the carriage, the plurality of dies remain at least partially closed about the same portion of the stock material during the entire forming step.

According to one advantageous embodiment, the forge also includes biasing means for longitudinally biasing the carriage with a predetermined longitudinal bias force so as to retard the longitudinal movement of the carriage. According to one aspect of the present invention, the longitudinal bias force applied by the biasing means can be altered according to a predetermined schedule. For example, the biasing means can increase the longitudinal bias force over time to encourage lateral expansion of the workpiece within the cavity defined by the plurality of dies such that the entire cavity is filled.

While the clamp continues to hold the fixed portion of the continuous stock material, the forming method and apparatus of the present invention can form another portion of the continuous stock material into a second predetermined shape, such as with a second forge. Once both portions of the continuous stock material have been formed, the clamp can release the fixed portion of the continuous stock material such that the continuous stock material can be further advanced along the predetermined path. Thereafter, the steps of the forming method can be repeated such that parts which have both the first and second predetermined shapes can be fabricated in mass.

According to one advantageous embodiment of the present invention, the continuous stock material includes a number of longitudinally spaced apart registration features. For example, the continuous stock material can include a registration feature defined between those portions of the continuous stock material which will be formed into respective ones of the plurality of parts by the forming method and apparatus of the present invention.

Accordingly, the forming apparatus of one advantageous embodiment of the present invention can include a sensor for identifying a registration feature on the continuous stock material. According to this embodiment, the forge can therefore include a positioner for positioning the forge such that the portion of continuous stock material which is formed is longitudinally spaced from the registration feature identified by the sensor by a predetermined distance. Likewise, the clamp of the forming apparatus of this embodiment of the present invention can also include a positioner for positioning the clamp such that the clamp securely grips a fixed portion of the continuous stock material which is longitudinally spaced from the registration feature by a predetermined distance.

The forming method and apparatus of one embodiment of the present invention can also include trimming means, such as a trimmer, disposed downstream of the forge for trimming predetermined portions of each part. The trimmer can also include a positioner for positioning the trimmer such that the predetermined portions which are trimmed are spaced from the registration feature by a predetermined distance. Likewise, the forming apparatus of one embodiment can include a cutter, disposed downstream of the first and second forges, for cutting the continuous stock material following formation of the parts so as to thereby separate the continuous stock material into a plurality of discrete parts. As described above in conjunction with the forge, clamp and trimmer, the cutter can include a positioner for positioning the cutter such that the portion of the continuous stock material which is cut is longitudinally spaced from the registration feature by a predetermined distance. By identifying the registration features defined by the continuous stock material, the various operations of the forming method and apparatus of the present invention can be performed in a precise manner on predetermined portions of the continuous stock material.

According to one advantageous embodiment of the present invention, an apparatus is provided for trimming and separating the plurality of parts formed from a continuous stock material which includes a plurality of longitudinally spaced apart registration features. The apparatus of this embodiment includes a trimmer for trimming predetermined portions of each part and a separator such as a snipper, a saw or other cutter, disposed downstream of the trimmer for separating each part from the continuous stock material once predetermined portions of the part have been trimmed. Advantageously, the separator is operably connected to the trimmer such that the separator and the trimmer are moved together in the longitudinal direction. However, the apparatus of this embodiment preferably includes a positioner for positioning the separator relative to the trimmer such that the trimmer and separator can be appropriately spaced, such as to process parts of different lengths. In order to properly position the trimmer and the separator, the apparatus of this embodiment also includes a sensor for identifying a registration feature on the continuous stock material and a positioner, responsive to the sensor, for jointly positioning the trimmer and the separator such that the portion which is trimmed and the position at which a part is separated from the remainder of the continuous stock material are longitudinally spaced from the registration feature by a predetermined distance. By moving the trimmer and the separator as a unit, the apparatus of this embodiment of the present invention simplifies the overall design of the forming method and apparatus by reducing the number of components which must be individually positioned relative to the registration features of the continuous stock material.

In addition to positioning the trimmer and the separator relative to the registration features of the continuous stock material, the positioner also permits the trimming and separating station to serve as an indexer. In this regard, the trimmer securely holds the continuous stock material while predetermined portions are trimmed. While the trimmer is securely holding the continuous stock material, the positioner can therefore advance the trimmer and the separator in the downstream direction in order to effectively pull the continuous stock material along the predetermined path. Correspondingly, the forming apparatus can include an indexer which also intermittently advances the continuous stock material in the downstream direction, such as by pushing the continuous stock material along the predetermined path, as described above. By synchronizing the indexer and the positioner of the trimming and separating station, the continuous stock material can be concurrently advanced in the downstream longitudinal direction by both the indexer and the positioner.

According to one advantageous embodiment of the present invention, at least one forging die includes a contact surface which defines a portion of the cavity for contacting and shaping the workpiece into the predetermined shape of the resulting part. More often, the plurality of forging dies include at least two forging dies, such as upper and lower forging dies, which include respective contact surfaces to deform and shape the workpiece upon actuation or closing of the forging dies. According to this embodiment of the present invention, the plurality of forging dies are moved inwardly in a predetermined direction as the forging dies are inserted within the die cavity defined by the ram, thereby at least partially closing the forging dies about the continuous stock material. The predetermined inward direction in which the forging dies move is preferably oblique to the respective contact planes of the forging dies. For example, the contact plane of at least one forging die and a reference plane perpendicular to the predetermined direction of movement of the forging die define an angle of between about 10° and about 20° therebetween, according to one advantageous embodiment. The respective contact surfaces therefore impart both axial and radial forces to at least portions of the workpiece to form the part of predetermined shape within the cavity defined between the plurality of forging dies. Due to the shape of the contact surfaces and the resulting orientation of the axial and radial forces applied, compressive, tensile and shear forces are generated within the workpiece which facilitate the efficient formation of the part of predetermined shape. Accordingly, thin parts which have a relatively large diameter can be readily forged according to this aspect of the present invention. Further, the power required to forge parts of a predetermined size and shape is reduced in comparison to conventional compressive forging processes by imparting compressive, tensile and shear forces at desirable locations within the workpiece.

In addition to the inner contact surface, each forging die preferably includes an opposed back surface having a predetermined shape for operably contacting those portions of the ram which define the die cavity. According to one embodiment of the present invention, the back surface of the forging dies have been advantageously designed to include a medial section having a partial conical shape. In addition, the back surface includes first and second lateral sections disposed on opposite sides of the medial section. Each lateral section preferably also has a partial conical shape. However, the radius defined by the conical medial section is larger than the radius defined by the conical lateral sections at each corresponding location along the length of the forging die. As such, the back surface of the forging die of this advantageous embodiment no longer presents a continuously smooth surface across the entire back surface. In addition, the first and second lateral sections are recessed relative to the medial section.

Since the forging die is typically tapered such that the contact surface is separated from the back surface by a greater amount at a first end of the forging die than at a second end of the forging die, the medial section of the back surface of this advantageous embodiment is also preferably tapered so as to be wider proximate the first end of the forging die and narrower proximate the second end of the forging die. As a result, the medial section has a trapezoidally shaped surface. As a result of the unique construction of the back surface of the forging die, the forging die advantageously contacts those portions of the ram which define the die cavity in a relatively even manner across most, if not all, of the conical medial section of the forging die as opposed to conventional forging dies which contacted the ram in a much smaller area, thereby significantly increasing the forces applied to at least portions of the forging die and correspondingly increasing the wear of the die and decreasing the effective lifetime of the die.

According to one aspect of the present invention, an improved forge is provided. According to one embodiment, the interior surface of the head and the exterior surface of the ram cooperate to define a clearance region proximate the forward end of the ram which permits a slight deflection of the forward portion of the ram in a radially outward direction as the ram is advanced over the die assembly. In particular, the clearance region defines a larger gap between the head and the forward portion of the ram than exists between the head and other portions of the ram, thereby reducing, if not eliminating, interference between the forward portion of the ram and the head. However, a portion of the ram is preferably maintained in an interference fit with the head so as to guide the ram during its lengthwise advancement and retraction. For example, the head can include a bronze bushing for engaging the ram and for providing the interference fit therewith.

In one embodiment, the head defines a circumferentially extended groove opening into the passageway at a location proximate the forward end of the ram. In this embodiment, the groove defines the clearance region to permit slight radially outward deflection of the forward end of the ram during forging operations. Preferably, the circumferential groove extends from a first location at least as forward as the forward end of the ram following the lengthwise advancement of the ram to a second location at least as rearward as a location corresponding to the position to which the plurality of forging dies are inserted into the die cavity defined by the ram following the lengthwise advancement of the ram.

The forge of another embodiment includes a rotator for imparting an incremental relative rotation between the ram and the die assembly after at least one part has been forged. Typically, the rotator incrementally rotates the ram about the lengthwise extending axis after at least one part has been forged. In this regard, the ram is preferably rotated while the ram is retracted and the forging dies have moved outwardly so as to no longer engage the workpiece. By repeatedly rotating the ram in increments, the rotator eventually rotates the ram through a full 360°.

The ram is preferably incrementally rotated after a predetermined number of parts have been forged. For example, the ram can be incrementally rotated after forging each part. While the ram can be rotated in different degrees, the ram of one embodiment is rotated between 10° and 30° and, more preferably, is rotated about 20° about the lengthwise extending axis during each incremental relative rotation. The ram can be rotated in a variety of manners. In one embodiment, for example, a gear can be operably connected to the ram and a drive member, such as a ratchet or a pinion gear, can be driven so as to engage the gear and to cause the gear to rotate, thereby correspondingly rotating the ram relative to the die assembly.

For control purposes, the forge can also include a sensor for detecting the incremental relative rotation between the ram and the die assembly. As such, the forge can delay the lengthwise advancement of the ram through the passageway defined by the head until after the sensor has detected that the ram has been rotated relative to the die assembly.

By rotating the ram through the entire 360°, the shape of the ram, typically a cylindrical shape, is maintained and the ram is prevented from developing an oval shape as a result of the forces imparted during forging operations. Thus, the forge of this embodiment of the present invention can more reliably form parts of the predetermined shape over a longer period of time, thereby extending the effective life of the ram.

According to one advantageous embodiment of the present invention, the forge includes a lubrication system for providing a lubricant between at least some of the forging dies and the ram. By lubricating the forging dies and the ram, the lubrication system facilitates the relative movement between the ram and the forging dies which occurs as the ram is alternately advanced and retracted. Preferably, the lubrication system provides lubricant while the ram is at least partially retracted and the die assembly is at least partially removed from the die cavity since the die assembly and, more particularly, the forging dies will then be exposed beyond the ram.

In one embodiment, the ram defines a plurality of ports opening into the cavity. As such, the lubrication system can inject lubricant through the ports so as to provide lubricant between at least some of the forging dies and the ram. In the embodiments in which the forge also includes a rotator for imparting an incremental relative rotation between the ram and the die assembly, the relative rotation between the ram and the die assembly will also therefore serve to circumferentially distribute the lubricant which has been injected at a number of discrete points in a fairly even manner.

The lubrication system can also provide lubricant between the ram and the head to facilitate relative movement therebetween, i.e., to facilitate the alternate advancement and retraction of the ram relative to the head. In this embodiment, either the head, the ram or both the head and the ram can define at least one circumferentially extending groove opening into the passageway defined by the head. As such, the lubrication system can inject lubricant into the circumferential groove for distribution between the head and ram as the ram is alternately advanced and retracted during forging operations.

As such, the forging apparatus of this embodiment facilitates relative movement between the ram, the die assembly and the head so as to reduce the wear of the various components and to correspondingly extend the operational life of the forge. In contrast to conventional wisdom which discouraged the use of lubrication during a continuous forming process for fear of coating the stock material with a lubricant which might prevent or impair proper handling and positioning of the stock material, the forging apparatus of this embodiment of the present invention lubricates the various components of the forge while permitting only a minimal amount of the lubricant to contact the continuous stock material such that subsequent handling and positioning of the continuous stock material is not adversely affected.

As will be apparent, the forming method and apparatus of the present invention is extremely versatile and can form a variety of different types of parts from a continuous stock material. According to one advantageous embodiment, however, the forming method and apparatus forms spade bits of a predetermined shape. In particular, the spade bit can include an elongate shank defining a central longitudinal axis and a blade portion joined at a rear end to one end of the shank. The spade bit can also include a spur extending axially from a forward end of the blade portion, opposite the rear end.

The blade portion of the spade bit of the present invention includes a pair of generally flat side segments which extend laterally in opposite directions from the central longitudinal axis. The side segments define respective lateral planes which are parallel to each other and the central longitudinal axis. The side segments also include respective forward cutting edges which are axially offset relative to each other to thereby define an axially advanced forward cutting edge and an axially rearward forward cutting edge. According to one advantageous embodiment, the forward cutting edges are axially offset by a predetermined axial offset, such as between about 0.010 inch and about 0.012 inch. By having forward cutting edges which are axially offset, the spade bit can more efficiently engage and remove portions of a workpiece during the boring of a hole. As a result, the longevity of a spade bit having axially offset forward cutting edges is also generally enhanced due to the more efficient removal of chip swarf during drilling operations.

The side segments of the blade portion of the spade bit of the present invention can also include chamfered corner portions which include a chamfered edge extending both axially rearward and laterally outward from the respective forward cutting edge. In addition, each chamfered corner portion can include a chamfered surface which slopes radially inward from the respective chamfered edge to a rear edge. By including chamfered corner portions, the spade bit of the present invention can more cleanly bore a hole while reducing binding and other frictional engagement between outer portions of the spade bit and the inner periphery of the hole, thereby further increasing the efficiency of the drilling operations.

Regardless of the type of parts formed by the forming method and apparatus of the present invention, the forming method and apparatus can effectively form a plurality of parts of a predetermined shape from a continuous stock material without separating the parts until most, if not all, of the forming operations have been completed. As a result, the forming method and apparatus of the present invention significantly increases the efficiency with which parts of a predetermined shape are manufactured, as well as the tolerance control and concomitant quality of the resulting parts. In addition, the forming method and apparatus of the present invention effectively decreases the number of partially formed parts which are in process at any one time, thereby further increasing the efficiency and decreasing the costs associated with the manufacture of parts of the predetermined shape according to the forming method and apparatus of the present invention.

BRIEF DESCRIPTION OF THE DRAWINGS

FIG. 1 is a schematic plan view of the forming apparatus of one embodiment of the present invention.

FIG. 2 is a side elevational view of at least portions of the forming apparatus of the embodiment of the present invention illustrated in FIG. 1.

FIG. 4 is a front elevational view of a spade bit according to one embodiment of the present invention.

FIG. 5 is a side elevational view of a spade bit of the embodiment of the present invention illustrated in FIG. 4.

FIG. 6 is a greatly enlarged fragmentary front elevational view of the blade portion of a spade bit of the embodiment of the present invention illustrated in FIG. 4.

FIG. 6A is an end view of the spade bit of FIGS. 4–6 when viewed along the line 6A—6A of FIG. 4 which illustrates the alignment of the forward cutting edges of the side segments along a centerline that passes through the central longitudinal axis.

FIG. 6B is a fragmentary side view of a portion of a side segment of the spade bit of FIG. 6A illustrating the hook angle and taken along the line 6B—6B of FIG. 6A.

FIG. 7 is a fragmentary cross-sectional side elevational view of a portion of the embodiment of the forming apparatus illustrated in FIG. 1 which depicts the straightener, the draw box, the load collet and the indexer in greater detail.

FIG. 8 is a fragmentary cross-sectional side elevational view of another portion of the embodiment of the forming apparatus illustrated in FIG. 1 which depicts the hex forge and the turning head.

FIG. 9 is a fragmentary cross-sectional side elevational view of a portion of the hex forge, wherein the plurality of forging dies have been at least partially closed about the continuous stock material, and wherein the upstream turning head clamp is closed.

FIG. 10 is a perspective view of one of the plurality of forging dies of the hex forge.

FIG. 11 is a cross-sectional view of the forging die of FIG. 10 as taken along line 11—11.

FIG. 12A is a cross-sectional end view of the hex forge of FIG. 9 and, more particularly, that portion of the ram which defines the die cavity and the die assembly disposed within the die cavity that includes a plurality of forging dies in an open position as taken along line 12—12 of FIG. 9.

FIG. 12B is a cross-sectional end view of the die assembly shown in FIG. 12A as taken along line 12—12 of FIG. 9 in which the plurality of forging dies have been at least partially closed about the continuous stock material.

FIG. 13 is a fragmentary cross-sectional end view of a portion of the hex forge which illustrates the toothed gear and associated ratchet for rotating the ram following forging operations as taken along line 13—13 of FIG. 9.

FIG. 14A is a fragmentary cross-sectional view of the toothed gear and the associated ratchet of FIG. 13 which depicts the manner in which the ratchet engages the gear such that the gear and, in turn, the ram is rotated in a counterclockwise direction as the ratchet is driven downwardly.

FIG. 14B is a fragmentary cross-sectional view of the toothed gear and the associated ratchet of FIG. 13 which depicts the manner in which the ratchet disengages from the gear following rotation such that the ratchet can be raised upwardly to its home position.

FIG. 20 is a fragmentary cross-sectional side view of blade press forge of one embodiment of the present invention which illustrates the plurality of ports through which lubricant is introduced.

FIG. 21 is a fragmentary perspective view of the alignment sensor for detecting instances in which the continuous stock material is kinked or otherwise bent such that the forging operations can be halted prior to damaging the blade press forge.

FIG. 22 is a fragmentary cross-sectional view of an adjustable support for precisely positioning and supporting the head during forging operations taken along line 22—22 of FIG. 20.

FIG. 23 is a fragmentary cross-sectional view of the adjustable support of FIG. 22 taken along ling 23—23 of FIG. 22.

FIG. 32 is a cross-sectional view of the downstream blade press clamp of the blade press of one embodiment of the present invention as taken along line 32—32 of FIG. 27.

FIG. 35 is a side elevational view of the spur trimming station, the outer diameter trimming station and the saw station of one embodiment of the present invention.

FIG. 36 is a cross-sectional plan view of the spur trimming station, the outer diameter trimming station and the saw station of one embodiment of the present invention as taken along line 36—36 of FIG. 35.

FIG. 37 is an end view of the saw station of one embodiment of the present invention as taken along line 37—37 of FIG. 35 which illustrates the advancement of the saw through the continuous stock material.

FIG. 38 is a fragmentary cross-sectional side elevational view of the saw station and the size stamp station of one embodiment of the present invention which illustrates the movement of the size stamp station in the longitudinal direction.

FIG. 39 is a fragmentary cross-sectional side elevational view of the saw station and the size stamp station of the embodiment depicted in FIG. 38 which illustrates engagement of a spade-type boring bit by the size stamp station while the saw station makes a cut at the forward end of a spade-type boring bit as indicated at A.

FIG. 40 is a fragmentary cross-sectional side elevational view of the saw station and the size stamp station of the embodiment depicted in FIGS. 38 and 39 which illustrates engagement of a spade-type boring bit by the size stamp station while the saw station makes a cut at the rear end of a spade-type boring bit as indicated at B.

FIG. 41 is a cross-sectional end view of the size stamp clamp of one embodiment of the present invention as taken along line 41—41 of FIG. 40 which illustrates the size stamp dies, the alignment fixture and the surrounding closure.

FIG. 42 is a plan view of a pair of spade-type boring bits formed from adjacent portions of the continuous stock material which illustrates the cuts made by the saw station at the forward end and the rear end of the spade-type boring bits as designated A and B, respectively.

FIG. 43 is a fragmentary cross-sectional side elevational view of the saw station and the size stamp station as shown in FIGS. 38–40 which illustrates the movement of the size stamp station in a downstream direction away from the saw station once the spade-type boring bit has been separated from the remainder of the continuous stock material.

FIG. 44 is a fragmentary cross-sectional plan view of the size stamp station of FIG. 43 which illustrates the ejection of the spade-type boring bit into a collection chute following size stamping operations.

FIG. 45 is a fragmentary cross-sectional side elevational view of an outer diameter trimming and separator station, a size stamping station and a saw station according to another embodiment of the present invention in which an outer diameter trimmer and a snipper are mounted upon a common platform for joint movement.

FIG. 46 is a plan view of the outer diameter trimming and separator station, the size stamping station and the saw station of the embodiment of the present invention illustrated in FIG. 44 and taken along line 46—46.

FIG. 47 is a plan view of a spade-type boring bit which illustrates the cuts made by the snipper and the cut made by the saw station at the locations designated C, D and E.

FIG. 48 is a fragmentary cross-sectional view of a rotary actuator of the size stamping station of one embodiment taken along line 48—48 of FIG. 46.

FIGS. 55A, 55B, 55C, 55D, 55E, 55F, 55G, 55H, and 55I are flow charts illustrating the operations performed by the forming method and apparatus of one embodiment of the present invention.

DETAILED DESCRIPTION OF THE PREFERRED EMBODIMENTS

Figure 3A:
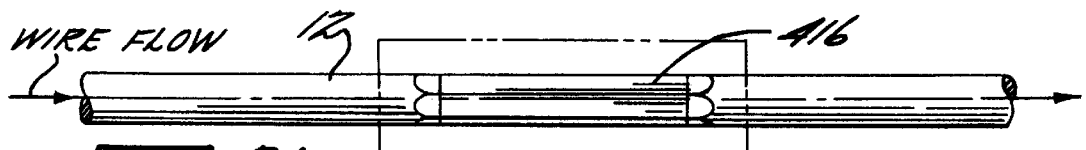
FIGS. 3A, 3B, 3C, 3D, 3E, 3F, and 3G illustrate the various shapes into which the continuous stock material is formed by the forming method and apparatus of one advantageous embodiment of the present invention which is designed to fabricate spade bits.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Referring now to FIGS. 1 and 2, a forming apparatus 10 according to one advantageous embodiment of the present invention is illustrated. As described in detail hereinbelow and as illustrated in FIGS. 1 and 2, the forming apparatus and associated method forms a plurality of parts from a continuous stock material 12. For purposes of illustration, however, the forming apparatus and method will be primarily described in conjunction with the formation of a plurality of spade bits from a continuous metal wire, as shown in FIGS. 3–6. However, the forming method and apparatus can be adapted to form a variety of other parts without departing from the spirit and scope of the present invention. For example, the forming method and apparatus of the present invention can form drill bits, router bits, fasteners, percussion bits, jigsaw and reciprocating saw blades, impact wrench anvils, coil and ballpoint chisels, gears, shafts, screwdriver bits, equalizers beams and actuator rods as well as other types of parts, including both those parts which are symmetrical about a central longitudinal axis and those parts which are not symmetrical about a central longitudinal axis, without departing from the spirit and scope of the present invention.

According to the forming method and apparatus 10 of the present invention, the plurality of parts are formed from a continuous length of stock material 12. Typically, the continuous stock material is comprised of a steel alloy, such as a 1050 carbon steel that has been double annealed and has a Rockwell Rb hardness of about 71 to 74. However, the continuous stock material can be comprised of any forgeable material known to those skilled in the art. For example, the continuous stock material can be comprised of copper, aluminum, titanium, zinc, brass or alloys thereof. In addition, the continuous stock material can be comprised of a combination of materials. For example, the continuous stock material can include metal powder and/or resin disposed within a metallic or plastic carrier tube. Accordingly, the forming method and apparatus of the present invention can form the carrier tube, including the metal powder and/or resin disposed therein, into a plurality of parts of a predetermined shape without departing from the spirit and scope of the present invention. Still further, the continuous stock material could be formed of a plurality of individual parts, potentially of greatly different cross-sectional shapes and sizes, which may be joined, such as by welding or other means, in an end-to-end relationship.

While principally described hereinbelow as a cold forming method, the continuous stock material 12 can be heated prior to the forging step, such as with in-line induction or infrared heating devices, such that the forming method is a warm or hot forging method. The temperature ranges to which each of the various materials from which the continuous stock material can be formed must be heated in order to be cold, warm or hot forged depend, among other things, upon the strength and internal properties of the respective material, and are known to those skilled in the art. For example, continuous stock material comprised of steel alloys typically have a temperature of between room temperature and 300° F. during cold forging operations, a temperature of between 200° F. and 1400° F. during warm forging operations, and a temperature of between 1200° F. and 2200° F. during hot forging operations. In addition, the forming method of the present invention which includes a step of hot forging a workpiece is particularly effective to forge workpieces comprised of a material having a relatively low melting point, such as aluminum, brass, zinc and copper.

Referring now to FIGS. 55A–55I, a flow chart illustrating the operations performed by the forming method and apparatus 10 of the present invention is illustrated. Once the continuous stock material 12 has been loaded as shown in block 500 and as described hereinbelow, the remaining operations of the forming method and apparatus are relatively continuous. Accordingly, the operations illustrated by the flow chart of FIGS. 55A–55I are generally repeated many times. For purposes of illustration, however, the flow chart of FIGS. 55A–55I begins at a point in the continuous forming cycle at which each of the forming operations have been performed on a predetermined portion of the continuous stock material, such that the continuous stock material must now be advanced.

As shown in FIG. 7, the forming apparatus 10 preferably includes an indexer 14 which intermittently advances the continuous stock material 12 longitudinally by pushing the continuous stock material a predetermined linear distance in a downstream direction. In order to advance the continuous stock material, the indexer preferably includes an indexer clamp 16 for securely gripping a portion of the continuous stock material. As illustrated in FIG. 7, the indexer clamp preferably includes an annular collet 18 through which the continuous stock material extends. The indexer clamp can also include an annular closure 20 which defines an internal cavity within which the collet can be received. The shape of the internal cavity defined by the closure is preferably complimentary to the shape of the collet. For example, the collet can be generally frustoconical in shape and the internal cavity defined by the closure can be generally frustoconical in shape. Thus, by urging the closure over the collet, the collet can be closed about the continuous stock material as shown in block 502 of FIG. 55A, thereby securely gripping the continuous stock material.

As will be apparent to those skilled in the art, the closure 20 can be urged or displaced over the collet 18 in a variety of manners. For example, the indexer clamp 16 can include an indexer clamp cylinder assembly including an annular piston rod which is operably connected to the closure and which is disposed within an annular cylinder such that, by hydraulic actuation of the indexer clamp cylinder assembly, the annular piston rod is extended and the closure is urged or axially displaced over the collet such that the collet is closed about the continuous stock material 12.

Referring now to FIG. 56, the forming apparatus 10 of the present invention also includes a controller 30, operably connected to the indexer clamp 16, for controlling the hydraulic actuation of the indexer clamp cylinder assembly. The controller 30 is preferably implemented by a combination of hardware and software. For example, the controller can be implemented by a programmable multiaccess controller (PMAC) and one or more programmable logic controllers (PLCS) which operate under the control of software stored in one or more memory elements to provide the monitoring and control described below. The controller is also operably connected to a hydraulic power source and an electrical power source 31 for providing and allocating hydraulic and electrical power, respectively, for the forming method and apparatus of the present invention as shown schematically in FIGS. 2 and 56 and as described hereinafter.

As will be described hereinafter, the forming apparatus 10 of the present invention preferably includes a number of clamps, other than the indexer clamp 16. In order to advance the continuous stock material 12, however, all of the clamps, other than the indexer clamp, should be opened such that the continuous stock material is free to move in a downstream longitudinal direction therethrough. Thus, as shown in blocks 504–508 of FIG. 55A, once the controller 30 has closed the indexer clamp about the continuous stock material and all of the other clamps have been opened, the indexer 14 advances the indexer clamp longitudinally by a predetermined linear distance from the initial position shown in solid lines in FIG. 7 to the final position shown in dashed lines. As a result of the secure gripping of the continuous stock material by the indexer clamp, however, the indexer also effectively advances the continuous stock material longitudinally by the same predetermined linear distance.

The indexer 14 can longitudinally advance the indexer clamp 16 in a number of manners without departing from the spirit and scope of the present invention. In the exemplary embodiment shown in FIG. 7, however, the indexer includes an indexer cylinder assembly 22. As described in U.S. Pat. No. 5,842,267 (the '267 patent), the indexer cylinder assembly can be positioned in-line and, as such, could include an annular piston rod disposed within an annular hydraulic cylinder so that the continuous stock material 12 could extend therethrough. In order to reduce the length of the forming apparatus 10 and to reduce the complexity of the indexer cylinder assembly, however, the indexer cylinder assembly of the embodiment of FIG. 7 can be mounted beneath the platform 17 which supports the indexer clamp. As shown, the indexer cylinder assembly includes a piston cylinder 26 and a piston rod 24 which extends outwardly from the piston cylinder. The piston rod is operably connected to the indexer clamp through an opening in the platform such that, upon hydraulic actuation of the indexer cylinder assembly, the annular piston rod and, therefore, the indexer clamp is urged in a downstream longitudinal direction. Alternatively, the indexer can include an AC servomotor and an associated ballscrew for longitudinally advancing the indexer clamp. In order to facilitate longitudinal movement of the indexer clamp, the indexer clamp and, more typically, the indexer platform is preferably mounted upon a pair of longitudinally extending rails 25 which limit the indexer clamp to longitudinal movement.

The indexer 14 also preferably includes an indexer monitor 28 for monitoring the longitudinal distance by which the indexer has advanced the continuous stock material 12. In one advantageous embodiment, the indexer monitor includes a glass scale, such as an RSF Elektronik type MSA 6706 glass scale, which is operably connected to the indexer platform 17 for effectively measuring the longitudinal displacement of the indexer clamp 16 as a result of the downstream longitudinal extension of the piston rod 24.

The controller 30 is also operably connected to the indexer cylinder assembly 22 and the indexer monitor 28 for controlling the hydraulic actuation of the indexer cylinder assembly. According to the present invention, once the controller determines that the indexer 14 has longitudinally advanced the continuous stock material 12 by the predetermined linear distance, the controller terminates further extension of the piston rod by halting the hydraulic actuation of the indexer cylinder assembly.

The forming apparatus 10 also preferably includes a straightener 32 which includes a series of aligned rollers 34 for straightening the continuous stock material 12 prior to forming the continuous stock material into a plurality of parts. In the illustrated embodiment, the straightener includes a two-plane straightener which has a plurality of aligned rollers disposed in two mutually perpendicular planes such that the continuous stock material is straightened in each of the planes. Accordingly, as the indexer 14 intermittently advances the continuous stock material in a downstream longitudinal direction, the stock material is drawn from a supply reel 33 and is straightened by passing through the straightener.

Once the controller 30 has terminated the longitudinal advancement of the continuous stock material 12 by the indexer 14, another clamp, downstream of the indexer clamp 16, is closed to securely grip another portion of the continuous stock material. In the embodiment illustrated in FIGS. 1 and 2 and in block 510 of FIG. 55A, the forming apparatus 10 includes an upstream turning head clamp 44 which is adapted to be closed about the continuous stock material following the intermittent advancement of the continuous stock material by the indexer. However, the forming apparatus could include other clamps, not associated with a turning head 45, in order to securely grip another portion of the continuous stock material following the intermittent advancement of the continuous stock material.

As described above in conjunction with the indexer clamp 16 and as shown in FIG. 8, the upstream turning head clamp 44 can include an annular collet 46 through which the continuous stock material 12 extends and an annular closure 48 which defines an internal cavity which is adapted to at least partially receive the collet. The upstream turning head clamp also includes a turning head cylinder assembly comprised of an annular cylinder and an annular piston rod disposed within the annular cylinder. According to the present invention, the controller 30 can hydraulically actuate the turning head cylinder assembly such that the annular piston rod is extended. As a result of the operable connection of the piston rod to the annular closure, the extension of the piston rod will urge the closure about the collet in order to at least partially close the collet about the continuous stock material such that the upstream turning head clamp securely grips a portion of the continuous stock material as shown in FIG. 9.

As shown in blocks 512 and 514, once the upstream turning head clamp 44 has been closed for a predetermined dwell time, such as 0.1 seconds in one advantageous embodiment, the controller 30 opens the indexer clamp 14 such that the collet 18 is opened and the continuous stock material 12 is free to move longitudinally therethrough. For example, the controller can hydraulically retract the annular piston rod of the indexer clamp cylinder assembly such that the closure 20 is disengaged from the collet.

As shown in block 516 of FIG. 55C, the indexer 14 and, more particularly, the indexer clamp 16 can then be retracted so as to return the indexer clamp to an initial or rest position, as shown in solid lines in FIG. 7, at the same time as a portion of the continuous stock material 12 is being formed. In particular, the controller 30 preferably hydraulically actuates the indexer cylinder assembly 22 in order to retract the piston rod 24 and, therefore, the indexer clamp at a first predetermined rate.

Referring now to FIG. 7, the forming apparatus 10 also preferably includes a draw box 36 having draw dies 38 through which the continuous stock material 12 is drawn in order to appropriately size the continuous stock material and to effectively remove the memory of the previously coiled stock material. As known to those skilled in the art, the draw box can also include a predraw die 40 in order to at least partially reduce the size of the continuous stock material and can include a source of lubricant 42 between the predraw die and the draw die in order to facilitate the drawing of the continuous stock material.

The draw box 36 is adapted to move longitudinally in conjunction with the annular piston rod 24 of the indexer cylinder assembly 22 as described below. Thus, the draw box preferably includes one or more slides 37 which ride upon and cooperate with a pair of longitudinally extending, parallel rails or tracks 39. As shown in FIG. 7, the indexer cylinder assembly is preferably double acting. Thus, upon retraction of the annular piston rod as shown in block 516 of FIG. 55C, the draw box is also urged or axially displaced in an upstream longitudinal direction. As such, the draw box is urged or pushed over the continuous stock material so as to effectively draw and, therefore, size the continuous stock material prior to subsequent forming operation.

As illustrated, the draw box 36 is typically positioned downstream of the straightener 32 such that the finished surface of the continuous stock material created by the draw box is not adversely affected by the straightener rolls 34. However, the draw box can be located upstream of the straightener in order to prevent the draw dies 38 from disadvantageously kinking or otherwise creating slight bends in the continuous stock material, if so desired.

As will be apparent to those skilled in the art, the draw box 36 can be designed to draw the continuous stock material 12 to any reasonable size desired. In the embodiment in which the forging method and apparatus 10 is adapted to fabricate spade bits 410, the draw box and, more particularly, the draw die 38 is preferably designed such that the size or diameter of the drawn stock material can be varied based upon the outer diameter of the blade portion 418 of the resulting spade bit, as exemplified by the following table:

| SPADE BIT DIAMETER | ORIGINAL WIRE DIAMETER | DRAWN WIRE DIAMETER |
|---|---|---|
| 1 3/8"-1 1/2" | 0.530" | 0.525" |
| 1 1/8"-1 1/4" | 0.490" | 0.484" |
| 15/16"-1" | 0.415" | 0.410" |
| 3/4"-7/8" | 0.385" | 0.375" |
| 9/16"-11/16" | 0.325" | 0.320" |
| 3/8-1/2" | 0.294" | 0.284" |

While the indexer clamp 16 is being retracted, the forming method and apparatus 10 of the present invention preferably forges a portion of the continuous stock material 12 into a first predetermined shape. For example, for the illustrated embodiment of the forming method and apparatus which is adapted to form a plurality of spade bits 410, the forming method and apparatus can form a portion of the continuous stock material so as to have a hexagonal cross-sectional shape, thereby forming the rear portion 416 of the shank 412 of the resulting spade bit.

According to the present invention, the forming apparatus 10 includes a forge and, in one advantageous embodiment, a hex forge 50 for forming a portion of the continuous stock material 12 into the first predetermined shape, namely, a hexagonal cross-sectional shape as shown in FIG. 3A. As shown in FIGS. 8–12, the hex forge preferably includes a die assembly having a plurality of forging dies 52 disposed about the continuous stock material. For example, the plurality of forging dies of one embodiment includes six forging dies which cooperate to define a cavity which, in turn, defines at least a portion of the predetermined shape of the resulting part, such as the rear portion 416 of the shank 412 of the spade bit 410 which has a hexagonal cross-sectional shape.

The plurality of forging dies 52 can be at least partially disposed within an alignment fixture 54, such as a spider, which maintains the forging dies in a predetermined aligned relationship. See, for example, FIGS. 12A and 12B. Thus, the combination of the plurality of forging dies and the alignment fixture comprise a hex forge die assembly. As described hereinafter, the die assembly has a predetermined shape, such as a predetermined frustoconical shape in one advantageous embodiment.

As shown in FIGS. 8–10, the hex forge die assembly is preferably spring-loaded, such as with springs 56. As shown, the springs extend in a radial direction within the alignment fixture 54 and are at least partially disposed within respective pockets 58 defined by the forging dies. Accordingly, the springs urge the forging dies in a radially outward direction relative to the alignment fixture, such that the forging dies are in an open position, as shown in FIG. 8, in the absence of additional countervailing forces.

The forging apparatus 10 and, more particularly, the hex forge 50 of this aspect of the present invention also includes means, such as the die housing 60 of the die press ram 61, for radially closing the plurality of forging dies 52. As described in detail below, the forging dies move radially inward in a predetermined direction shown by the arrows of FIGS. 9 and 11 upon relative movement between the ram and the plurality of forging dies.

At least one and, more preferably, each forging die 52 advantageously includes a contact surface 62 which defines a portion of the cavity through which the continuous stock material 12 extends. Each contact surface is adapted to contact and shape the workpiece into the predetermined shape defined by the cavity. As shown in FIGS. 10 and 11, the contact surface of at least one of the forging dies preferably defines a contact plane 64 which is oblique to the predetermined direction in which the forging dies are closed. Thus, the contact planes of the forging dies impart both axial and radial forces to the workpiece which, in turn, result in compressive, tensile and shear stresses within the workpiece during the deformation process. The resulting compressive and shear force components deform the workpiece outwardly into the predetermined shape defined by the forging dies. More particularly, the resulting compressive and shear force components deform the workpiece plastically and irreversibly into the predetermined shape defined by the forging dies in the closed or operative position.

More particularly, an angle 66 is defined between the respective contact planes and a reference plane 68 perpendicular to the predetermined direction in which the forging dies move as shown in FIG. 11. In a preferred embodiment, the angle is between about 10° and about 20° and, in one exemplary embodiment, is about 15°.

As used herein, the term "compressive force" includes those forces in the predetermined direction in which the forging dies 52 move, and the term "shear force" includes those lateral forces which tend to deform the workpiece radially outward. Thus, for a given amount of input energy, the amount of shear force and compressive force imparted to the workpiece increases and decreases, respectively, as the angle 66 defined between a respective contact plane 64 and the reference plane 68 increases. Likewise, for a given amount of input power, the amount of shear force and compressive force imparted to the workpiece decreases and increases, respectively, as the angle defined between a respective contact plane and the reference plane decreases.

Those portions of the workpiece which are subjected to shear force, and hence shear stress, are more readily deformed since the shear strength of most common workpieces, i.e., most metallic materials, is significantly less than the compressive strength of the same material. Typically, the shear strength of metallic materials is approximately 60% of the compressive strength of the same material. For example, during the formation of a spade bit according to the forming method and apparatus 10 of the present invention, both side segments are preferably subjected to relatively high shear stresses for producing the maximum lateral displacement from a continuous stock material 12 of the smallest initial diameter.

Thus, significantly less input energy is required to deform a workpiece with shear forces than with compressive forces. In addition, the application of shear forces which more readily deform a workpiece radially outward allows the ratio of the thickness of a part to the width or diameter of a part to be decreased such that thin parts having a relatively large diameter, such as a spade bit, can be readily forged according to this aspect of the present invention. Accordingly, this aspect of the present invention enables the ratio of the newly generated product surface area to a minimum product thickness to be optimized.

However, the application of shear force to deform a workpiece significantly increases the forces which the forging dies 52, the die housing 60 and the remainder of the ram 61 must withstand during the forging process and, accordingly, has been avoided in conventional forging processes in which the forging dies are closed in a rectilinear manner to impart compressive forces on the workpiece. In order to withstand the increased forces, the plurality of forging dies and the die housing are comprised, in one preferred embodiment, of a high speed steel and, more preferably, are comprised of CPM® REX™ M4 high speed steel, or an equivalent, marketed by Colt Industries Crucible Specialty Metals Division of Syracuse, N.Y. and described in more detail in a publication entitled Crucible Data Sheet by Colt Industries Crucible Specialty Metals Division bearing document number D88 308-5M-776.

As also shown in FIGS. 8, 9, 12A and 12B, the means for closing the plurality of forging dies 52 preferably includes a die housing 60 which defines an internal cavity 70 therein. In the illustrated embodiment in which the die housing is separate from the remainder of the ram 61, the die housing is generally press fit into a correspondingly shaped cavity defined by the ram and opening through the forward end of the ram. Alternatively, the ram can be integrally formed such that the die cavity defined by the ram and opening through the forward end of the ram serves as the die housing. In either embodiment, the internal cavity of the die housing is preferably shaped and sized in a complimentary fashion to the shape and size of the die assembly. For example, the die housing can define an internal cavity having a frustoconical shape in order to receive and circumferentially encompass a frustoconical die assembly. Thus, by advancing or urging the ram and, more particularly, the die housing over the die assembly, the die housing forces the plurality of forging dies radially inward so as to close about the continuous stock material 12 which extends therethrough. The strength of the die assembly and its resulting ability to withstand forces generated during the deformation of the continuous stock material with axial and compressive forces which, in turn, generate compressive, tensile and shear stresses is further enhanced by the radial direction in which the die assembly is closed and the surrounding relationship of the die housing and the remainder of the ram to the die assembly.

According to one advantageous embodiment shown in FIGS. 10 and 11, each forging die 52 includes not only an inner contact surface 62 for contacting and shaping the workpiece, but also an opposed outer or back surface 63 having a predetermined shape for operably contacting the die housing 60. The predetermined shape of the outer surface of each forging die is preferably different than the predetermined shape of the internal cavity 70 of the die housing when the plurality of forging dies are in the open position as shown in FIGS. 8 and 12A. However, the forging dies not only move radially inward, but also rotate in the general direction indicated by arrow 67 in FIG. 11 upon insertion into the die housing. Thus, the predetermined shape of the outer surface of each forging die preferably corresponds to the predetermined shape of the internal cavity of the die housing once the forging dies are in the operative or closed position as shown in FIGS. 9 and 12B.

In order to fabricate a plurality of parts from a continuous stock material according to the forming method and apparatus 10 of the present invention, the hex forge 50 is preferably designed such that the continuous stock material 12 can extend longitudinally therethrough. In particular, the plurality of forging dies 52 preferably define an entry port 72 and an exit port 74 which open into the internal cavity defined by the forging dies such that the continuous stock material can extend longitudinally therethrough. In addition, the die housing 60 preferably has an annular configuration so as to permit the continuous stock material to also extend therethrough.

The hex forge 50 also preferably includes means, such as a hydraulically actuated die press 76, for longitudinally advancing the ram 61, including the die housing 60, over the plurality of forging dies 52 such that the forging dies are radially closed about the continuous stock material 12. In order to fabricate a plurality of parts from a continuous stock material, the die press of one advantageous embodiment shown in FIGS. 8 and 9 includes an annular piston rod 78 disposed within an annular cylinder 80 which, in turn, defines a lengthwise extending opening through which the continuous stock material extends. In particular, the annular piston rod and the associated piston preferably have a central hole bored therethrough which enables the continuous stock material to pass through the die press. The annular piston rod is preferably operably connected to the die press ram 61 such that the controller 30 can hydraulically actuate the die press so as to longitudinally advance the annular piston rod and, correspondingly, the ram as shown in FIGS. 8 and 9 and as described in block 518 of FIG. 55B.

As shown in FIGS. 8 and 9, the hex forge 50 also includes a head 81 which defines a passageway that extends longitudinally through at least a forward portion of the head. Preferably, the forward portion of the ram 61 and the passageway defined by the head have the same shape, i.e., cylindrical, and are sized such that an interference fit is maintained between the head and the forward portion of the ram. As such, the passageway defined by the head serves to guide the ram as the ram is longitudinally advanced and retracted.

As shown in FIG. 9, the hex forge 50 preferably includes a frame plate 82 and a wear plate against which the plurality of forging dies 52 are butted, thereby preventing longitudinal advancement of the forging dies. Accordingly, the longitudinal advancement of the annular piston rod 78 forces the ram 61 and, more particularly, the die housing 60 over the forging dies such that the forging dies are radially closed about the continuous stock material 12. While the pressure or force required to urge or axially displace the die housing over the forging dies will vary depending upon the processing conditions, including the type of material from which the continuous stock material is formed and the size and shape of the resulting part, a hydraulic press, such as a 500 ton press, has produced spade bits of the present invention from 1050 carbon steel.

Although the die press 76 of the illustrated embodiment includes an annular cylinder 80 and an annular piston rod 78, the die press can include other means of urging or axially displacing the die housing 60 over the plurality of forging dies 52. For example, the hex forge 50 of an alternative embodiment can include a plurality of hydraulic cylinder assemblies disposed concentrically about the continuous stock material 12. According to this embodiment, each of the hydraulic cylinder assemblies may be operably connected to the die housing such that the die housing can be urged over the plurality of forging dies upon actuation of the hydraulic cylinder assemblies.

During the forging operation, the continuous stock material 12 grows longitudinally. In particular, the continuous stock material grows in both an upstream and a downstream longitudinal direction. Thus, the forging apparatus 10 of the present invention preferably includes compensating means for compensating for the longitudinal growth of the continuous stock material. With respect to the hex forge 50 illustrated in FIGS. 8 and 9, the upstream longitudinal growth of the continuous stock material is returned in an upstream direction toward the supply reel 33.

In contrast, the downstream longitudinal growth of the continuous stock material 12, i.e., the longitudinal growth of the continuous stock material between the portion of the continuous stock material which is formed and the fixed portion of the continuous stock material which is clamped by the upstream turning head clamp 44, is compensated for or absorbed by mounting the plurality of forging dies 52, the ram 61 including the die housing 60, the head 81, the frame plate 82 and the die press 76 upon a carriage 84 which is adapted to move longitudinally. In particular, the hex forge 50 preferably includes a carriage which is adapted to move from an initial or rest position in an upstream longitudinal direction by a distance equal to the downstream longitudinal growth of the continuous stock material between the portion of the continuous stock material which is formed and the fixed portion of the continuous stock material which is clamped by the upstream turning head clamp. As a result, the hex forge permits the plurality of forging dies to remain closed about the same portion of the stock material during each respective forming step, while permitting longitudinal growth of the continuous stock material in both longitudinal directions, i.e., in both the upstream and downstream longitudinal directions.

As illustrated in FIG. 8, the carriage 84 can include slides 86 which are mounted upon a pair of parallel, longitudinally extending tracks 88 in order to facilitate longitudinal movement of the carriage. In addition, the carriage can be longitudinally biased, such as by a hydraulic spring or other biasing means 90, to prevent excessive movement of the carriage in the upstream longitudinal direction. In particular, the longitudinal biasing of the carriage encourages the portion of the continuous stock material 12 which is formed to expand laterally within the cavity defined by the plurality of forging dies 52 so as to more completely fill the cavity defined thereby.

While the same bias force can be applied to the carriage 84 during the entire forging operation, the controller 30 can be operably connected to the biasing means 90 in order to control the bias force applied thereby. For example, the controller can include a predetermined bias schedule which defines the bias force to be applied over time. Thus, the controller and the biasing means can increase the magnitude of the bias force over time so as to further encourage lateral expansion of the portion of the continuous stock material 12 which is formed.

Figure 8A:
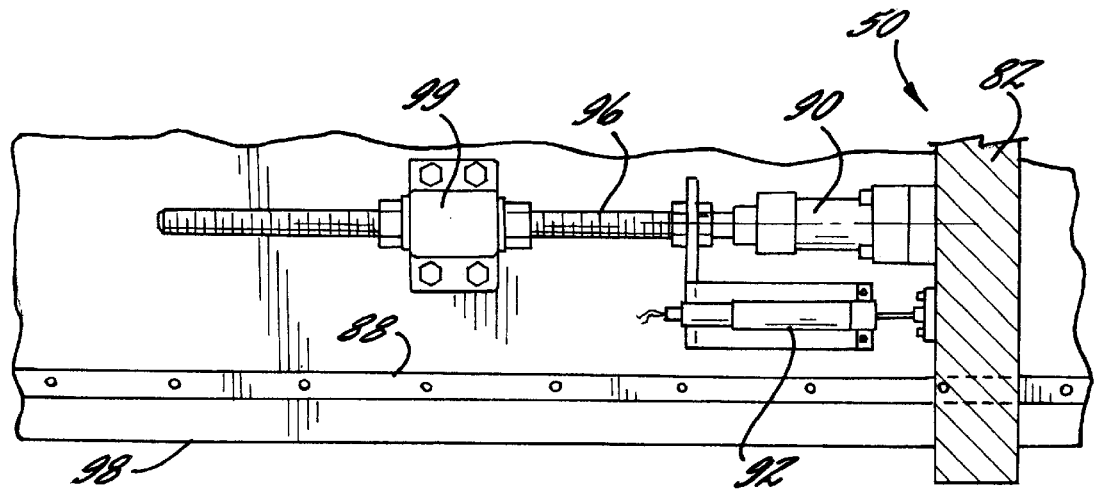
FIG. 8A is a fragmentary cross-sectional plan view taken along line 8A—8A of FIG. 8 and illustrating various sensors and monitors associated with the hex forge.
Figures 55A, 55B:
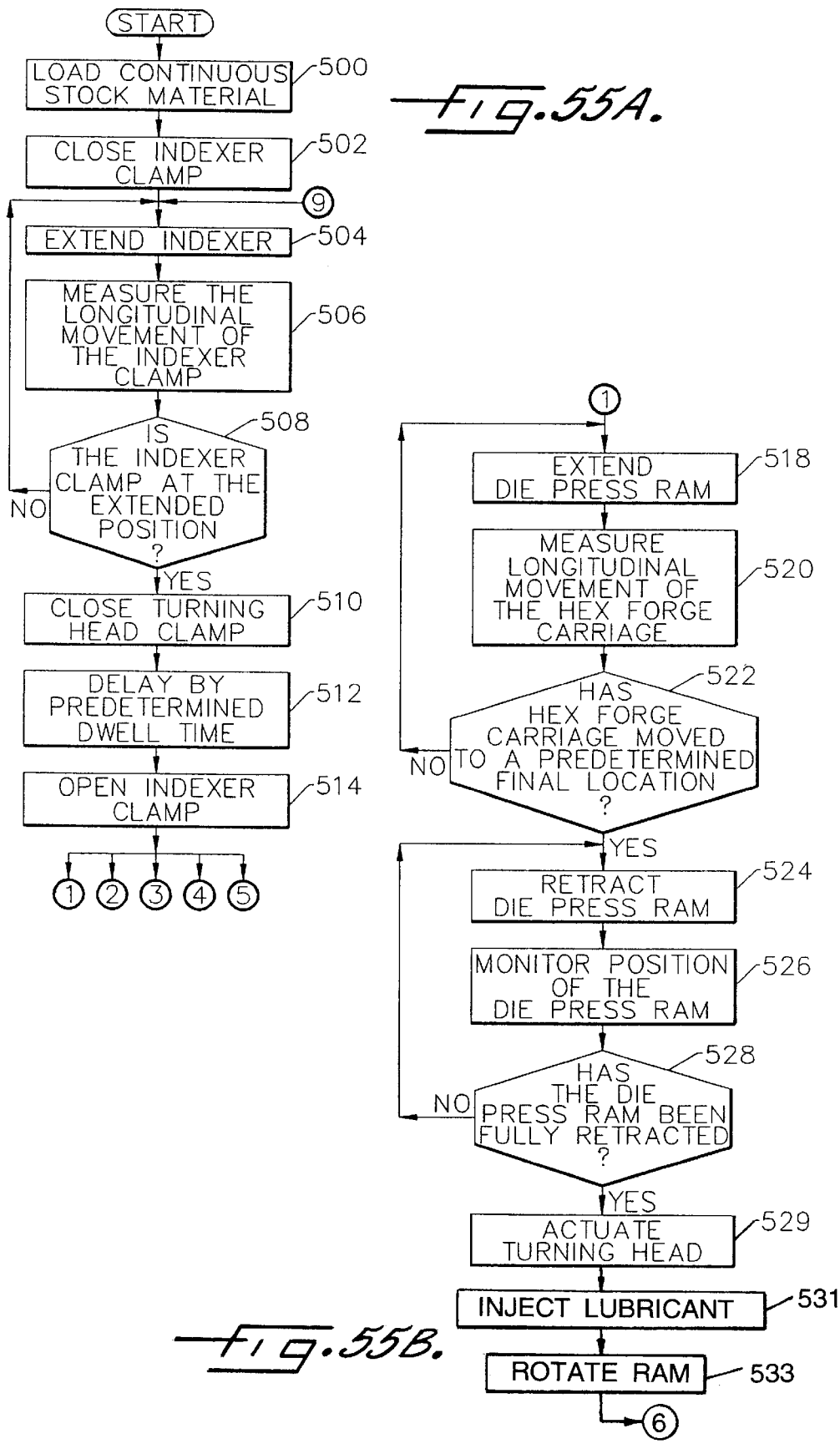

The forming apparatus 10 and, more particularly, the hex forge 50 also preferably includes a hex press position monitor 92, such as an MTS Temposonics® LP position sensing system, for monitoring the longitudinal position of the carriage 84 as shown in FIG. 8A and in block 520 of FIG. 55B. The controller 30 is also operably connected to the hex press position monitor for determining if the upstream longitudinal movement of the carriage equals or exceeds a predetermined longitudinal growth threshold. Since the longitudinal movement of the carriage equals the longitudinal growth of the continuous stock material 12 in the downstream longitudinal direction which, in turn, is directly related to the extent to which the continuous stock material has been forged, the controller and associated hex press position monitor can effectively monitor the forging operations by measuring the longitudinal growth of the continuous stock material. The controller can then terminate forging operations, such as by ceasing the hydraulic actuation of the die press 76, once longitudinal growth of the continuous stock material is at least as great as a predetermined longitudinal growth threshold, as shown in block 522.

Once the controller 30 has terminated the forging operations, the controller can retract the ram 61, thereby withdrawing the die housing 60 from the plurality of forging dies 52, such as by hydraulically retracting the annular piston rod 78 at least partially within the annular cylinder 80. As described above, the die assembly includes a plurality of springs 56, one of which is associated with each of the plurality of forging dies, for urging the respective forging dies radially outward. Accordingly, upon the removal of the die housing from the plurality of forging dies, the plurality of forging dies are opened such that the continuous stock material 12 can move longitudinally therethrough.

The hex forge 50 can also include a positioner, such as the hydraulic actuator 90 which also serves as the biasing means, that is operably connected to the carriage 84 for repositioning the carriage to a predetermined initial or rest position once a plurality of forging dies 52 have been opened. As shown in FIG. 8A, the predetermined initial position is defined by the end of a threaded rod 96 which is fixed to the underlying table 98 by a fixed nut assembly 99. Thus, the controller 30 can direct the hydraulic actuator to reposition the carriage such that the carriage is returned to the predetermined rest position for subsequent forging operations. As will be apparent to those skilled in the art, the positioner of the hex forge can be implemented in a number of other fashions, such as with an AC servomotor and an associated ballscrew, without departing from the spirit and scope of the present invention.

The hex forge 50 of the illustrated embodiment also preferably includes a die press monitor 100, such as another MTS Temposonics® LP position sensing system or a glass scale, for monitoring the relative position of the annular piston rod 78 of the die press 76. As described above, the controller 30 is operably connected to the die press monitor so as to determine if the annular piston rod has been retracted to a predetermined initial position. As shown in blocks 524–528 of FIG. 55B, if the annular piston has not been retracted to the predetermined initial position, the controller continues the retraction of the annular piston. Once the annular piston has been retracted to the predetermined initial position, however, the controller halts the retraction of the annular piston.

In addition to terminating forging operations upon detecting that the continuous stock material 12 has grown by a predetermined longitudinal amount, the forging apparatus 10 and, more particularly, the controller 30 preferably increases the rate at which the indexer 14 is retracted once forging operations are terminated. In particular, the controller preferably retracts the piston rod 24 of the indexer cylinder assembly 22 and, as a result, the indexer clamp 16 at a second predetermined rate once the forging operations have terminated. Typically, the second predetermined rate is greater than the first predetermined rate. During the retraction of the indexer clamp, the controller, in response to signals provided by the indexer monitor 28, preferably monitors the relative position of the indexer clamp and halts further retraction of the annular piston rod and the indexer clamp once the indexer clamp is at a predetermined retracted position, as shown in blocks 530–534 of FIG. 55C. While the predetermined retracted position can be the same as the predetermined initial or rest position of the indexer, the forming apparatus of one advantageous embodiment preferably retracts the indexer to a retracted position which is longitudinally rearward of the initial or rest position by a relatively small predetermined longitudinal distance, such as 0.005 inch, in order to compensate for additional movement of the continuous stock material once the upstream turning head clamp 44 is released.

As shown in block 533 of FIG. 55B, once the controller 30 has terminated forging operations and retracted the ram 61 of the hex forge 50, the ram can be rotated relative to the plurality of forging dies 52 such that the wear and degradation of the die housing 60 occasioned by the relative motion of the ram and the plurality of forging dies is spread relatively evenly about the circumference of the die housing. In this regard, the hex forge can include a rotator for imparting relative rotation between the ram and the die assembly. As shown in FIG. 13, for example, the rotator includes a toothed gear 102 mounted to the ram and a drive member 103, such as a rod which carries a pawl 103a, which engages the gear and causes the gear and, in turn, the ram to rotate. As shown, the drive member can be mounted to the carriage 84 and, more particularly, mounted upon a rear bolster plate of the die press. Although the drive member can be actuated in a variety of manners, the drive member of the illustrated embodiment can be extended and retracted by means of a hydraulic actuator 105. In this regard, the hydraulic actuator can extend the drive member by advancing the drive member in a downward direction as depicted in FIG. 13 such that the pawl can engage the gear as shown in FIG. 14A and cause the gear to rotate by a predetermined angular amount in the counterclockwise direction. Once the gear has been rotated, the drive member is retracted by the hydraulic actuator. As shown in FIG. 14B, the pawl is disengaged from the gear by pivoting the pawl away from the gear. Typically the pawl is pivoted away from the gear since the gear is adapted to rotate in only one direction, i.e., the counter-clockwise direction in the embodiment of FIG. 13, such that attempts to retract the drive member will overcome the spring force which urges the pawl into engagement with the gear and permit the pawl to pivot out of engagement with the gear. As will be apparent, a variety of other drive members, such as pinion gears or the like, can be utilized to rotate the gear and, in turn, the ram without departing from the spirit and scope of the present invention.

Preferably, the ram 61 is incrementally rotated after a predetermined number of parts have been formed, such as after each part has been formed. Although the ram can be rotated by different predetermined amounts, the ram is generally rotated between 10° and 30° and, more typically, by about 20°. By repeatedly incrementally rotating the ram, however the ram will eventually be rotated completely about the die assembly, that is, through an entire 360°. As such, the rotation of the ram relative to the die assembly will more evenly distribute the wear about the die cavity. In addition, the rotation of the ram relative to the die assembly will maintain the generally cylindrical shape of the ram and substantially prevent the forward end of the ram from assuming an oval shape or from otherwise being deformed during forging operations as has occurred to rams of conventional forges.

Although not illustrated, the hex forge die assembly could be rotated in addition to or instead of rotating the ram 61. In addition to promoting more even wear of the die housing 60, rotation of the hex forge die assembly would also allow different parts to be forged into respective predetermined shapes which are disposed at different angular orientations relative to the continuous stock material, thereby further increasing the versatility of the forming method and apparatus 10 of the present invention.

The hex forge 50 can also include a sensor 107 for detecting rotation of the ram 61 relative to the die assembly. By monitoring the rotation sensor to the controller 30, the controller can determine if the ram has been rotated relative to the die assembly following a forging operation and can prevent further forging operations until the ram has been appropriately rotated.

Figure 15:
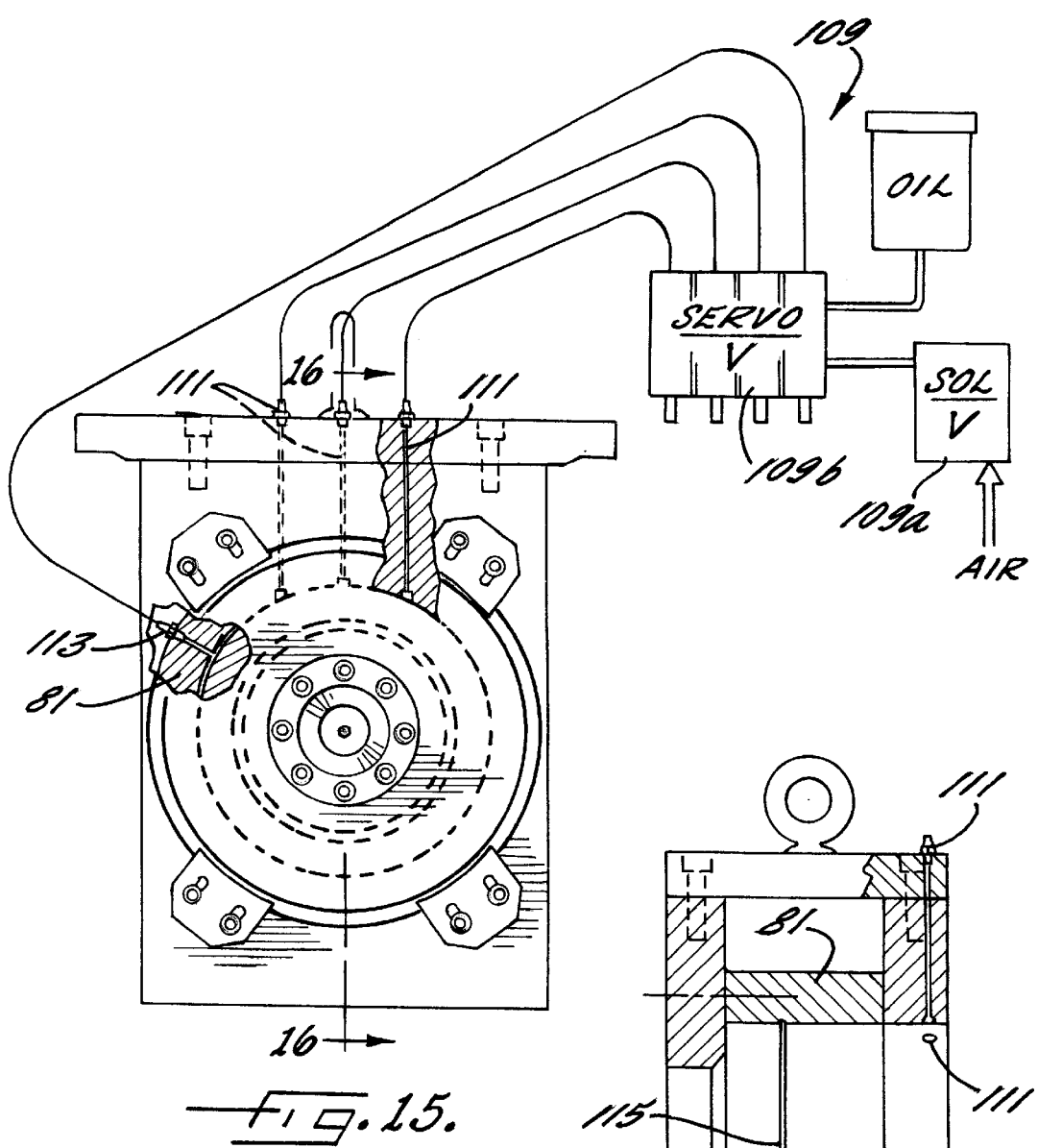
FIG. 15 is a partial fragmentary cross-sectional end view of the hex forge taken along line 15—15 of FIG. 9 which illustrates the lubrication system for lubricating the various components of the hex forge.
Figure 16:
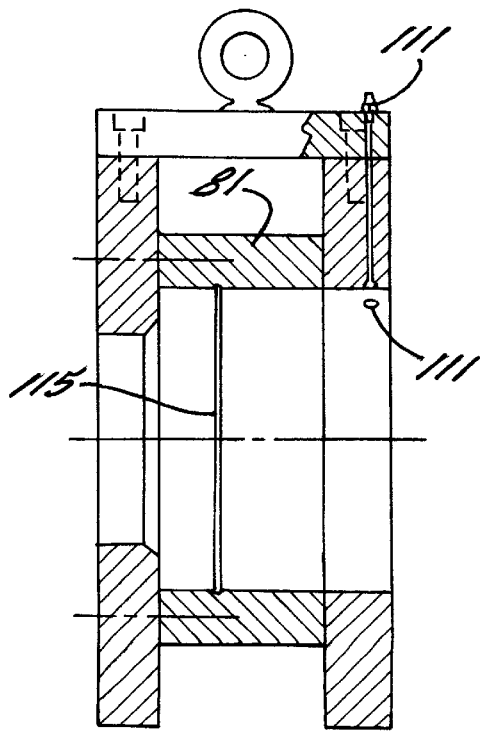
FIG. 16 is a partial fragmentary cross-sectional side view of the hex forge taken along line 16—16 of FIG. 15 which further illustrates the manner in which lubricant is introduced to the various components of the hex forge.

The hex forge 50 can also include a lubrication system 109 as shown in FIGS. 15 and 16 for providing lubricant to the die assembly, the ram 61 including the die housing 60 and the head 81. Typically, the lubricant is an oil, such as machine way lube. However, the lubrication system can apply other lubricants, if so desired. According to this embodiment, the plurality of ports 111 are defined through the head and the ram so as to open into the die cavity within which the die assembly is inserted. By injecting lubricant through these ports, the lubrication system can therefore provide lubricant to the back surfaces 63 of the forging dies 52.

The controller 30 typically controls the operation of the lubrication system 109, such as the pneumatically actuated solenoid valve 109a and the servovalves 109b which control the flow of lubricant in the illustrated embodiment. Typically, the controller directs the lubrication system to provide lubricant following each forging operation by injecting lubricant through the ports 111 once the ram 61 has been longitudinally retracted and while the back surfaces 63 of the forging dies 52 are at least somewhat exposed. See block 531 of FIG. 55B. While lubricant is injected at a plurality of discrete ports, such as three ports, the subsequent rotation of the ram relative to the die assembly serves to distribute the lubricant relatively evenly between the ram and the back surfaces of each of the forging dies.

The lubrication system 109 can also provide lubricant between the head 81 and the ram 61 in order to facilitate the lengthwise advancement and retraction of the ram within the passageway defined by the head. In this regard, another port 113 can be defined through the head such that lubricant injected through this additional port is spread over the outer surface of the ram and the inner surface of that portion of the head which defines the passageway. To facilitate even distribution of the lubricant about the entire circumference of the ram, the head preferably defines a circumferentially extending groove 115. By injecting lubricant into the circumferential groove, lubricant is effectively applied about the entire circumference of the ram, thereby evenly lubricating the ram. Alternatively, the ram can define the circumferential groove instead of or in addition to the head, if so desired.

As described above, the controller 30 typically directs the lubrication system 109 to inject lubricant once the ram 61 has been fully retracted. However, lubricant can be injected at other times during the forging process, if desired. Thus, the lubrication system of the forge of this advantageous embodiment can repeatedly lubricate the various components of the forge in order to reduce wear and increase the effective life of the components without applying enough lubricant to the continuous stock material 12 that the continuous stock material becomes difficult to grip during downstream operations.

The forging method and apparatus 10 can also include a sensor 85, such as a photoelectric eye or sensor, for monitoring the continuous stock material 12 which exits the hex forge 50. As such the sensor is typically positioned immediately downstream of the hex forge. The sensor is typically adapted to monitor the hex portion that has been formed by the hex forge and to notify the controller 30 if the hex portion has not been properly formed such that the controller can halt further forging operations to enable the forging process to be corrected.

The continuous stock material 12 preferably includes one or more registration features 104 disposed at predetermined locations along its length. See, for example, FIGS. 3A–3G. While the continuous stock material can include the registration features prior to commencing the forming method of the present invention, the forming method and apparatus 10 typically creates or forms the registration features during the fabrication process. For example, while the upstream turning head clamp 44 is securely gripping a fixed portion of the continuous stock material, the forming apparatus 10 of the illustrated embodiment preferably forms a predetermined registration feature on the continuous stock material. The registration feature is preferably defined between each of the plurality of parts which will be formed from the continuous stock material. However, the registration feature can be formed at other predetermined locations without departing from the spirit and scope of the present invention. In addition, the forming method and apparatus 10 can form the registration features in other manners, such as by printing a plurality of longitudinally spaced apart lines on the continuous stock material or by punching a hole in a predetermined portion of each part.

Figure 17:
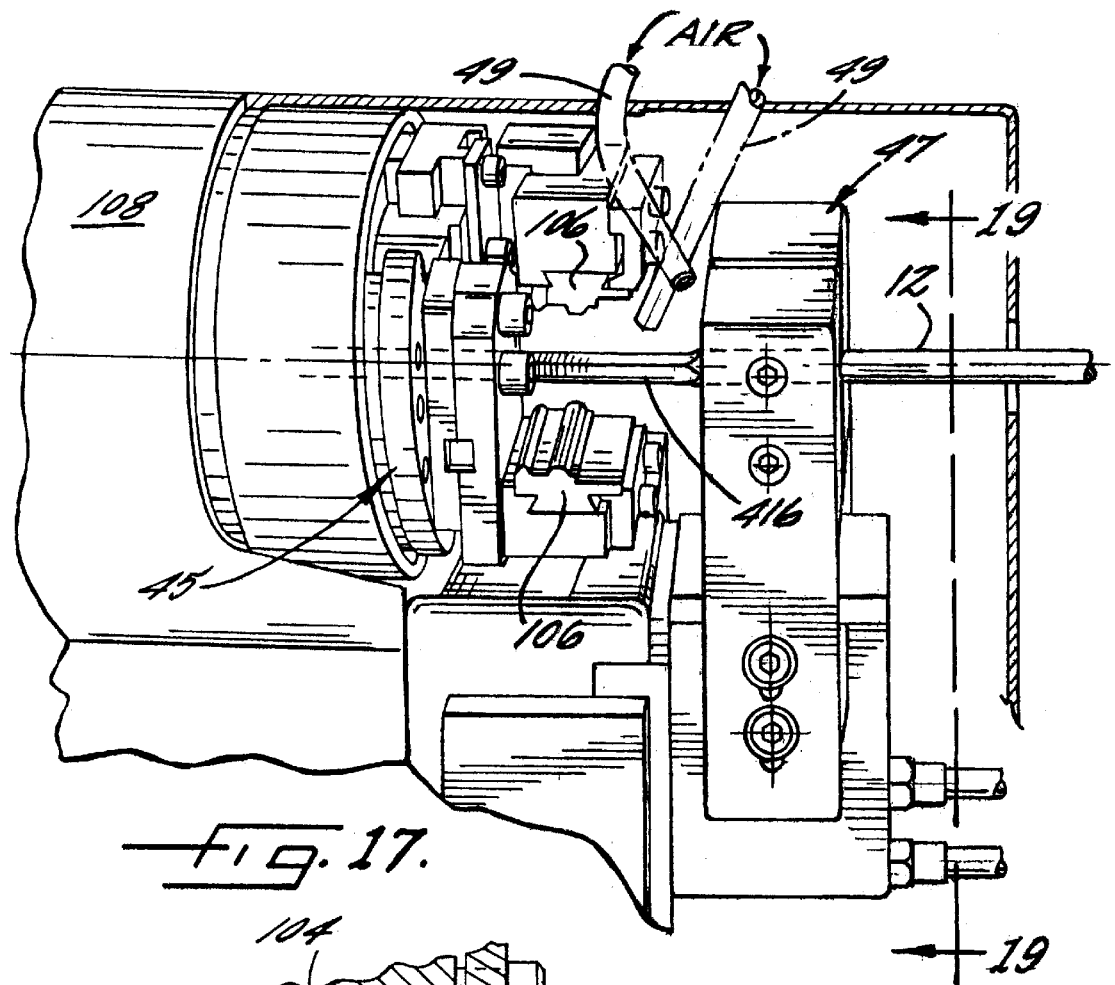
FIG. 17 is a fragmentary perspective view of a portion of the turning head including the downstream turning head clamp in which the turning head dies are in the open position and in which the cover has been removed for purposes of illustration.
Figure 19:
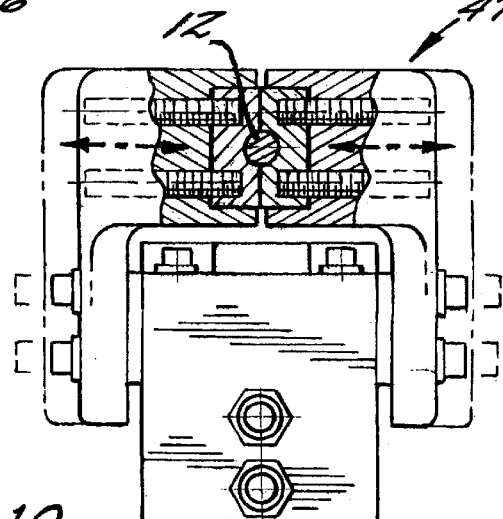
FIG. 19 is a fragmentary cross-sectional end view of the downstream turning head clamp taken along line 19—19 of FIG. 17.

While the turning head 45 is described hereinafter as forming the registration feature 104 following the initial forging operation, the turning head can form the registration feature at any time while the upstream turning head clamp 44 securely grips the fixed portion of the continuous stock material 12 without departing from the spirit and scope of the present invention. As depicted in FIGS. 8, 17 and 19, the turning head preferably includes a downstream clamp 47 for securely gripping a portion of the continuous stock material 12. As such, prior to forming the registration feature, the downstream clamp preferably engages the stock material and thereafter holds the continuous stock material until the formation of the registration feature is complete. While the downstream clamp is depicted so as to be pneumatically actuated, the turning clamp can be actuated in other manners, such as hydraulic actuation, without departing from the spirit and scope of the present invention. In addition, the downstream turning head clamp can be embodied in many different forms so long as the downstream turning head clamp securely grips the continuous stock material so as to prevent the continuous stock material from vibrating while the registration feature is formed.

Figure 3B:
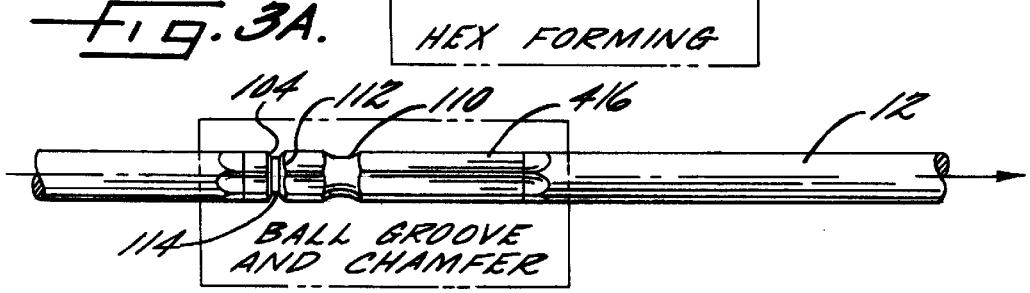
Figure 18:
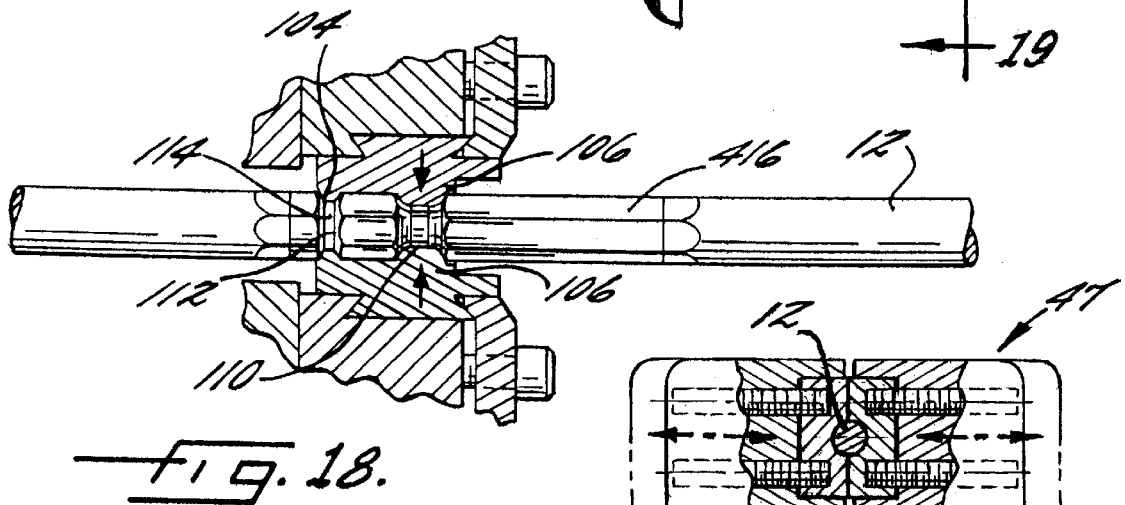
FIG. 18 is a fragmentary cross-sectional view of a portion of the turning head which illustrates the cooperative engagement of the continuous stock material by the turning head dies in order to form a ball groove and chamfered edge on the rear portion of the shank of a spade bit.

According to one embodiment illustrated in FIGS. 8, 17 and 18 and shown in block 529 of FIG. 38B, the turning head 45, such as a turning head manufactured and sold by Eubama Company of Germany, preferably includes a pair of turning head dies 106 and an associated motor 108 which is adapted to rotate the dies about the continuous stock material 12. The turning head is also adapted to advance the dies in a radially inward direction so as to machine predetermined features into the continuous stock material. For example, the turning head dies can be shaped so as to machine a ball groove 110 within the hexagonally shaped rear portion 416 of the shank 412 of a spade bit 410. In addition, the turning head dies can be shaped so as to machine a chamfered edge 112 on the rearmost portion of the shank of a spade bit. In forming the chamfered edge on the rearmost portion of the shank of the spade bit, the turning head and, in particular, the turning head dies can also form a groove 114 having a sidewall which extends perpendicular to the longitudinal axis of the continuous stock material. As described hereinbelow and as shown in FIG. 3B, the sidewall can thereafter serve as the registration feature 104 during subsequent forming operations. As shown in FIGS. 8 and 17, the turning head can also include one or more blowers 49 which direct a stream of air past the stock material so as to remove the chips and other debris prior to further processing the stock material.

During the initial forming operation depicted in blocks 518–528, several additional operations can be performed concurrently by the forming method and apparatus 10 of the present invention. These concurrently performed operations are performed, however, on different ones of the parts into which the continuous stock material 12 is formed. In addition, the types of concurrently performed operations will vary depending upon the type of part which is fabricated. For a forming method and apparatus adapted to fabricate a plurality of spade bits 410 from a continuous stock material, however, the spur portion 430 of a first spade bit can be trimmed at the same time as the outer diameter of another spade bit is trimmed. As described hereinbelow, the continuous stock material is still interconnected during these trimming operations. Downstream of and concurrent with these trimming operations, the continuous stock material can be separated into a plurality of discrete parts and, if desired, can be subjected to in-line heat treating either before or after separating the continuous stock material into a plurality of discrete parts.

In order to trim the spur portion 430 of a spade bit 410, the forming method and apparatus 10 of the present invention includes a spur trimming station 116 through which the continuous stock material 12 passes following the forging operations. As shown in FIGS. 35 and 36, the spur trimming station includes a spur trimming station platform 118 and a positioner for controllably positioning the spur trimming station platform such that the appropriate portions of a respective part will be trimmed. While the spur trimming station could be positioned in a variety of manners, such as with an AC servomotor and an associated ballscrew, without departing from the spirit and scope of the present invention, the positioner of one embodiment includes a hydraulic cylinder assembly 120 including a cylinder 122 and a piston rod 124 which is operably connected to the spur trimming station platform.

As shown in FIG. 36, the spur trimming station 116 also preferably includes a registration monitor 126, such as a photoelectric eye or sensor, which monitors the continuous stock material 12 during the intermittent advancement of the continuous stock material by the indexer 14. The registration monitor is adapted to detect each registration feature 104 defined by the continuous stock material as the continuous stock material is advanced. The spur trimming station also includes a position monitor 128, such as an MTS TEMPOSONICS® LP position sensing system, for monitoring the position of the spur trimming station platform 118.

Both monitors are operably connected to the controller 30. The controller is also operably connected to the indexer monitor 28 so as to determine the additional distance by which the indexer 14 advances the continuous stock material 12 following the detection of the registration feature 104 by the registration monitor 126. Based thereupon, the controller can precisely determine the proper position for the spur trimming station platform 118 during the subsequent trimming operations.

Once the intermittent advance of the continuous stock material 12 has been terminated and the upstream turning head clamp 44 has securely gripped the continuous stock material, the positioner, under control of the controller 30, can position the spur trimming station platform 118 in a predetermined spaced relationship from the registration feature 104 which was identified by the registration monitor 126 during the most recent advancement of the continuous stock material, as shown in blocks 536–542 of FIG. 55D. In order to facilitate this movement of the spur trimming station platform, the spur trimming station 116 can include a number of slides 130 which cooperate with a pair of longitudinally extending, parallel rails or tracks 132, as shown in FIGS. 35 and 36.

The spur trimming station 116 also includes a pair of opposed spur trim clamps 134 and a pair of opposed spur trim punches 136, all of which are mounted upon the spur trimming station platform 118. Accordingly, once the spur trimming station platform has been appropriately positioned, the controller 30 can extend the opposed spur trim clamps so as to securely hold the stock material 12 in the desired position, as shown in block 544 of FIG. 55D. Each of the opposed spur trim clamps preferably has a contact surface which substantially matches the predetermined shape of the part which is being trimmed, such as the blade portion of a spade bit in one advantageous embodiment.

Figure 3C:
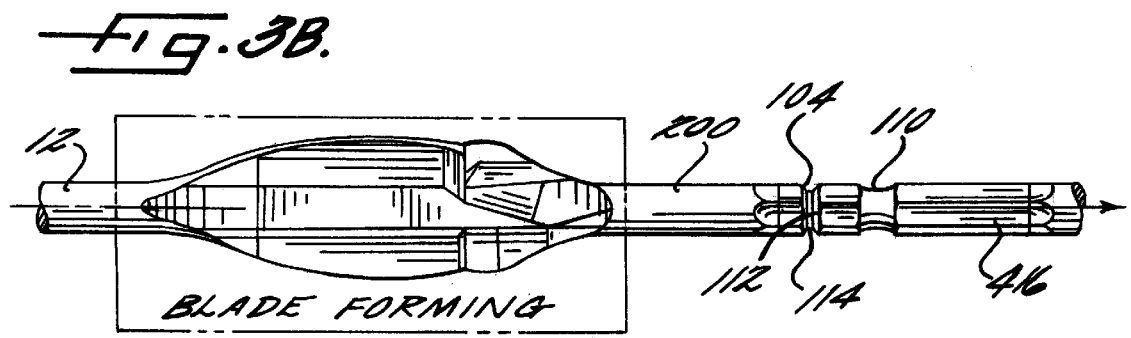
Figure 3D:
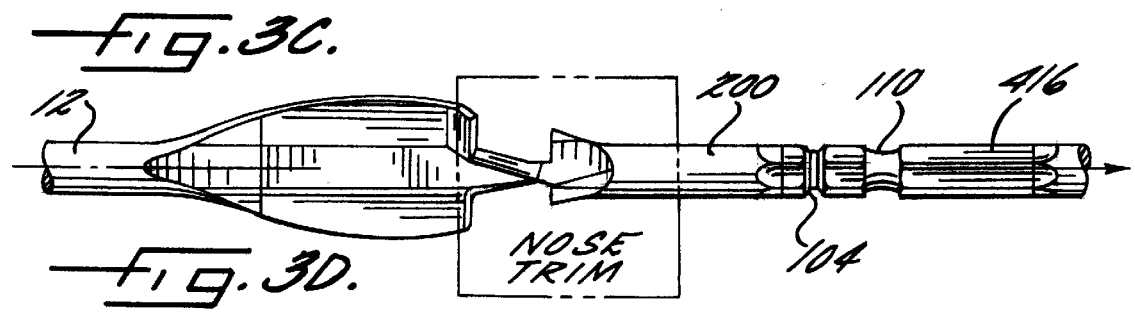

As shown in block 546, the controller 30 can thereafter extend the opposed spur trim punches so as to selectively remove undesirable portions of the continuous stock material 12. In particular, the spur trim punches are preferably extended past the continuous stock material so as to remove flash and other undesirable portions of the continuous stock material in the vicinity of the spur. Once these undesirable portions have been removed, the spur of the resulting spade bit is more sharply defined as shown in FIG. 3D. As also illustrated in FIG. 3D, however, the spade bit remains attached to other portions of the continuous stock material during the trimming process. Following extension of the spur trim punches, the controller retracts the spur trim punches and the spur trim clamps and the trimmed portions are removed, such as by blowing air or an air/oil mixture thereover for a predetermined period of time, as shown in blocks 548–552. Thereafter, the positioner, operating under control of the controller, can reposition the spur trimming station platform 118 at a predetermined initial or rest position.

Concurrent with the trimming of the spur of one spade bit, the forming method and apparatus 10 of one advantageous embodiment of the present invention also trims the outer diameter of another spade bit. As described above in conjunction with the spur trimming station 116, the forming method and apparatus of the present invention includes a outer diameter trimming station 138 through which the continuous stock material 12 extends. According to the present invention, the outer diameter trimming station includes an outer diameter trimming station platform 140 and a positioner for controllably positioning the outer diameter trimming station platform such that the appropriate portions of a respective part will be trimmed. While the outer diameter trimming station could be positioned in a variety of manners, such as via an AC servomotor and an associated ballscrew, without departing from the spirit and scope of the present invention, the positioner of one embodiment includes a hydraulic cylinder assembly 142 including a cylinder 144 and a piston rod 146 which is operably connected to the outer diameter trimming station platform.

As shown in FIG. 36, the outer diameter trimming station 138 also preferably includes a registration monitor 148, such as a photoelectric eye or sensor, which monitors the continuous stock material 12 during the intermittent advancement of the continuous stock material by the indexer 14. The registration monitor detects each registration feature 104 defined by the continuous stock material as the continuous stock material is advanced. The outer diameter trimming station also includes a position monitor 150, such as an MTS TEMPOSONICS® LP position sensing system, for monitoring the position of the outer diameter trimming station platform 140. As described above in conjunction with the spur trimming station 116, both monitors are operably connected to the controller 30 such that the controller can precisely determine the location of the registration feature and the relative position of the outer diameter trimming station platform.

Figures 55E, 55F:
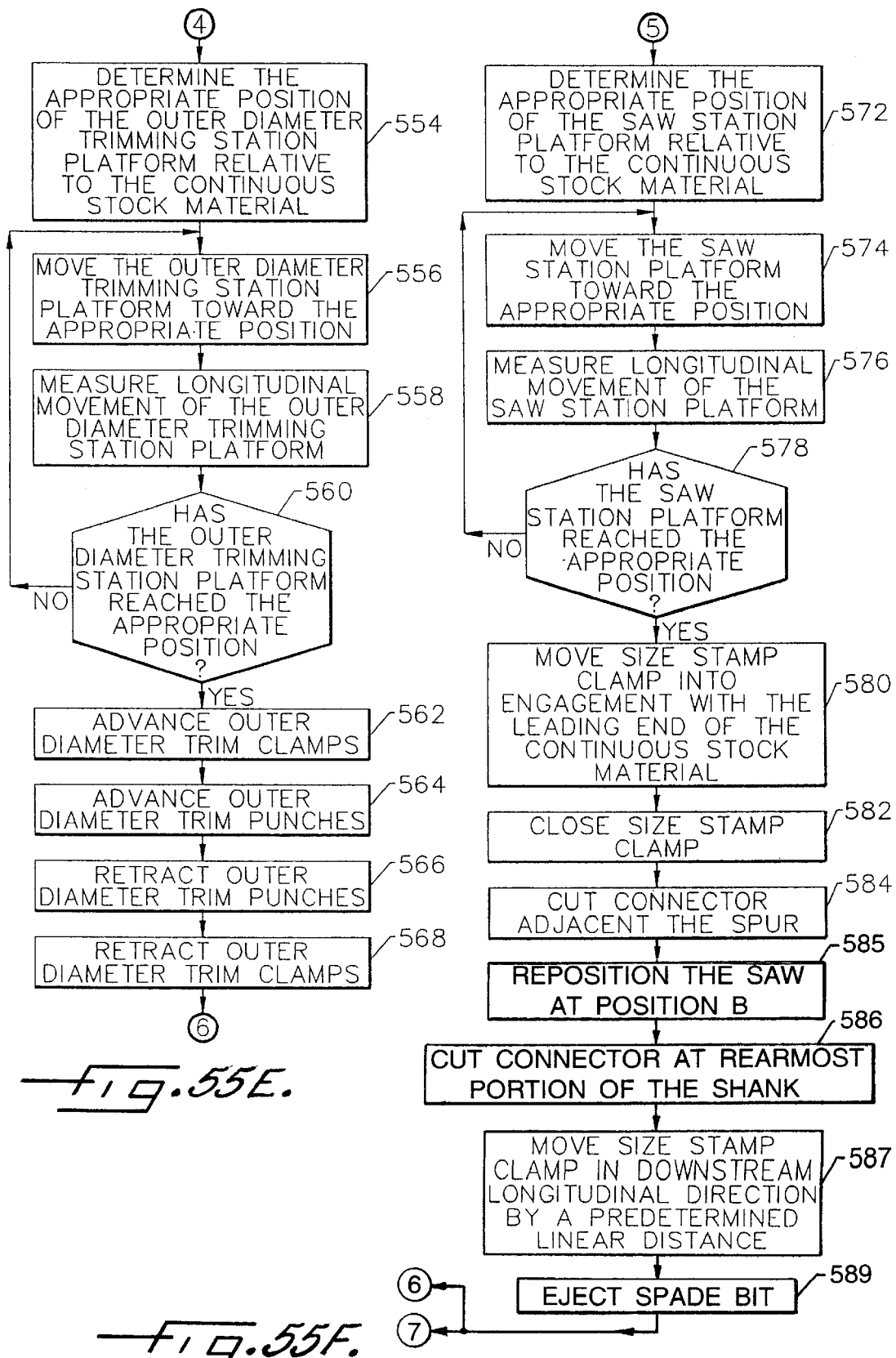
Figure 55G:
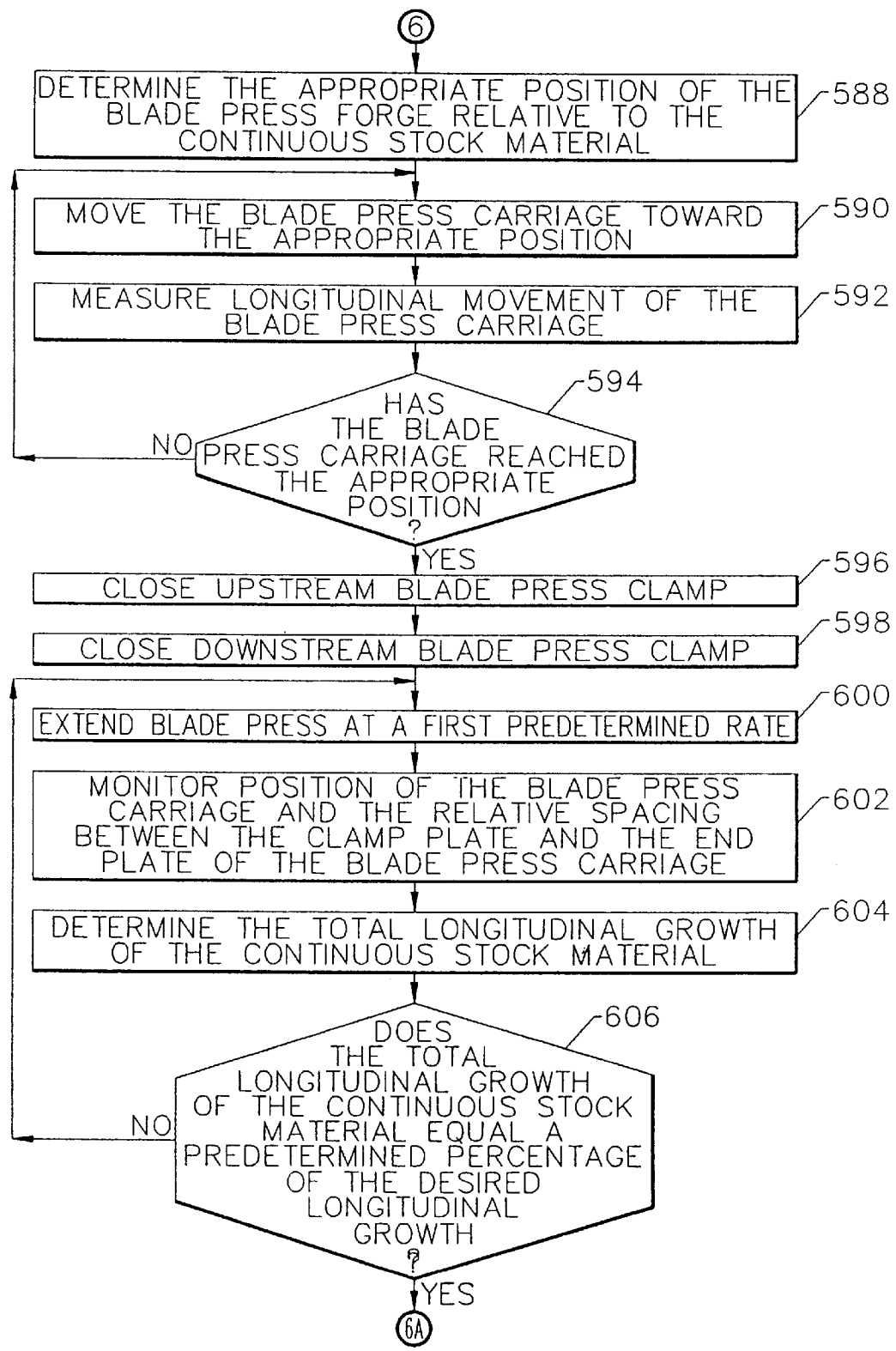

Once the intermittent advance of the continuous stock material 12 has been terminated and the upstream turning head clamp 44 has securely gripped the continuous stock material, the positioner, under control of the controller 30, can position the outer diameter trimming station platform 140 in a predetermined spaced relationship from the registration feature 104 which was identified by the registration monitor 148 during the most recent advancement of the continuous stock material, as shown in blocks 554–560 of FIG. 55E. In order to facilitate this movement of the outer diameter trimming station platform, the outer diameter trimming station 138 can include a number of slides 152 which ride upon and cooperate with a pair of longitudinal extending, parallel rails or tracks 154.

The outer diameter trimming station 138 also includes a pair of opposed outer diameter trim clamps 156 and a pair of opposed outer diameter trim punches 158, all of which are mounted upon the outer diameter trimming station platform 140. Accordingly, once the outer diameter trimming station platform has been appropriately positioned, the controller 30 can extend the opposed outer diameter trim clamps so as to securely hold the stock material 12 in the desired position, as shown in block 562 of FIG. 55E. Each of the opposed outer diameter trim clamps preferably has a contact surface which substantially matches the predetermined shape of the part which is being trimmed, such as the blade portion of a spade bit in one advantageous embodiment.

Figure 3E:
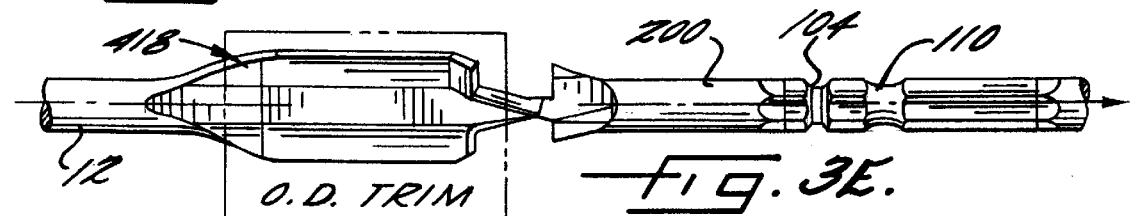

As shown in block 564, the controller 30 can thereafter extend the opposed outer diameter trim punches 150 so as to selectively remove undesirable portions of the continuous stock material 12. In particular, the outer diameter trim punches are preferably extended past the continuous stock material so as to remove flash and other undesirable portions of the continuous stock material along the outer diameter of the part. Once these undesirable portions have been removed, the outer diameter of the resulting spade bit is more sharply defined as shown in FIG. 3E. As also illustrated in FIG. 3E, however, the spade bit remains attached to other portions of the continuous stock material during the trimming process. Following extension of the outer diameter trim punches, the controller retracts the outer diameter trim punches and the outer diameter trim clamps, as shown in blocks 566–570. As shown in FIGS. 35 and 36, air or a mixture of air and oil can be blown over the trimmed part in order to remove the scrap material once the outer diameter trim punches and the outer diameter trim clamps have been retracted.

Downstream of both the spur trimming and outer diameter trimming stations, the forming apparatus 10 of this embodiment can include a saw station 160 for separating the continuous stock material 12 into discrete parts. As described above in conjunction with the spur trimming and outer diameter trimming stations and as shown in FIGS. 35 and 36, the saw station preferably includes a saw station platform 161 and an associated positioner for controllably positioning the saw station such that the appropriate portion of the continuous stock material will be cut. While the saw station could be positioned in a variety of manners, such as with an AC servomotor and an associated ballscrew, without departing from the spirit and scope of the present invention, the positioner of one embodiment includes a hydraulic cylinder assembly including a cylinder 164 and a piston rod 166 which is operably connected to the saw station platform.

The saw station 160 also preferably includes a registration monitor 168, such as a photoelectric eye or sensor, for monitoring the continuous stock material 12 during the intermittent advancement of the stock material. The registration monitor detects each registration feature 104 defined by the continuous stock material as the continuous stock material is intermittently advanced. The saw station also preferably includes a position monitor 170, such as an MTS TEMPOSONICS® LP position sensing system, for monitoring the position of the saw station platform 161. As described above in conjunction with the spur trimming station 116, both monitors are operably connected to the controller 30 such that the controller can precisely determine the location of the registration feature and the relative position of the saw station platform.

Once the intermittent advancement of the continuous stock material 12 has been terminated and the upstream turning head clamp 44 has securely gripped the continuous stock material, the positioner, under control of the controller 30, can position the saw station platform 161 in a predetermined spaced relationship from the most recently identified registration feature 104, as shown in blocks 572–578 of FIG. 55F. In order to facilitate movement of the saw station platform, the saw station 160 can also include a number of slides 172 which ride upon and cooperate with a pair of longitudinally extending, parallel rails or tracks 154.

Referring now to FIGS. 35, 36, 38–40, 43 and 44, the forming apparatus 10 of the present invention can also include a size stamp station 176 which includes one or more size stamp clamps 178. The size stamp station also includes a positioner 181, responsive to the controller 30, for controllably positioning the size stamp platform 180. In one embodiment, the positioner includes a stepper motor 183 which is operably connected to a lead screw 184 for controllably advancing and retracting the lead screw through a nut assembly 186. Since the nut assembly is also operably connected to the size stamp platform, rotational movement of the lead screw also moves the size stamp platform. According to one embodiment, the stepper motor includes a resolver, operably connected to the controller, for monitoring and controlling the position of the size stamp platform. However, the positioner can controllably position the size stamp station according to other techniques without departing from the spirit and scope of the present invention.

According to one advantageous embodiment, the saw station 160 and the size stamp station 176 are initially positioned at their respective home or rest positions as shown in FIG. 38. After the continuous stock material 12 has been indexed and the saw station has been repositioned based upon the registration feature as described above, the size stamp platform 180 is advanced by the positioner in an upstream longitudinal position as shown in FIG. 39. As shown in block 580, the positioner preferably advances the size stamp platform in an upstream longitudinal direction until the free or leading end of the continuous stock material is received within the size stamp clamps 178. In the illustrated embodiment, the size stamp platform is advanced in an upstream longitudinal direction until the blade portion of the leading spade bit is received within the size stamp clamps.

As shown in FIG. 41, each size stamp clamp 178 includes a size stamp die assembly comprised of a die assembly which includes an alignment fixture 190, such as a spider, and a plurality of size stamp dies 188 which are held within the alignment fixture. The size stamp clamp can also include a closure 192 which is adapted to receive the size stamp die assembly. The size stamp station 176 can also include means, such as a hydraulic cylinder assembly 194 which operates under control of the controller 30, for urging the closure over the size stamp die assembly such that the size stamp dies are closed about the leading end of the continuous stock material as shown in block 582 of FIG. 55F.

The size stamp dies 188 preferably have a shape which matches the shape of the part to be held by the size stamp clamp 178, such as the shape of the blade portion 418 of a spade bit 410. The size stamp dies also preferably include one or more raised numerals for imprinting the size of the respective spade bit upon the blade portion thereof. While size stamp dies are illustrated which are adapted to imprint the size of the respective part upon the part thereon, the size stamp dies need only serve as a clamp for holding or gripping the leading end of the continuous stock material 12. Thus, the size stamp dies may have a shape which matches the shape of the part to be held, but need not include the raised numerals described above.

Figure 3F:
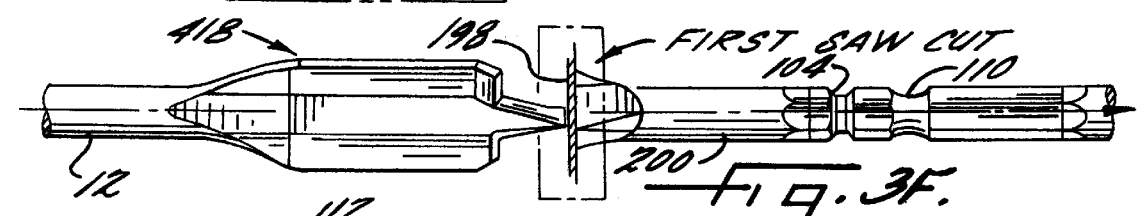
Figure 3G:
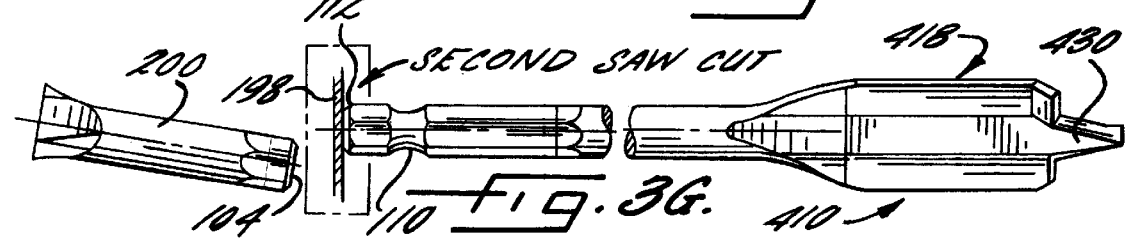

While the blade portion 418 of the spade bit 410 is held by the size stamp clamp 178, the controller 30 can advance the saw 198 toward the continuous stock material 12 so as to cut through the continuous stock material at a location proximate the forward end of the spade bit, i.e., at a location proximate the spur tip, as designated A in FIGS. 39 and 42. As shown in dashed lines in FIG. 37, the saw is rotatably advanced so as to cut through the continuous stock material, thereby separating the leading part from the remainder of the continuous stock material, as shown in FIG. 3F and in block 584 of FIG. 55F. The saw station 160 can also include a proximity sensor, operably connected to the controller, for detecting the advancement of the saw to a predetermined position. Thereafter, the controller can retract the saw to its initial position as shown in solid lines in FIG. 37.

Once the continuous stock material 12 has been cut and the controller 30 has retracted the saw 198, the positioner of the saw station 160, under control of the controller, moves the saw station in a downstream direction as shown in FIG. 40 and block 585 of FIG. 55F until the saw is aligned with the chamfered edge 112 on the rearmost portion of the shank 412 of the spade bit 410. The saw is then rotatably advanced once again to cut through the continuous stock material at a location proximate the rear of the spade-type boring bit designated B in FIGS. 40 and 42. See also FIG. 3G and block 586 of FIG. 55F. As a result of the cuts made at locations designated A and B in the illustrated embodiment, the connector 200 is also separated from the continuous stock material and from the leading part. Upon indexing the continuous stock material, the piece of scrap will be discharged from the saw station and can be directed through a chute 187 to a bin or the like, as indicated in FIG. 39.

Thereafter, the positioner of the size stamp station 176, under control of the controller 30, moves the size stamp platform 180 in a downstream direction as shown in FIG. 43 and in block 587 of FIG. 55F. Preferably, the size stamp station platform is moved in a downstream longitudinal direction by a linear distance which exceeds the longitudinal growth of the continuous stock material 12 in the downstream longitudinal direction during one sequence of forming operations. For example, the size stamp station can be moved in a downstream longitudinal direction by the expected amount of longitudinal growth of the continuous stock material in the downstream direction plus a predetermined additional amount, such as 0.100 inch. As shown in FIG. 38, the size stamp platform can be moved from an upstream position as depicted in dashed lines to a downstream position as depicted in solid lines.

Accordingly, additional portions of the continuous stock material 12 can now be forged without contacting the discrete part held by the size stamp clamp 178. Thus, the forming method and apparatus 10 of the present invention can continue to process the discrete part held by the size stamp clamp while forming additional portions of the continuous stock material at the same time. Once the size stamp station 176 has completed stamping operations, the size stamp station can eject the stamped part which may be directed by means of a chute 189, conveyor or the like to a bin as shown in FIGS. 43 and 44 and in block 589 of FIG. 55F. Although the size stamp station can eject the stamped part in a variety of manners, the size stamp station of the illustrated embodiment includes a kicker rod 191 which can be spring extended so as to eject the stamped part once the size stamp dies 188 have been opened.

As shown in FIGS. 45 and 46, the forming method and apparatus 10 of the present invention need not include separate stations for trimming the outside diameter of the resulting part and for sawing or otherwise separating the resulting part from the remainder of the continuous stock material 12. Instead, the forming method and apparatus of another embodiment of the present invention include a trimmer, such as an outside diameter trimming station 138, and a separator, such as a snipping station 400, mounted upon a common platform 402 so as to move together in a longitudinal direction. As shown in FIGS. 45 and 46, for example, the outside diameter trimming station and a snipping station can be mounted upon a common platform. The platform can include a plurality of slides 152 mounted upon a pair of longitudinal extending rails 406 such that the platform which carries the outside diameter trimming station and the snipping station can be moved longitudinally.

The combined trimming and separating station includes a hydraulic actuator including a cylinder 415 and a piston rod 417 for appropriately spacing the outer diameter trimming station 138 and the snipping station 400. In this regard, the snipping station preferably includes a movable platform 401 mounted upon a support platform 402 and adapted to be moved in a longitudinal direction relative to the support platform and, more particularly, relative to the outer diameter trimming station. Based upon the predetermined spacing and size of the parts, the controller 30 can direct the hydraulic actuator to position the movable platform such that a leading port can be snipped, while a trailing part is trimmed. As shown in FIG. 45, the combined trimming and snipping station can include a support 402a, such as a hydraulic spring, for supporting the cantilevered snipping station.

As described above in conjunction with the outside diameter trimming station 138, the combined trimming and snipping station also includes a positioner for controllably positioning the platform 402 such that the appropriate portions of the respective part will be trimmed and snipped. While the platform could be positioned in a variety of manners, such as via an AC servomotor and an associated ball screw, without departing from the spirit and scope of the present invention, the positioner of one embodiment includes a hydraulic cylinder assembly including a cylinder 408 and a piston rod 409 which is operably connected to the platform. The combined trimming and snipper station also preferably include a registration monitor 148, such as a photoelectric eye or sensor, which monitors the continuous stock material 12 during the intermittent advancement of the continuous stock material by the indexer 14. As described above, the registration monitor detects each registration feature 104 defined by the continuous stock material as the continuous stock material is advanced. The combined trimming and snipper station also includes a position monitor 405, such as an MTS Temposonics® LP position sensing system, for monitoring the position of the platform. As also described above, both the registration monitor and the position monitor are operably connected to the controller 30 such that the controller can precisely determine the location of the registration feature and the relative position of the platform and, in turn, the relative positions of the outside diameter trimming station 138 and the snipping station 400 carried by the platform.

Once the intermittent advance of the continuous stock material 12 has been terminated and the upstream turning head clamp 44 has securely gripped the continuous stock material, the positioner, under control of the controller 30 can position the platform 402 in a predetermined spaced relationship to the registration feature 104 which is identified by the registration monitor 148 during the most recent advancement of the continuous stock material. As described above, the controller can then extend the opposed outer diameter trim clamps 156 so as to securely hold the stock material in the desired position while the opposed outer diameter trim punches 158 are thereafter extended so as to selectively remove undesirable portions of the continuous stock material. Following extension of the outer diameter trim punches, the controller retracts the outer diameter trim punches and the outer diameter trim clamps.

While the outside diameter trimming station 138 trims one part, the snipping station 400 preferably snips another part since the controller 30 has already properly spaced the outside diameter trimming station and the snipping station based upon the spacing and the size of the parts. As shown in FIG. 45, the snipping station includes a pair of snip dies 422 having a pair of cutting edges that are longitudinally spaced apart. The controller 30 can therefore extend the pair of snip dies which separate the continuous stock material 12 at the locations designated C and D in FIG. 47. In the illustrated embodiment in which the forming method and apparatus 10 forms a plurality of spade-type boring bits 410, the snipping station 400 can be configured to separate or snip the continuous stock material at a location designated C proximate the forward end of the spade bit, i.e., proximate the spur tip, and at a location designated D proximate the chamfered edge 112 on the rearmost portion of the shank 412 of the spade bit to thereby create scrap 200a. Once the continuous stock material has been separated at the locations designated C and D, the controller retracts the snip dies to permit further indexing of the continuous stock material.

By mounting the outside diameter trimming station 138 and the snipping station 400 on a single platform 402, the forming method and apparatus 10 of this embodiment is simplified since only a single positioner, a single registration monitor 148 and a single position monitor 405 are required for precise movement and alignment of the outside diameter trimming and snipping station. In addition, by utilizing the snipping station, the continuous stock material can be simultaneously separated at two different locations designated C and D without having to separately reposition the saw or cutter at each of the locations as described above. However, the snipping station can include means other than snip dies, such as a pair of saw blades or the like, for simultaneously cutting the continuous stock material at two spaced apart locations, i.e., at locations designated C and D.

Prior to separating the leading part from the continuous stock material 12, the free end of the leading part is preferably grasped by the size stamp clamps 178 of a size stamp station 176. In this regard, the size stamp station also includes a positioner 181, responsive to the controller 30, for controllably positioning the size stamp platform 180. In one embodiment, the positioner includes a stepper motor 183 which is operably connected to a lead screw 184 for controllably advancing and retracting a lead screw through a fixed nut 186. Since the nut assembly is also operably connected to the size stamp platform, rotation of the lead screw also moves the size stamp platform. As will be apparent, however, the positioner can controllably position the size stamp station according to other techniques without departing from the spirit and scope of the present invention.

Once the continuous stock material 12 has been appropriately indexed, the controller directs the positioner 181 to advance the size stamp station 176 in an upstream direction such that the free end of the leading part is received within the size stamp clamps 178. In the illustrated embodiment, the size stamp platform 180 is advanced in an upstream longitudinal direction until the blade portion of the leading spade bit is received within the size stamp clamps.

As described above, each size stamp clamp 178 generally includes a size stamp die assembly which includes an alignment fixture, such as a spider, and a plurality of size stamp dies which are held within the alignment fixture. By closing the size stamp die about the free end of the continuous stock material, the size stamp die can stamp the free end of the continuous stock material with the size of the respective part as also described above.

Once the snipping station 400 has separated the leading part from the remainder of the continuous stock material 12 and the snipping dies 422 have been retracted, the positioner 181 can move the size stamp station 176 in a downstream longitudinal direction. In the illustrated embodiment, the size stamp platform 180 is mounted upon a turret adapted for rotational motion. While the size stamp platform can be rotated in a variety of manners, the size stamp platform of one embodiment includes a rotary actuator 650, such as shown in FIG. 48. As will be apparent to those skilled in the art, the rotary actuator includes a dual ended cylinder 652a, 652b that can be pneumatically actuated in order to move a rack relative to a pinion gear 654a which, in turn, rotates the upstanding post 654 upon which the size stamp platform is mounted. As such, the controller 30 preferably not only directs the positioner to move the size stamp station in a downstream longitudinal direction, but also directs that the rotary actuator be pneumatically actuated so as to rotate the size stamp platform through a predetermined angle, such as through about 180° in the typical embodiment.

The forming apparatus 10 of this embodiment also includes a saw station 656 disposed downstream of the size stamp station 176 for cutting the resulting part to length. In the illustrated embodiment in which spade-type boring bits 410 are fabricated, the controller 30 preferably rotates and longitudinally advances the size stamp platform in a downstream longitudinal direction until the saw blade 657 is aligned with the chamfered edge 112 on the rearmost portion of the shank 412 of the spade bit. The controller then halts further movement of the size stamp platform and actuates the saw station.

Figure 49:
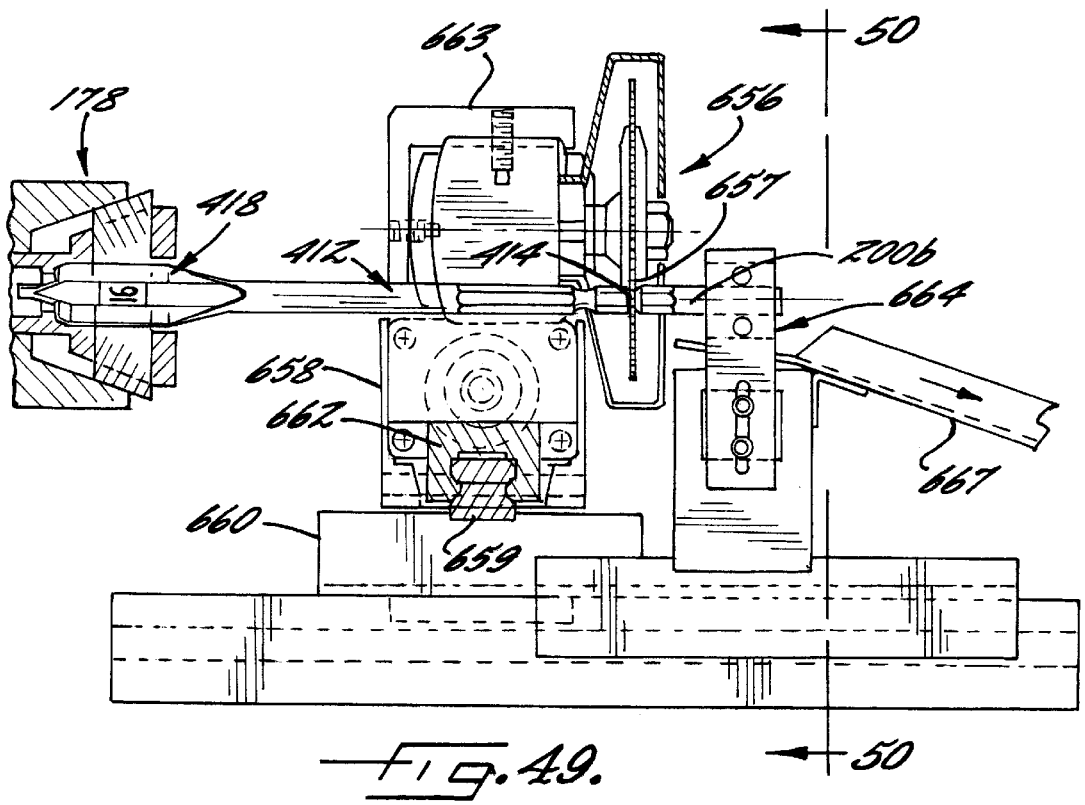
FIG. 49 is a fragmentary cross-sectional side elevational view of the saw station as depicted more generally in FIGS. 45 and 46 and as taken along line 49—49 of FIG. 46.
Figure 50:
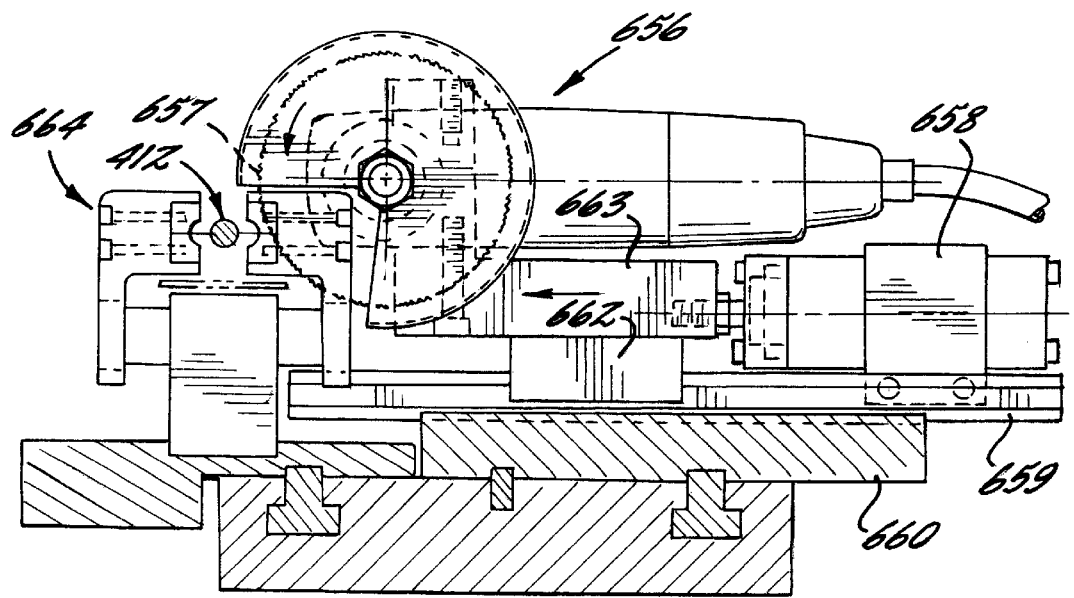
FIG. 50 is a fragmentary cross-sectional view of the saw station shown generally in FIGS. 45 and 46 taken along line 50—50 of FIG. 49 which illustrates the manner in which the saw station advances into and out of the path of the continuous stock material.

As shown in FIGS. 49 and 50, the saw station 656 is adapted to move in a direction generally perpendicular to the continuous stock material 12. In this regard, the saw station 656 generally includes a pair of slides 662 which ride upon a rail 659 mounted to a fixed platform 660. In addition, the saw station includes a positioner, such as a hydraulic or pneumatic actuator 658, for moving a saw mounting bracket 663 which holds the saw, including the saw blade 657, such that the saw blade can also be moved toward and away from the continuous stock material. Finally, the saw station can include a saw clamp 664 for holding the continuous stock material during sawing operations to prevent movement of the stock material. Thus, once the size stamp platform 176 has appropriately aligned the part with the saw blade 657 and the saw clamp has engaged the continuous stock material, the controller 30 can direct the positioner to laterally advance the saw platform such that the saw cuts through the continuous stock material at the desired location to create scrap 200b that falls upon and is removed via conveyor 667 once the saw clamp is opened. Thereafter, the saw can be retracted. As such, the rearmost portion of the spade-type boring bit 410 can be formed by cutting the spade-type boring bit at a location designated E in FIG. 47. Following cutting operations, the size stamp station opens the size stamp clamps 178 such that the resulting part, such as the resulting spade bit, is released from the size stamp clamp and falls into a chute 665, a conveyor or the like for collection in a bin for subsequent processing. As described above, the size stamp station can also include a spring actuated kicker rod for ejecting the resulting part following the sizing operations, if so desired.

Although the forging method and apparatus 10 has been described hereinabove to include a single indexer 14 disposed upstream of the forge 50 for pushing the continuous stock material 12 along the predetermined path, the forming method and apparatus can also include a downstream indexer for intermittently pulling the continuous stock material in the downstream direction. In contrast to the upstream indexer, the downstream indexer is disposed downstream of the forge. However, the upstream and downstream indexers are synchronized in this embodiment so as to work together to longitudinally advance the continuous stock material in the downstream direction along the predetermined path. In this regard, the upstream and downstream indexers are preferably synchronized such that the upstream and downstream indexers concurrently push and pull the continuous stock material in the downstream direction. In addition, the upstream and downstream indexers are also preferably synchronized so as to intermittently push and pull the continuous stock material by the same predetermined distance in the downstream direction.

Although the downstream indexer can be constructed to be the same or similar as the upstream indexer 14 described hereinabove, the forming method and apparatus 10 of one advantageous embodiment utilizes the spur trimming station 116, the outer diameter trimming station 138 or both stations as the downstream indexer. In this regard, the controller 30 preferably indexes continuous stock material by directing not only the indexer clamp 16, but also the spur trim clamps 134 and/or the outer diameter trim clamps 156 to be extended and grip the continuous stock material. In order to grip the appropriate portions of the continuous stock material, the controller must have previously repositioned the indexer, the spur trimming station and the outer diameter trimming station to their respective upstream home positions prior to engaging the continuous stock material. Once the continuous stock material has been engaged, the controller of this embodiment preferably directs the positioners of the indexer, the spur trimming station and the outer diameter trimming station to simultaneously move the indexer, the spur trimming station and the outside diameter trimming station in a downstream direction at the same rate for the same predetermined distance. As such, the forming method and apparatus of this advantageous embodiment will concurrently push and pull the continuous stock material along the predetermined path and, in the illustrated embodiment, through the forges. By both pulling and pushing the continuous stock material, the continuous stock material will be less likely to be bent, kinked, or otherwise damaged during the indexing process. Once the continuous stock material has been indexed by the predetermined distance, the controller directs the indexer clamp, the spur trim clamps and the outer diameter trim clamps to release the continuous stock material such that the forming operations can proceed as described above.

Figure 24:
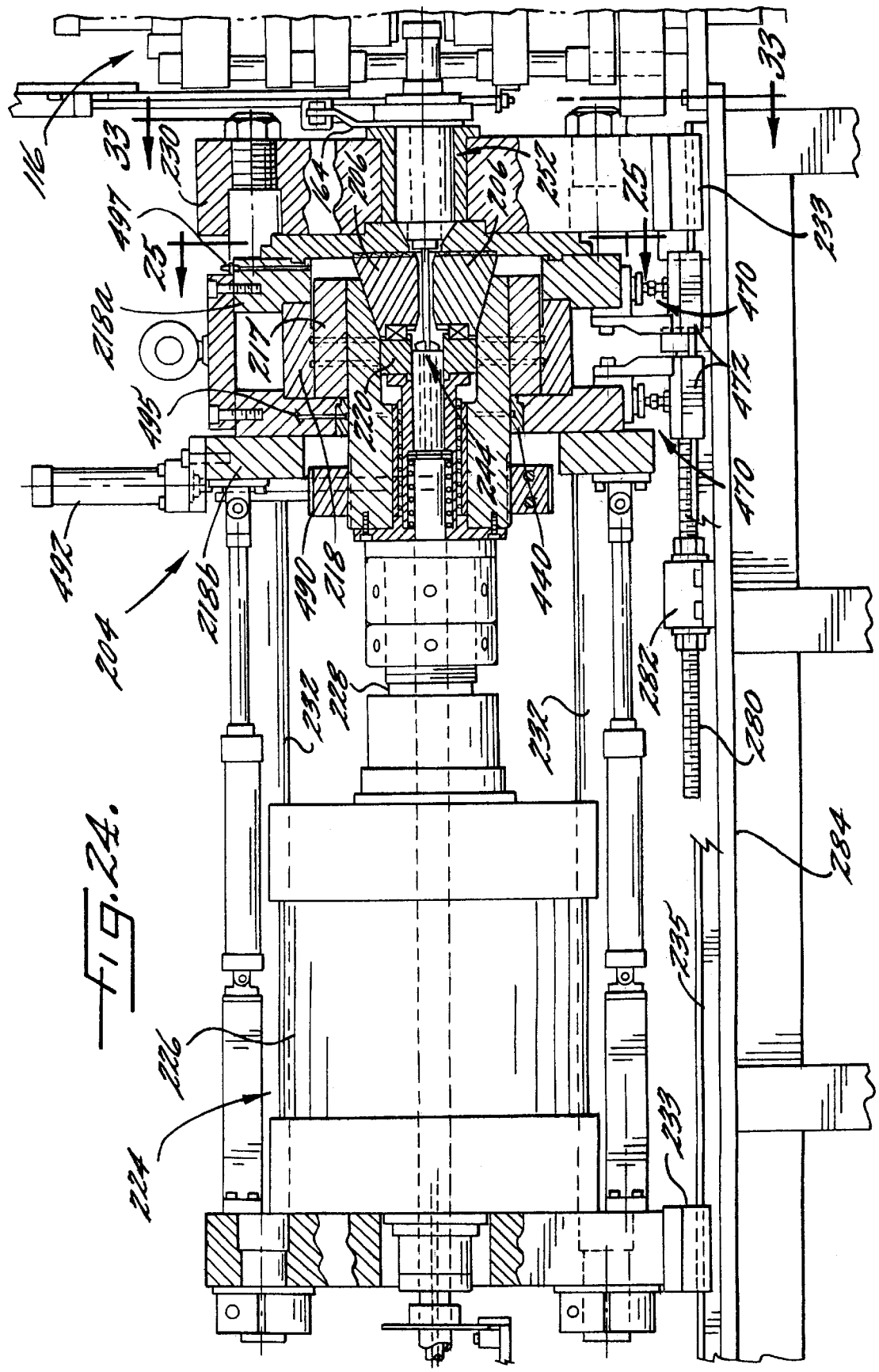
FIG. 24 is a fragmentary cross-sectional side elevational view of the blade press forge of one embodiment of the present invention wherein the forging dies are in the open position.
Figure 27:
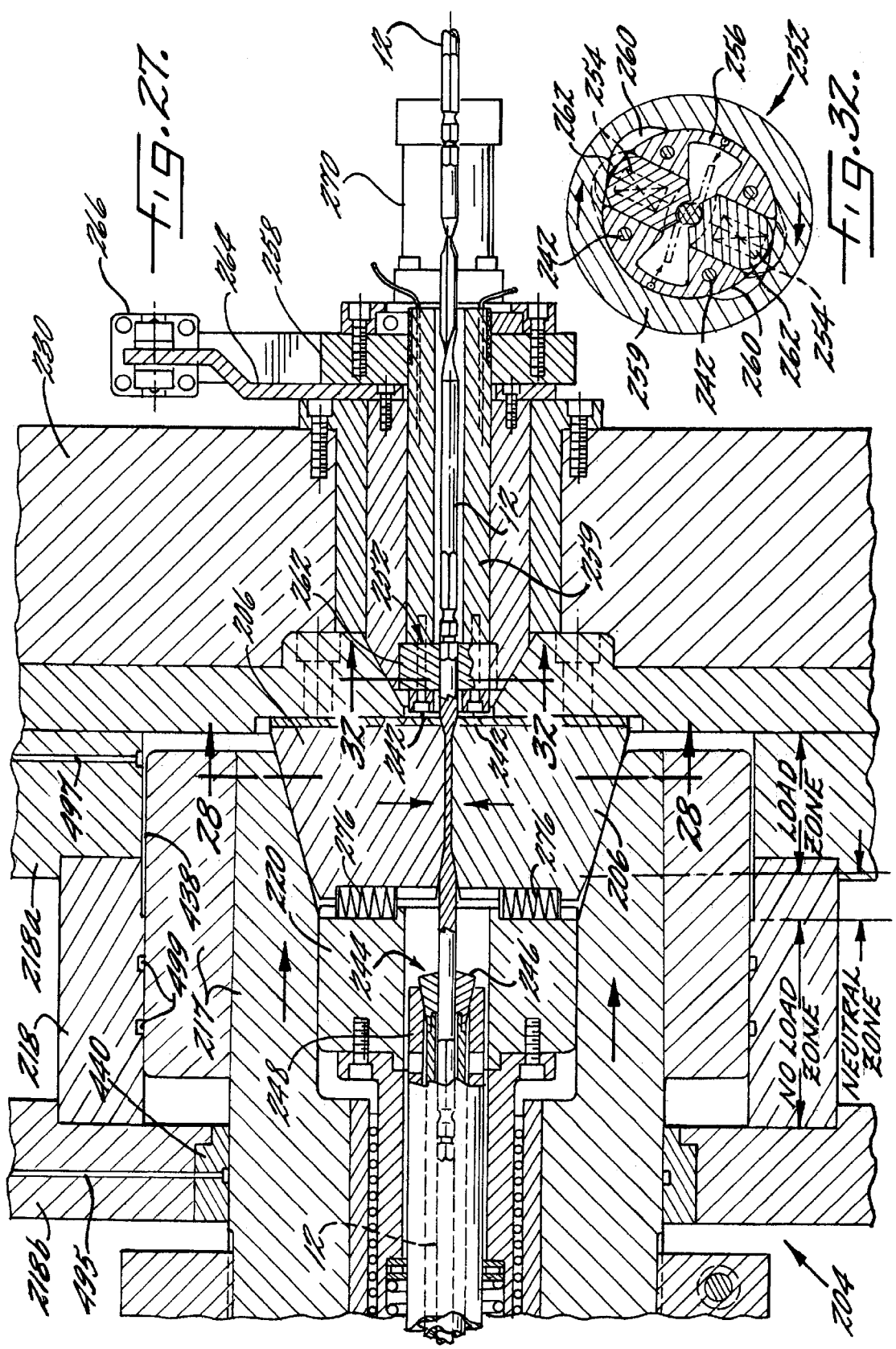
FIG. 27 is an enlarged fragmentary cross-sectional side view of a portion of the blade press forge illustrated in FIG. 24 which depicts the plurality of forging dies in an at least partially closed or operative position and which also depicts the upstream and downstream blade press clamps in a closed position.

As mentioned above, the forming apparatus 10 of the present invention can include one or more additional forges, such as a second forge 204 for forming another portion of the continuous stock material 12 into a second predetermined shape, as shown in detail in FIGS. 20, 24 and 27. Thus, the parts formed by the forming method and apparatus of the present invention can include both the first and second shapes imparted by the first and second forges, respectively, at different stages along the forming process. As described above in conjunction with the hex forge 50, the second forge of one advantageous embodiment preferably includes a blade press forge for forming the blade portion of the resulting spade bits as shown in FIG. 3C. However, the second forge can be adapted to form a variety of different features on one or more portions of other types of parts without departing from the spirit and scope of the present invention.

Although the use of both upstream and downstream indexers serves to reduce the possibility that the continuous stock material 12 will be kinked, the forming method and apparatus 10 can include an alignment detector 465 disposed upstream of the second forge 204. As shown in FIG. 21, the alignment detector can include a forked member 466 having a pair of tongs 467 between which the continuous stock material passes. If the continuous stock material is kinked or otherwise bent, the continuous stock material will contact one of the tongs and cause the forked member to rotate about a pivot point 468. As such, the rotation of the forked member will take the forked member out of contact with a contact sensor 469 which will report the kinked or bent stock material to the controller 30. As such, the controller can halt further forming operations until the continuous stock material has been straightened, thereby preventing the manufacture of imprecise parts and the possible damage to downstream equipment. Although one embodiment of the alignment sensor is illustrated and has been described hereinabove, the alignment sensor can be embodied in many different manners without departing from the spirit and scope of the present invention.

As also described above in conjunction with hex forge 50 and as shown in FIGS. 20, 24 and 27–31, the blade press forge 204 preferably includes a pair of opposed forging dies 206 which cooperate to define a cavity having a predetermined shape. The cavity, in turn, defines the shape of at least a portion of the resulting part, such as the blade portion of the resulting spade bit. With respect to the illustrated embodiment of the forming method and apparatus 10 which is adapted to form spade bits, at least one, and, more preferably, each forging die can include a contact surface 208 of a somewhat Z-shaped configuration which defines a portion of the cavity.

Figure 28:
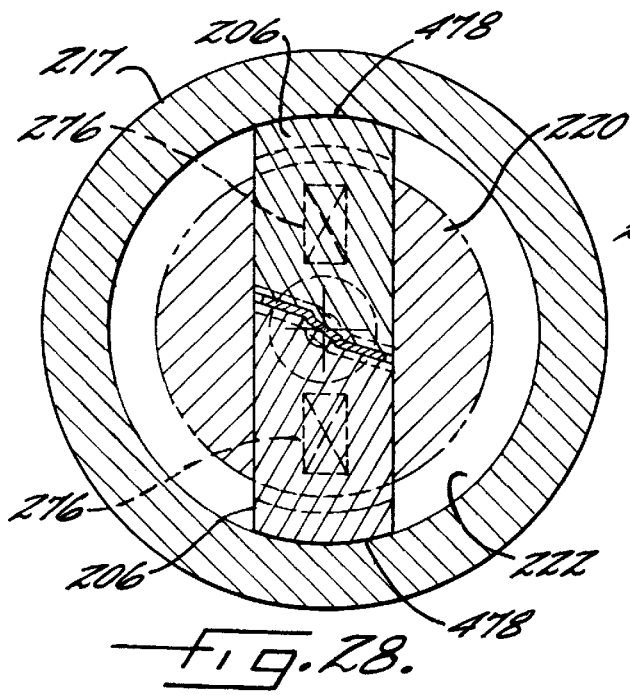
FIG. 28 is a cross-sectional end view of the die assembly including a pair of opposed forging dies and that portion of the ram which defines the die cavity of the blade press forge as taken along the line 28—28 of FIG. 27.
Figure 29:
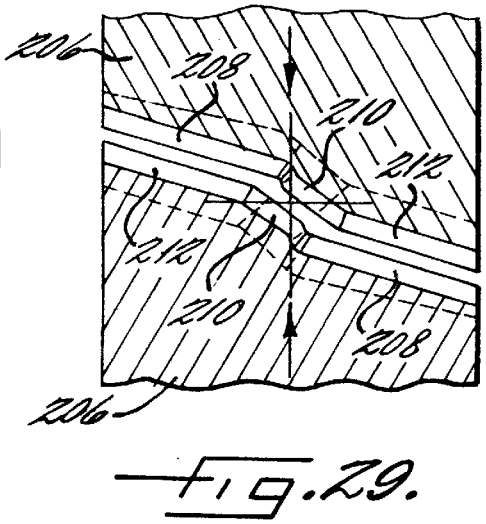
FIG. 29 is a greatly enlarged fragmentary cross-sectional end view of the pair of opposed forging dies of the blade press forge of the embodiment of the present invention illustrated in FIG. 28 wherein the pair of opposed forging dies are in the at least partially closed or operative position.

As shown in FIGS. 28 and 29, the Z-shaped cavity includes a central portion 210 defining a central plane and opposed side portions or wings 212 extending from opposite sides of the central portion. The opposed side portions define respective lateral planes which are oblique to the central plane. The respective contact surfaces 208 of the opposed forging dies 206 contact and shape the workpiece into the predetermined shape of a portion of the resulting part.

The contact surface 208 of at least one forging die 206 defines at least one contact plane which, according to one embodiment, is oblique to the predetermined direction in which the forging dies are closed. For example, as shown in FIGS. 28 and 29, the center portions 210 of the respective contact surfaces are oblique to the predetermined direction in which the forging dies are closed and define respective contact planes. More particularly, an angle is defined between the respective contact planes and a reference plane perpendicular to the predetermined direction in which the forging dies move as shown in FIG. 29. In a preferred embodiment, the angle is between about 10° and about 20° and, in one specific example, is about 15°.

As a result of the oblique orientation of the respective contact planes to the predetermined direction in which the forging dies 206 are closed, the contact planes of the forging dies impart both axial and radial forces to the workpiece which, in turn, result in compressive, tensile and shear stresses within the workpiece during the deformation process. The resulting compressive, tensile and shear force components deform the workpiece outwardly into the predetermined shape defined by the forging dies.

As described above, the application of shear forces to deform a workpiece significantly increases the forces which the forging dies 206 and a surrounding ram 217 must withstand during the forging process. In order to withstand the increased forces, the opposed forging dies and the ram are comprised, in one preferred embodiment, of a high speed steel and, more preferably, are comprised of CPM® REX™ M4 high speed steel, or an equivalent, marketed by Colt Industries Crucible Specialty Metals Division of Syracuse, N.Y.

In addition, the energy required to deform a workpiece with shear forces is generally less than the corresponding energy required to deform a similar workpiece with compressive forces. However, for parts which have a relatively small diameter, such as spade bits having a diameter of about ⅜ inch or less, in which deformation of the workpiece with shear forces will not conserve a significant amount of input energy, the angle 214 defined between the respective contact planes and the reference plane 216 is decreased, or eliminated, such that increasing amounts of compressive force are imparted to the workpiece and the deformation process proceeds effectively, particularly since the working stroke is generally reduced. In these embodiments, however, shear forces can still be imparted, albeit in lesser amounts, by the contact surfaces which include oblique lateral portions such as illustrated by the Z-shaped cavity of FIGS. 28 and 29. For parts with a relatively large diameter, such as spade bits having a diameter of about ⁷⁄₁₆ inch or greater, in which deformation of the workpiece with shear force will conserve a significant amount of input energy, the respective contact planes are preferably disposed at an angle, such as 15°, for example, with respect to the reference plane.

Figure 30:
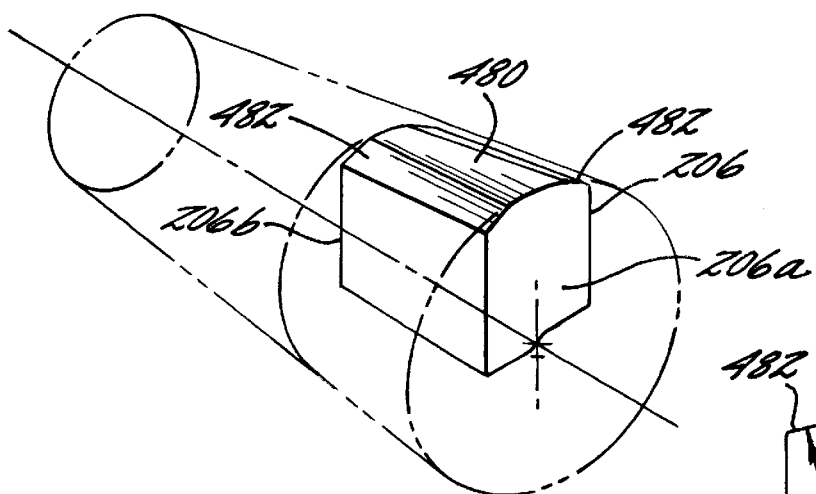
FIG. 30 is a perspective view of a forging die according to one advantageous embodiment of the present invention which illustrates the back surface which includes a conical medial section and a pair of conical lateral sections that are recessed relative to the medial section.
Figure 31:
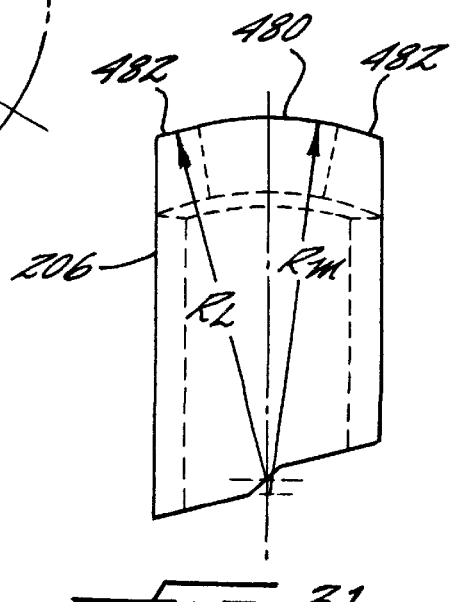
FIG. 31 is a fragmentary end view of the forging die of FIG. 30 illustrating the back surface and, in particular, the respective radii of the conical medial section and the pair of conical lateral sections.

According to one aspect of the present invention, the back surface 478 of the forging dies 206 have also been redesigned to ensure that forces are applied more evenly across the back surface of the die, thereby decreasing the wear of the dies and correspondingly increasing the expected life of the forging dies. In this regard, the back surface of the forging dies includes a medial section 480 and first and second lateral sections 482 disposed in opposite sides of the medial section. As shown in FIG. 30, the medial section has a partial conical shape. In one embodiment, for example, the medial section has a surface defined by a portion of a cone having an included angle of about 30°. Likewise, each lateral section has a partial conical shape. According to the present invention, however, the radius $R_m$ defined by the conical medial section is larger than the radius $R_L$ defined by the conical lateral section at each corresponding location along the length of the forging die. As a result, the first and second lateral sections are recessed relative to the medial section such that forces will be principally applied to the medial section of the back surface in order to urge the forging die into contact with the workpiece. In contrast to prior forging dies in which the forces were applied to a limited area, such as along a line of contact, the forging die of this aspect of the present invention permits forces to be applied across a much wider region, namely, across virtually the entire medial section. By applying the forces across a wider area, the forging die should be forced radially inward in a more even manner and the expected wear on the die should be decreased, thereby increasing the anticipated life of the forging die.

As shown in FIG. 30, the forging die 206 is preferably tapered. In this regard, the height of the forging die as defined between the contact surface 208 and the back surface 478 is preferably greater at a first end 206*a* of the forging die than at an opposed second end 206*b* of the forging die. As a result of the tapered shape of the forging die, the medial section is also tapered. In this regard, the width of the cylindrical medial section is generally greater adjacent the first end of the forging die and is smaller at the second end of the forging die. Thus, the surface of the medial section generally has a trapezoidal shape.

The blade press forge 204 also preferably includes an alignment fixture 220, such as a spider, for maintaining the pair of opposed forging dies 206 in a predetermined aligned relationship during the forging process. The alignment fixture and the pair of opposed forging dies comprise a die assembly which, in one preferred embodiment, is frustoconical in shape.

The blade press forge 204 further includes means, such as a ram 217, for radially closing the opposed forging dies 206. Although the ram can be formed of three or more components as illustrated and described by the '267 patent, the ram can also be formed of two components as shown in FIGS. 24 and 27 or the ram can be integrally formed, as described hereinbelow. In these embodiments, the ram can be constructed to have greater amounts of preload, that is, to have greater hoop stress, in order to reduce flexure of the ram during forging operations. In either embodiment, the ram 217 defines a die cavity opening through the forward end of the ram and having a shape, such as a frustoconical shape, which is complimentary to the shape of the die assembly. Like the ram described above in conjunction with the hex forge 50, the ram of blade press forge 204 includes a die housing. As shown in FIGS. 24 and 27, the ram can be constructed such that the inner sidewalls which define the die cavity serve as the die housing. Alternatively, the ram can include a separate annular component which is press fit into the die cavity as described above in conjunction with the hex forge.

In the embodiment illustrated in FIGS. 20, 24 and 27, the blade press forge 204 also includes a head 218 defining a passageway which extends lengthwise through at least a forward portion of the head. As described above in conjunction with the hex forge 50, the size and shape of the passageway defined by the head preferably corresponds to the size and shape of the forward portion of the ram 217. For example, the ram and the passageway defined by the head are generally cylindrical. In addition, at least portions of the ram and the passageway defined by the head are sized such that the ram is interference fit within the passageway defined by the head.

In contrast to prior designs which provided an interference fit between the ram 217 and the entire length of the passageway defined by the head 218, the interior surface of the head and the exterior surface of the ram of one advantageous embodiment cooperate to define a clearance region proximate the forward end of the ram. The clearance region permits the forward end of the ram to slightly deflect in a radially outward direction as the ram is advanced and the die assembly is inserted further into the die cavity. In other words, the clearance region defines a larger gap between the head and the forward portion of the ram than between the head and other more rearward portions of the ram, such as those portions of the ram which are interference fit within the head. By permitting a slight radially outward deflection of the forward portion of the ram, the blade press forge 204 of this advantageous embodiment can accommodate the anticipated flexure of the ram without imposing significant forces upon the ram and the head which may shorten the effective lifetime of those components. By maintaining an interference fit between other portions of the ram and the head, however, the forge of this advantageous embodiment still maintains the precise alignment and guidance required between the ram and the die assembly.

In designing the ram 217 and the head 218 of the embodiment illustrated in FIG. 27, the ram was divided into three zones, namely, a forward load zone, a medial neutral zone and a rear no load zone. As indicated by the terminology, the forward load section of the ram is that portion of the ram which experiences significant loads as the ram is longitudinally advanced and the die assembly is inserted into the die cavity. In contrast, the rearward no load section of that portion of the ram which experiences little, if any, loading as the ram is longitudinally advanced and the die assembly is inserted further into the die cavity, while the medial neutral section is a transition region. Accordingly, the length of the clearance region is approximately equal to the width of the forward load section. Stated differently, the width of the clearance region preferably extends from a location proximate the forward end of the ram to a location at least as rearward as the rearwardmost location to which the forging dies are inserted into the die cavity once the ram has been completely longitudinally advanced. Thus, the clearance region will permit slight radially outward flexure of that portion of the ram which surrounds the die assembly following the longitudinal advancement of the ram during forging operations.

In the illustrated embodiment, the head 218 defines a circumferential groove 438 proximate the forward end of the ram 217 which serves as the clearance region. Alternatively, the ram could define a circumferential groove to serve as the clearance region. Still further, both the ram and the head could define aligned grooves which cooperate to serve as the clearance region. In any event, the depth of the groove should be at least as great as the anticipated radial outward flexure of the forward portion of the die, such as 0.0175 inch in one embodiment.

In order to ensure that the ram 217 is properly guided within the passageway defined by the head 218, the rearward no load portion of the ram is preferably interference fit within the head such that the ram will be properly aligned with the die assembly as the ram is longitudinally advanced and retracted. In addition, the head can include a bronze bushing 440 which is sized to create an interference fit with a rear portion of the ram. See FIGS. 24 and 27. As known to those skilled in the art, a bronze bushing will conform to the shape of the ram in order to further align the ram within the passageway defined by the head.

Figure 51:
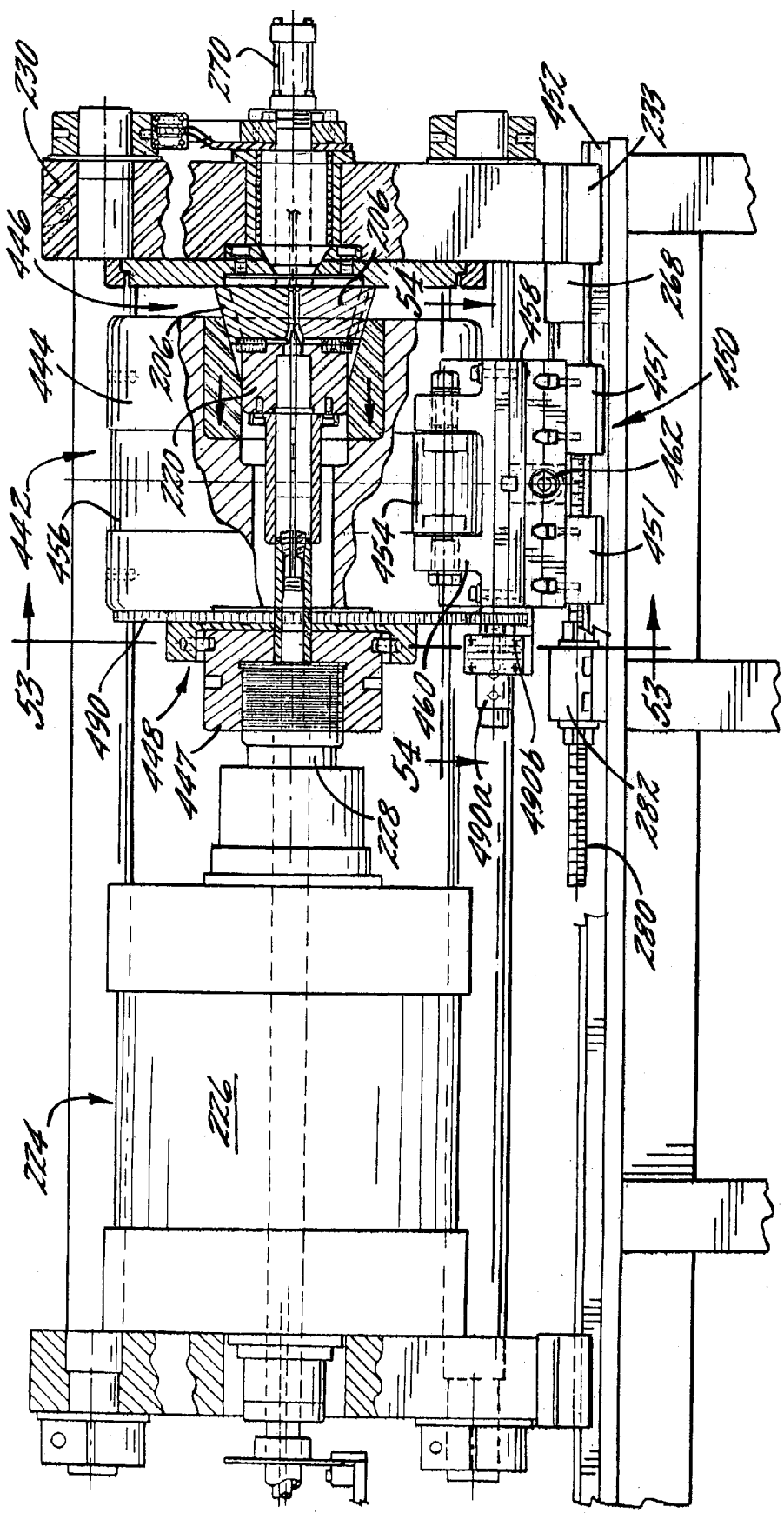
FIG. 51 is a fragmentary cross-sectional side elevational view of a blade press forge of another embodiment of the present invention.
Figure 52:
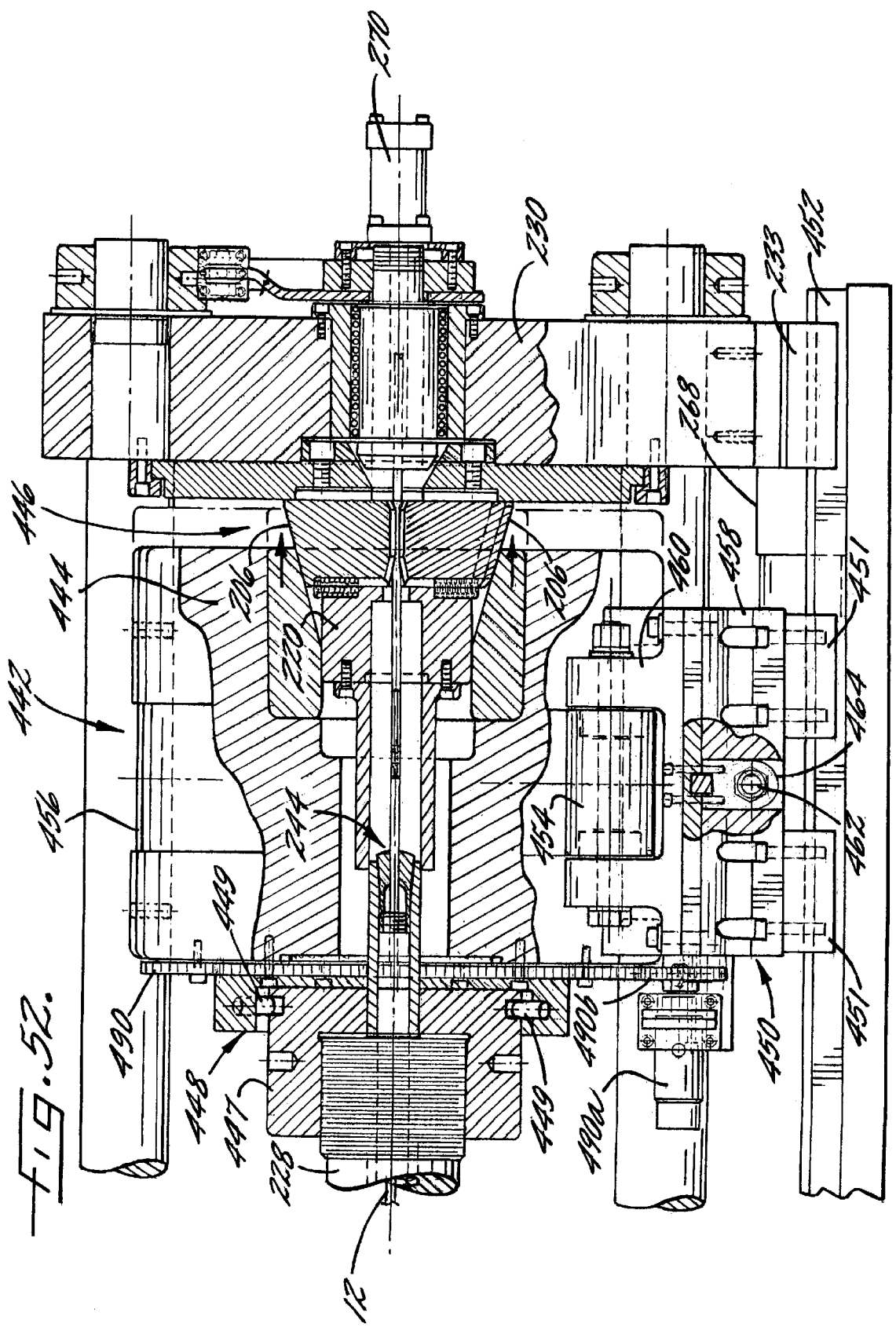
FIG. 52 is a more detailed fragmentary cross-sectional side elevational view of the blade press forge of the embodiment illustrated in FIG. 51.

As shown in FIGS. 51 and 52, the forge 442 of another embodiment does not include a head 218. Instead, the forge includes a ram 444 constructed to have a much thicker wall than the ram of the embodiment depicted in FIGS. 24 and 27. As such, the ram of FIGS. 51 and 52 can withstand the forces created as the ram is longitudinally advanced and the die assembly 446 is further inserted into the die cavity defined by the ram. As described above in conjunction with other embodiments, the ram of this embodiment is preferably formed of a high speed steel, such as CPM® REX™ M4 high speed steel, or an equivalent, marketed by Colt Industries Crucibles Specialty Metals Division of Syracuse, N.Y.

In order to facilitate alignment of the ram 444 with the die assembly 446 as well as to facilitate longitudinal advancement and retraction of the ram during forging operations, the forge 442 of this embodiment can also include a ram support platform 450. As shown in FIGS. 51 and 52 the ram support platform includes a plurality of slides 451 mounted upon lengthwise extending rails 452 to permit the ram support platform to move longitudinally with the ram. The ram support platform is mounted beneath the ram so as to support the ram prior to, during and following the forging operations.

The ram support platform 450 also includes means for adjusting the height of the ram 444 relative to the remainder of the forge 442, including the die assembly 446. While the ram support platform can include various means for adjusting the height of the ram, the ram support platform of the illustrated embodiment includes a pair of lengthwise extending rollers 454 which extend lengthwise along opposed sides of the ram for aligning and supporting the ram. In order to more definitively position the rollers relative to the ram, the exterior surface of the ram of the illustrated embodiment preferably defines a circumferentially extending groove 456 sized to receive the rollers.

Figure 53:
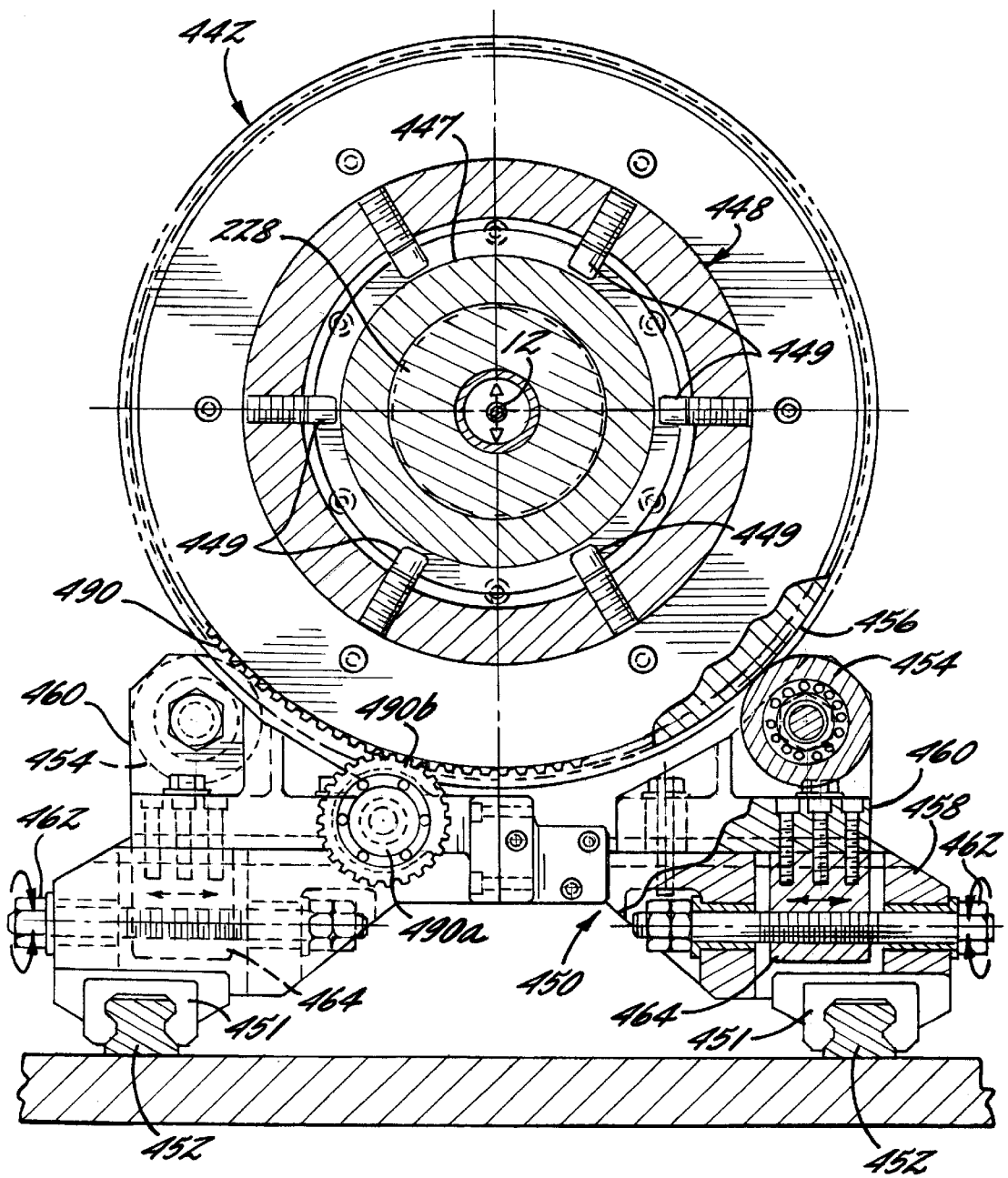
FIG. 53 is a fragmentary cross-sectional end view of the blade press forge of the embodiment depicted in FIGS. 51 and 52 taken along line 53—53 of FIG. 51.
Figure 54:
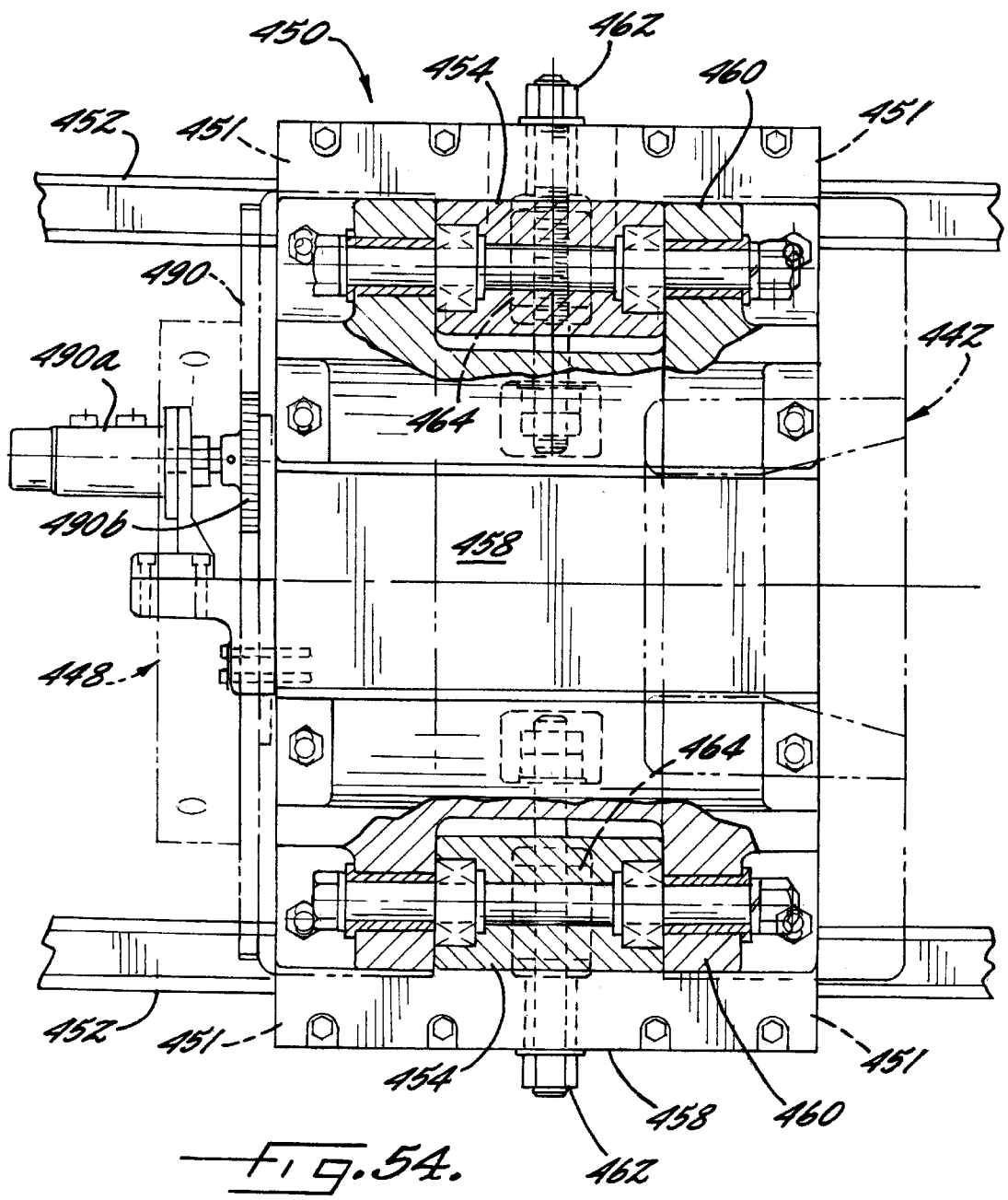
FIG. 54 is a fragmentary cross-sectional plan view of the ram support assembly of the embodiment of the blade press forge illustrated in FIGS. 51 and 52 taken along line 54—54 of FIG. 51.

By controllably adjusting the spacing between the rollers 454, the ram 444 can be raised and lowered. In particular, the ram can be raised by decreasing the spacing between the rollers or lowered by increasing the spacing between the rollers. As shown in FIGS. 53 and 54, the ram support platform 450 of one embodiment includes a base plate 458 which extends between a pair of slides 451 which ride upon each of the lengthwise extending rails 452. As shown most clearly in FIG. 53, the ram support platform of this embodiment also includes a pair of brackets 460 which carry respective rollers and are mounted upon opposite sides of the base plate. As such, the ram can be positioned upon the ram support platform such that the rollers seat within the circumferential groove 456 defined by the exterior surface of the ram.

As shown in FIGS. 53 and 54, the ram support platform 450 of this embodiment also includes a threaded member 462 associated with each bracket 460. The threaded member is threadably connected to the base plate 458 such that the threaded member can be threadably advanced and retracted relative to the base plate. In contrast, the bracket is carried by a medial portion of the respective threaded member so as to move inward and outward relative to the ram 444 as the threaded member is threadably advanced into the base plate and threadably retracted from the base plate, respectively. Although the bracket can be carried by the threaded member in a variety of manners, the bracket of the illustrated embodiment includes a bushing 464 through which the threaded member extends and which is adapted for movement therewith. As such, the threaded members can be rotated in order to move the rollers closer together so as to raise the ram or to move the rollers further apart so as to lower the ram. As such, the ram can be precisely aligned with the die assembly prior to commencing forging operations and can thereafter be supported during forging operations by the die support platform of the present invention.

As shown in FIGS. 20 and 24, the blade press forge 204 of one embodiment can also include adjustable supports 470 which support and align the head 218, and, in particular, the front and rear plates 218a, 218b. As shown in more detail in FIGS. 22 and 23, each support includes a pair of slides 472 which are mounted upon respective lengthwise extending rails 235 for facilitating longitudinal movement of the adjustable support as well as the head supported by the adjustable supports. The pair of slides is generally connected by a support member 474 which extends between the slides and which underlies and supports the respective head frame. Each adjustable support also include an adjustment mechanism 476, such as a threaded adjustment member, which can be threadably advanced and retracted in order to correspondingly raise and lower the respective frame of the head. As such, the head can be appropriately aligned with respect to the other components of the forge, such as the ram 217 and the die assembly during the initial configuration of the forge. In addition, the adjustable supports serve to support the head and other components of the forge during forging operations, thereby protecting the head and other components of the forge from slowly being drawn downwardly by the force of gravity.

As shown in FIGS. 20 and 24, the blade press forge 204 preferably includes a blade press 224 for urging the ram 217 over the die assembly. As shown, the blade press can include an annular cylinder 226 and an annular piston rod 228 which is at least partially disposed within the cylinder and through which the continuous stock material extends. One end of the annular piston rod is also operably connected to the ram such that movement of the annular piston rod also moves the ram.

As shown in FIGS. 20 and 24, the blade press forge 204 includes a frame plate 230, connected to the rear head plate 218b by means of tie rods 218c, and an associated wear plate against which the opposed forging dies 206 are butted, thereby preventing longitudinal advancement of the forging dies. Thus, the controller 30 can extend the annular piston rod 228, such as by hydraulically actuating the blade press 224, to urge the ram 217 over the die assembly, thereby closing the pair of opposed forging dies about a portion of the continuous stock material 12. While an annular cylinder 226 and an annular piston rod are illustrated and described, the blade press can also include other means for moving the die housing relative to the pair of opposed forging dies, such as a plurality of hydraulic cylinder assemblies which are in operative contact with the die housing and which are concentrically disposed about the continuous stock material. Further, while the pressure or force required to urge or axially displace the die housing over the die assembly will vary depending upon the processing conditions, including the type of material from which the workpiece is formed and the size and shape of the resulting part, a hydraulic blade press, such as a 500 ton press, has produced spade bits of the present invention from 1050 carbon steel.

In order to form parts of the desired shape and size, the blade press forge 204 press preferably acts upon or forges only a predetermined portion of the continuous stock material 12. In particular, the blade press forge preferably only deforms a portion of the continuous stock material which is spaced by a predetermined longitudinal distance from a respective registration feature 104. Thus, the blade press forge and the continuous stock material must be precisely aligned to insure that the blade press forge deforms the proper portion of the continuous stock material. Preferably, the first and second forges, namely, the hex forge 50 and the blade press forge in the exemplary embodiment, both forge portions of the same part, albeit at different stages in the fabrication process. Thus, each part can have both the first and second predetermined shapes imparted by the first and second forges, respectively.

As described above in conjunction with the hex forge 50, the blade press forge 204 preferably includes a carriage 232 on which the blade press 224, the ram 217, the head 218, the pair of opposing forging dies 206 and the frame plate 230 are mounted. The blade press carriage is preferably adapted for controlled longitudinal movement. As such, the blade press forge can include one or more slides 233 which ride upon and cooperate with longitudinally extending, parallel rails or tracks 235. In addition, the blade press preferably includes a positioner, such as a hydraulic cylinder assembly 224 including a hydraulic cylinder 226 and a piston rod 228, disposed in operable contact with the blade press carriage and responsive to the controller 30 such that the controller can controllably position the blade press carriage by hydraulically actuating the hydraulic cylinder assembly.

Figure 20A:
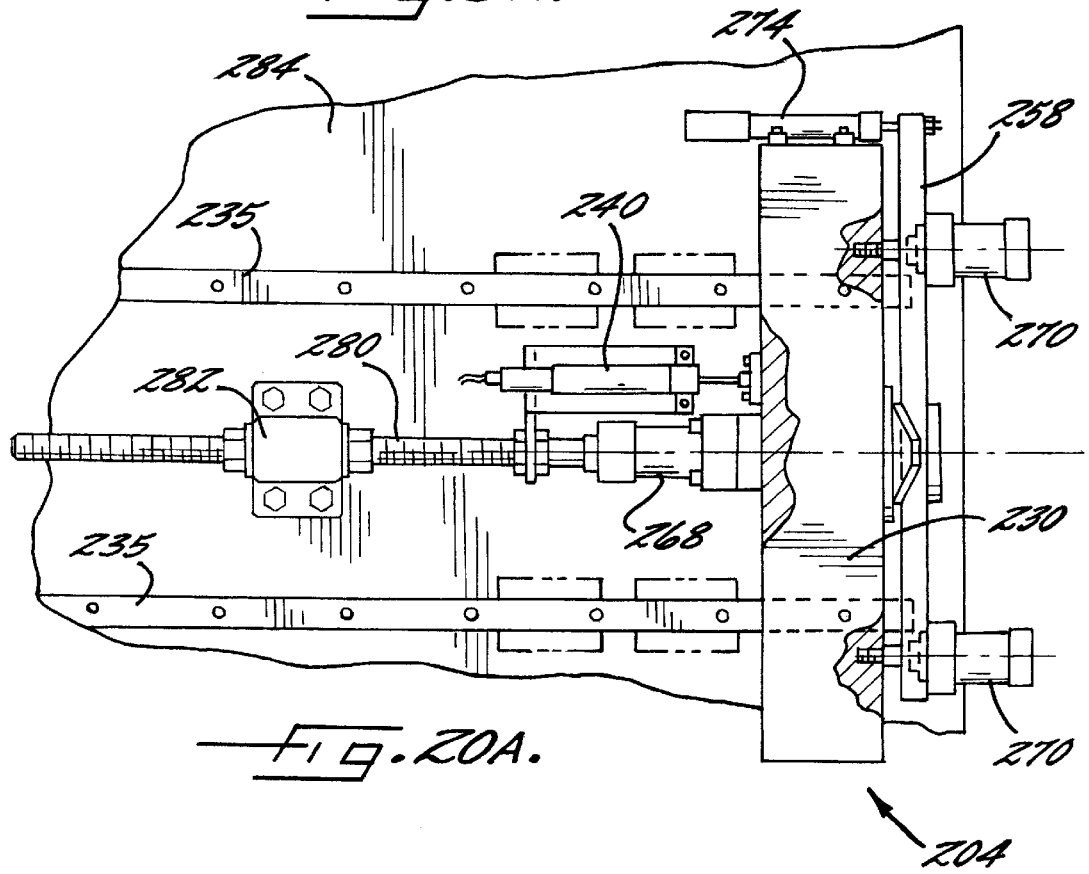
FIG. 20A is a fragmentary cross-sectional plan view taken along line 20A—20A of FIG. 20 and illustrating various sensors and monitors associated with the blade press forge.

As shown in FIG. 20A, the blade press forge 204 also preferably includes a blade press carriage position sensor 240, such as MTS TEMPOSONICS® LP position sensing system, for monitoring the relative position of the blade press carriage 232. As such, the position sensor provides the controller 30 with signals indicative of the relative position of the blade press carriage.

Referring now to FIG. 27, the blade press forge 204 of the present invention also preferably includes a registration monitor 242, such as a photoelectric eye or sensor, which monitors the continuous stock material 12 during the intermittent advancement of the continuous stock material by the indexer 14. The registration monitor detects each registration feature defined by the continuous stock material as the continuous stock material advances. As described above in conjunction with the spur trimming station 116, the controller 30 is preferably operably connected to the registration monitor and the position sensors such that the controller can controllably position the blade press carriage 232 based upon the relative position of the blade press carriage and the location of the registration feature such that the pair of opposed forging dies 206 contact a portion of the continuous stock material which is disposed in a predetermined spaced relationship from the registration feature identified during the most recent advance of the continuous stock material. See blocks 588–594 of FIG. 55G. While the blade press carriage can be positioned in a variety of different manners, the blade press forge of one embodiment includes a hydraulic cylinder 268 attached to the frame plate 230 and adapted to position the frame plate relative to a fixed point defined by the end of a threaded rod 280 which threadably engages a fixed nut assembly 282 mounted to the underlying platform 484

Once the blade press carriage 232 has been properly positioned, a portion of the continuous stock material 12 upstream of the forging dies 206 is securely gripped, as shown in block 596. In particular, the blade press forge 204 preferably includes an upstream clamp 244 for securely gripping a portion of the continuous stock material which, in one embodiment, will eventually be a medial portion of the shank 412 of the resulting spade bit 410. As described above in conjunction with other clamps and as shown in FIG. 27, the upstream clamp preferably includes an annular collet 246 through which the continuous stock material extends. The upstream clamp also preferably includes an annular closure 248 and a hydraulic cylinder assembly 250, operating under control of the controller 30, for urging the annular closure over the annular collet such that the collet is closed about and securely grips the continuous stock material extending therethrough.

Thereafter, a portion of the continuous stock material 12 downstream of the forging dies 206 is securely gripped. In particular, the blade press forge 204 also preferably includes a downstream clamp 252 for securely gripping a portion of the continuous stock material downstream of the forging dies as shown in block 598. In particular, the downstream clamp preferably grips the connector 200 which extends between and joins a pair of adjacent parts, such as a pair of adjacent spade bits.

While the downstream clamp 252 can be configured in a variety of manners without departing from the spirit and scope of the present invention, the downstream clamp of one advantageous embodiment is shown in FIG. 32 and includes a pair of dies 254 disposed within a respective alignment fixture 256. The alignment fixture, in turn, is mounted to and extends outwardly in an upstream longitudinal direction from a clamp plate 258 as illustrated in FIG. 27. As shown in FIGS. 27 and 32, the clamp plate includes a cam sleeve 259 which receives the alignment fixture and which defines a pair of opposed pockets 260 which are adapted to receive outer portions of the dies. As also shown in FIG. 32, the outer portions of the dies which are disposed within respective pockets preferably include a respective outer cam surface 262. Thus, upon rotation of the cam sleeve relative to the alignment fixture and the dies, the outer cam surfaces of the dies and the pockets defined by the cam sleeve will cooperate to force the dies inward toward the continuous stock material 12 so as to securely grip the continuous stock material therebetween.

Figure 33:
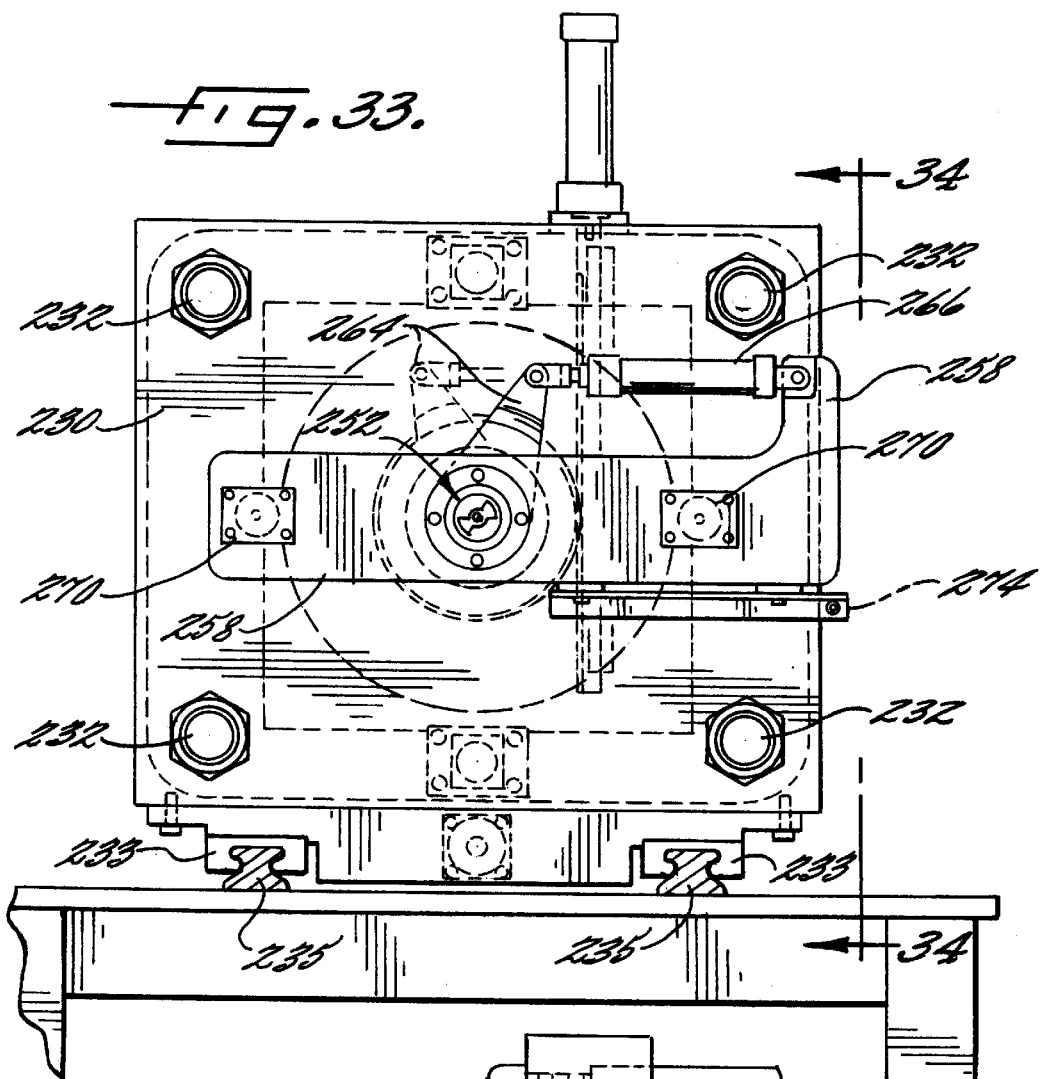
FIG. 33 is an end view of the clamp plate, the downstream blade press clamp and the frame plate of the blade press carriage of one embodiment of the present invention as taken along line 33—33 of FIG. 24.
Figure 34:
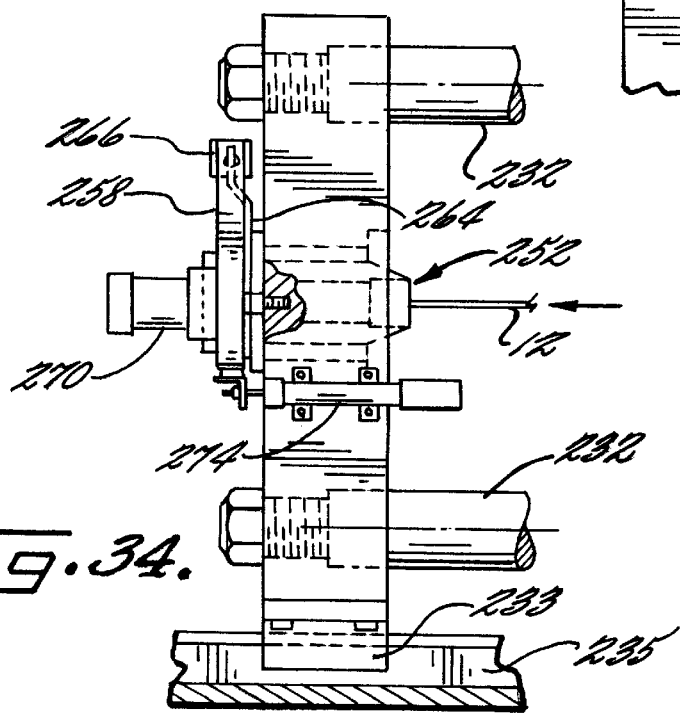
FIG. 34 is a side elevational view of the clamp plate, the downstream blade press clamp and the frame plate of the blade press carriage of one embodiment of the present invention as taken along line 34—34 of FIG. 33.

As shown in FIGS. 27, 33 and 34, the blade press forge 204 can include a lever arm 264 which is operably connected to both the alignment fixture 256 and the controller 30. Accordingly, the controller can rotate the lever arm by a predetermined amount, such as by hydraulic actuation of an associated hydraulic cylinder assembly 266. By rotating the lever arm, the alignment fixture is correspondingly rotated relative to the clamp plate 258. The blade press forge can also include a proximity sensor, operably connected to the controller, for detecting that the lever arm has been rotated by the predetermined amount. Alternatively, the blade press forge can include a pressure switch, operably connected to the hydraulic cylinder assembly and the controller, for detecting the hydraulic pressure supplied to rotate the lever arm. In either instance, the controller can then halt further rotation of the lever arm upon the detection of sufficient rotation of the lever arm or of a sufficient supply of hydraulic pressure since the downstream clamp 252 should already be securely gripping the continuous stock material 12.

Once the upstream and downstream clamps have been closed about the continuous stock material 12, the blade press 224 preferably urges the ram 217 longitudinally forward so as to further insert the die assembly into the die cavity such that the pair of opposed forging dies 206 are radially closed about the continuous stock material. While the part is forged, the continuous stock material grows in both the upstream and downstream longitudinal directions, as described above. In particular, the portion of the continuous stock material between the forged portion and the downstream clamp 252 will grow in a downstream longitudinal direction, while the portion of the continuous stock material between the forged portion and the upstream clamp 244 will grow in the upstream longitudinal direction.

The blade press forge 204 of the present invention compensates for the longitudinal growth of the continuous stock material 12 in the upstream longitudinal direction by permitting the blade press carriage 232 to move in a downstream longitudinal direction. In particular, the blade press carriage will move in a downstream longitudinal direction by a linear distance equal to the growth of the continuous stock material in the upstream longitudinal direction. Preferably, the blade press forge includes means, such as one or more hydraulic actuators 268 which effectively serve as springs, for longitudinally biasing the blade press carriage so as to retard the downstream longitudinal movement of the blade press carriage, thereby encouraging lateral expansion of the forged portion of the continuous stock material such that the forged portion fills the cavity defined by the pair of opposed forging dies 206.

As illustrated in FIGS. 24 and 27, the clamp plate 258 in which the downstream clamp 252 is disposed is mounted to the frame plate 230 of the blade press carriage 232. In particular, the clamp plate is preferably mounted to the frame plate of the blade press carriage in such a manner that the spacing or the distance between the clamp plate and the frame plate can be varied. In particular, the clamp plate is preferably biased toward the frame plate of the blade press carriage, such as with one or more hydraulic springs 270.

By overcoming the bias force applied by the hydraulic springs 270, however, the clamp plate 258 and, therefore, the downstream clamp 252 can be urged further away from the frame plate 228 of the blade press carriage 232. According to the present invention, the growth of the continuous stock material 12 in the downstream longitudinal direction during forging operations will supply a sufficient force to the downstream clamp and, as a result, to the clamp plate so as to overcome the predetermined bias force and to force the clamp plate further away from the frame plate of the blade press carriage, thereby compensating for longitudinal growth of the continuous stock material on the downstream longitudinal direction during the forging operation.

As described above in conjunction with the hex forge 50, the controller 30 can be operably connected to one or more of the hydraulic springs 270 such that the predetermined longitudinal bias force supplied by the respective hydraulic springs can be varied over time according to a predetermined schedule. For example, the controller can gradually increase the predetermined longitudinal bias force over time to ensure that the portion of the continuous stock material 12 which is forged will expand laterally to fill the cavity defined by the forging dies 206, while at the same time compensating for longitudinal growth of the continuous stock material during the forging operation.

The blade press forge 204 also preferably includes a pair of growth sensors for monitoring the longitudinal growth of the continuous stock material 12. As shown in FIG. 20A, the blade press carriage position sensor 240 measures the longitudinal growth of the continuous stock material in the upstream longitudinal direction by monitoring the downstream longitudinal movement of the blade press carriage 232. As also shown in FIG. 20A, the blade press forge also preferably includes a downstream growth sensor 274 which measures the longitudinal growth of the continuous stock material in the downstream longitudinal direction by monitoring the relative spacing of the clamp plate 258 from the frame plate 230 of the blade press carriage.

The controller 30 is operably connected to both the upstream and downstream growth sensors such that by summing the respective longitudinal growth measured by both the growth sensors, the controller can determine the total longitudinal growth of the continuous stock material 12 in both longitudinal directions. Since the longitudinal growth of the continuous stock material is directly related to the extent of forging, the longitudinal growth of the continuous stock material measured by the upstream and downstream growth sensors is, in effect, a measurement of the extent of the forging which has been conducted.

During forging operations of one advantageous embodiment, the blade press 224 initially urges the die housing over the die assembly at a relatively rapid first predetermined rate, as shown in block 600. As the forging operations continue, however, the blade press preferably urges the die housing over the die assembly at a slower second predetermined rate. For example, the blade press of one advantageous embodiment preferably urges the die housing over the die assembly at a relatively rapid rate until the controller 30 and the growth sensors determine that the combined longitudinal growth of the continuous stock material 12 in both the upstream and downstream longitudinal directions equals a predetermined percentage, such as 90%, of the entire longitudinal growth of the continuous stock material anticipated during the blade press forging operation. Once the predetermined percentage, such as 90%, of the total expected longitudinal growth of the continuous stock material is reached, the blade press preferably slows the advancement of die housing over the die assembly, while continuing to monitor the longitudinal growth of the continuous stock material in both the upstream and downstream longitudinal directions. Once the controller and the growth sensors determine that the longitudinal growth of the continuous stock material in both the upstream and downstream longitudinal directions equals the total anticipated longitudinal growth of the continuous stock material, the controller can halt further advancement of the die housing over the die assembly, thereby terminating the forging of the blade portion of the spade bit. See blocks 602–614 of FIGS. 55G and 55H.

Once the controller 30 has terminated forging operations, the blade press 224 retracts or withdraws the ram 217 from the die assembly 206 as shown in block 616. As described above in conjunction with the hex forge 50, the die assembly preferably includes a plurality of springs 276, one of which is associated with each of the forging dies, for urging the respective forging dies in a radially outward direction. Therefore, as the blade press retracts the die housing, the pair of opposed forging dies open or moves radially outward so as to permit the continuous stock material 12 to move longitudinally therethrough.

As shown in FIG. 20, the blade press forge also preferably includes a sensor 278, such as an MTS TEMPOSONICS® LP position sensing system, for monitoring the relative position of the annular piston rod 228 of the blade press 224. As shown in blocks 618 and 620, the controller 30 is also operably connected to the sensor so as to terminate the retraction of the annular piston rod once the annular piston rod has returned to a predetermined rest or initial position.

Thereafter, the controller can open the downstream clamp 252 by hydraulically rotating the lever arm 264 such that the lever arm is also returned to its predetermined initial or rest position. Subsequently, the controller can open the upstream clamp 244 by hydraulically retracting the upstream closure 248. See blocks 622 and 624 of FIG. 55H.

As illustrated in FIG. 20A, the blade press forge 204 can also include a positioner, such as an AC servomotor and an associated ballscrew or, as illustrated, the hydraulic actuator 268, operably connected to the blade press carriage 232 and responsive to commands from the controller 30. Accordingly, the controller can return the blade press carriage to a predetermined initial or starting position by actuating the hydraulic actuator which moves the blade press carriage to the initial or rest position as defined by the end of the threaded rod 280, as described above.

Figure 55H:
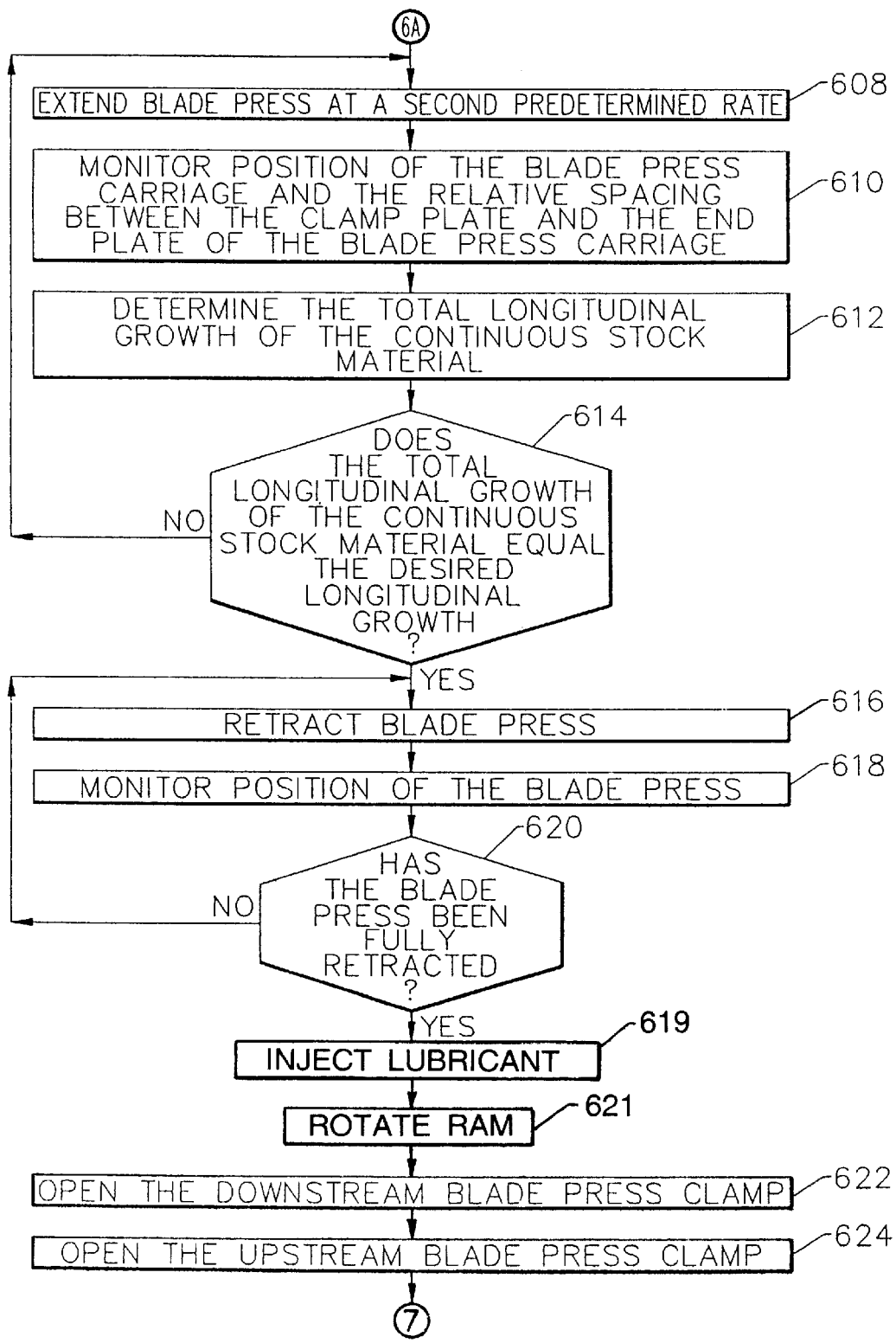
Figure 55I:
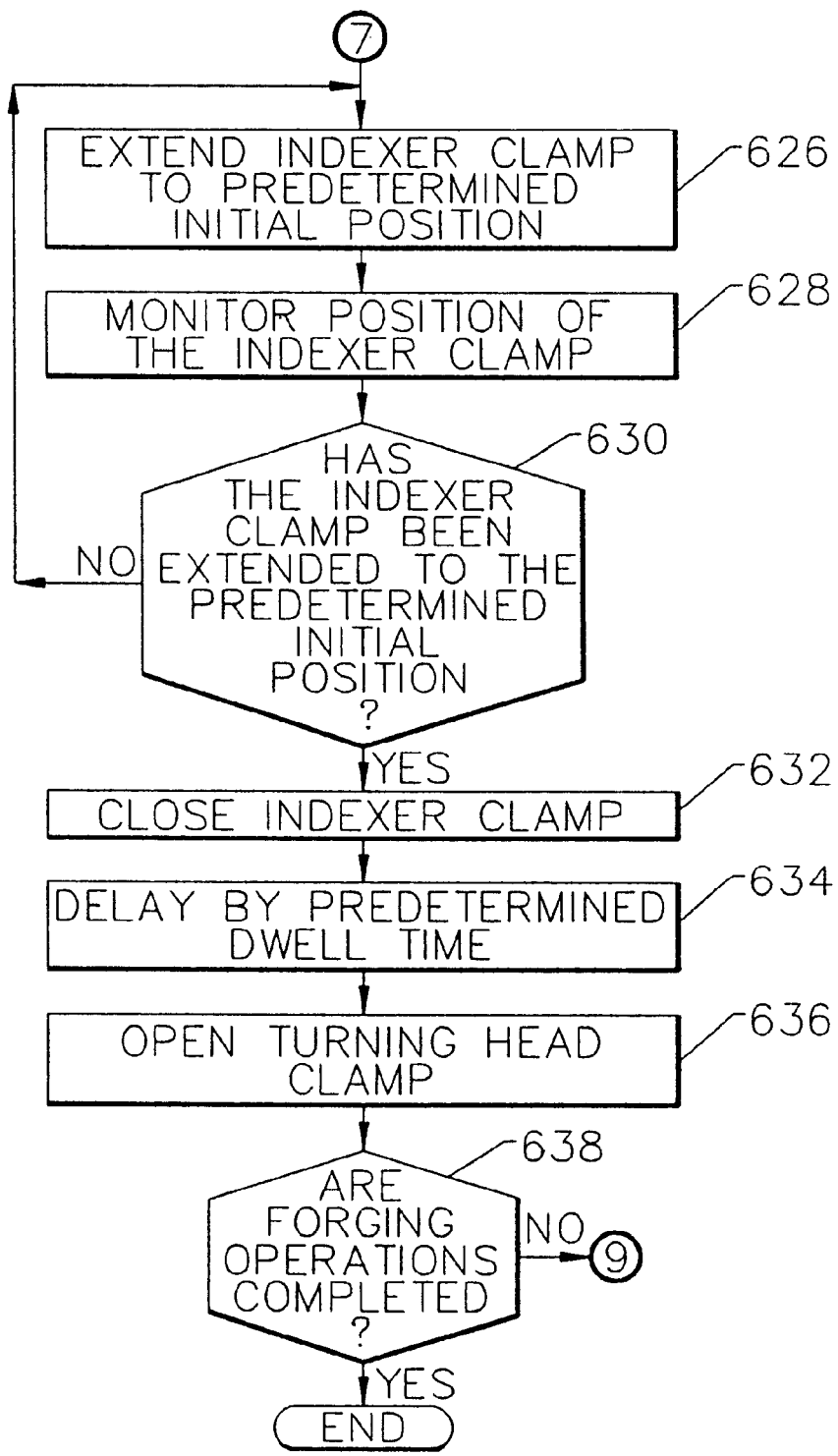

As shown in block 621 of FIG. 55H, once the controller 30 has terminated forging operations and retracted the ram 217 of the blade press forge 204, the ram can be rotated relative to the plurality of forging dies 206 such that the wear and degradation of the die housing occasioned by the relative motion of the ram and the plurality of forging dies is spread relatively evenly about the circumference of the ram. As shown in FIGS. 20 and 24, the blade press forge can include a rotator, such as a toothed gear 490 that is mounted to the ram and a drive member that is adapted to engage the gear and to cause the gear and, in turn, the ram to rotate. As described above in conjunction with the hex forge 50, the drive member can be a rod which carries a pawl for engaging the toothed gear. As shown, the drive member is mounted to the blade press carriage 232 and, more particularly, mounted upon a rear bolster plate of the blade press. Although the drive member can be actuated in a variety of manners, the drive member can be extended and retracted by means of a hydraulic actuator 492. In this regard, the hydraulic actuator can extend the ratchet by advancing the drive member in a downward direction such that the pawl can engage the gear and cause the gear to rotate by a predetermined angular amount in the counterclockwise direction. Once the gear has been rotated, the drive member is retracted by the hydraulic actuator. As described above, the pawl can be disengaged from the gear by pivoting the pawl away from the gear. Typically, the pawl is pivoted away from the gear since the gear is adapted to rotate in only one direction, such as the counterclockwise direction, such that attempts to retract the drive member will overcome the spring force which urges the pawl into engagement with the gear and permit the pawl to pivot out of engagement with the gear. As will be apparent, a variety of other drive members, such as pinion gears or the like, can be utilized to rotate the gear and, in turn, the ram without departing from the spirit and scope of the present invention.

Another technique for imparting relative rotation between the ram 217 and the die assembly is illustrated in conjunction with the blade press forge 204 of FIGS. 51–53. In this regard, a toothed gear 490 can be mounted to the ram for rotation therewith. In addition, the blade press forge can include a drive gear 490b, such as a pinion gear, which engages the gear and is driven, such as by a motor 490a, so as to rotate the gear and, in turn, the ram. In order to permit the ram to be both rotated and longitudinally advanced and retracted by the piston rod, the piston rod is preferably connected to a rear portion of the ram by means of an internally threaded nut 447 which is threaded upon the forward end of the piston rod and which is also rotatably connected to a connector plate 448 that is attached to the rear portion of the ram. More particularly, the nut of the illustrated embodiment is retained within a recess defined by a central portion of the connector plate by means of a plurality of cam followers 449. As best shown in FIG. 53, one end of each cam follower rides within a circumferential groove defined by the nut, while the other end of each cam follower is retained within a respective opening defined by the connector plate so as to permit relative rotation between the ram and the piston rod while continuing to allow the piston rod to longitudinally advance and retract the ram.

Preferably, the ram 217 is incrementally rotated after a predetermined number of parts have been formed, such as after each part has been formed. Although the ram can be rotated by different predetermined amounts, the ram is generally rotated between 10° and 30° and, more typically, by about 20°. By repeatedly incrementally rotating the ram, however, the ram will eventually be rotated completely about the die assembly, that is, through an entire 360°. As such, the rotation of the ram relative to the die assembly will more evenly distribute the wear about the die cavity. In addition, the rotation of the ram relative to the die assembly will maintain the generally cylindrical shape of the ram and substantially prevent the forward end of the ram from assuming an oval shape or from otherwise being deformed during forging operations as has occurred to rams of conventional forges.

Although not illustrated, the blade press die assembly could be rotated in addition to or instead of rotating the ram 217. In addition to promoting more even wear of the die housing, rotation of the blade press die assembly would also allow different parts to be forged into respective predetermined shapes which are disposed at different angular orientations relative to the continuous stock material, thereby further increasing the versatility of the forming method and apparatus 10 of the present invention.

The blade press forge 204 can also include a sensor 494 for detecting rotation of the ram 47 relative to the die assembly. By monitoring the rotation sensor to the controller 30, the controller can determine if the ram has been rotated relative to the die assembly following a forging operation and can prevent further forging operations until the ram has been appropriately rotated.

The blade press forge 204 can also include a lubrication system 496 for providing lubricant to the die assembly, the ram 217 including the die housing 60 and the head 218. Typically, the lubricant is an oil, such as machine way lube. However, the lubrication system can apply other lubricants, if so desired. According to this embodiment, a plurality of ports 497 are defined through the head and the ram so as to open into the die cavity within which the die assembly is inserted. See FIGS. 25 and 26. By injecting lubricant through these ports, the lubrication system can therefore provide lubricant to the back surfaces 432 of the forging dies 206.

The controller 30 typically controls the operation of the lubrication system 496, such as the pneumatically activated solenoid valve 496a and the servovalves 496b which control the flow of lubricant in the illustrated embodiment. Typically, the controller directs the lubrication system to provide lubricant following each forging operation by injecting lubricant through the ports 497 once the ram 61 has been longitudinally retracted and while the back surfaces 432 of the forging dies 206 are at least somewhat exposed. See block 619 of FIG. 55H. While lubricant is injected at a plurality of discrete ports, such as three ports, the subsequent rotation of the ram relative to the die assembly serves to distribute the lubricant relatively evenly between the ram and the back surfaces of each of the forging dies.

The lubrication system 496 can also provide lubricant between the head 218 and the ram 217 in order to facilitate the lengthwise advancement and retraction of the ram within the passageway defined by the head. In this regard, at least one and, more commonly a pair of ports 498 can be defined through the head such that lubricant injected through these additional ports is spread over the outer surface of the ram and the inner surface of that portion of the head which defines the passageway. To facilitate even distribution of the lubricant about the entire circumference of the ram, the head preferably defines a pair of circumferentially extending grooves 499. By injecting lubricant into the circumferential groove, lubricant is effectively applied about the entire circumference of the ram, thereby evenly lubricating the ram. Alternatively, the ram can define the circumferential groove instead of or in addition to the head, if so desired.

Figure 25:
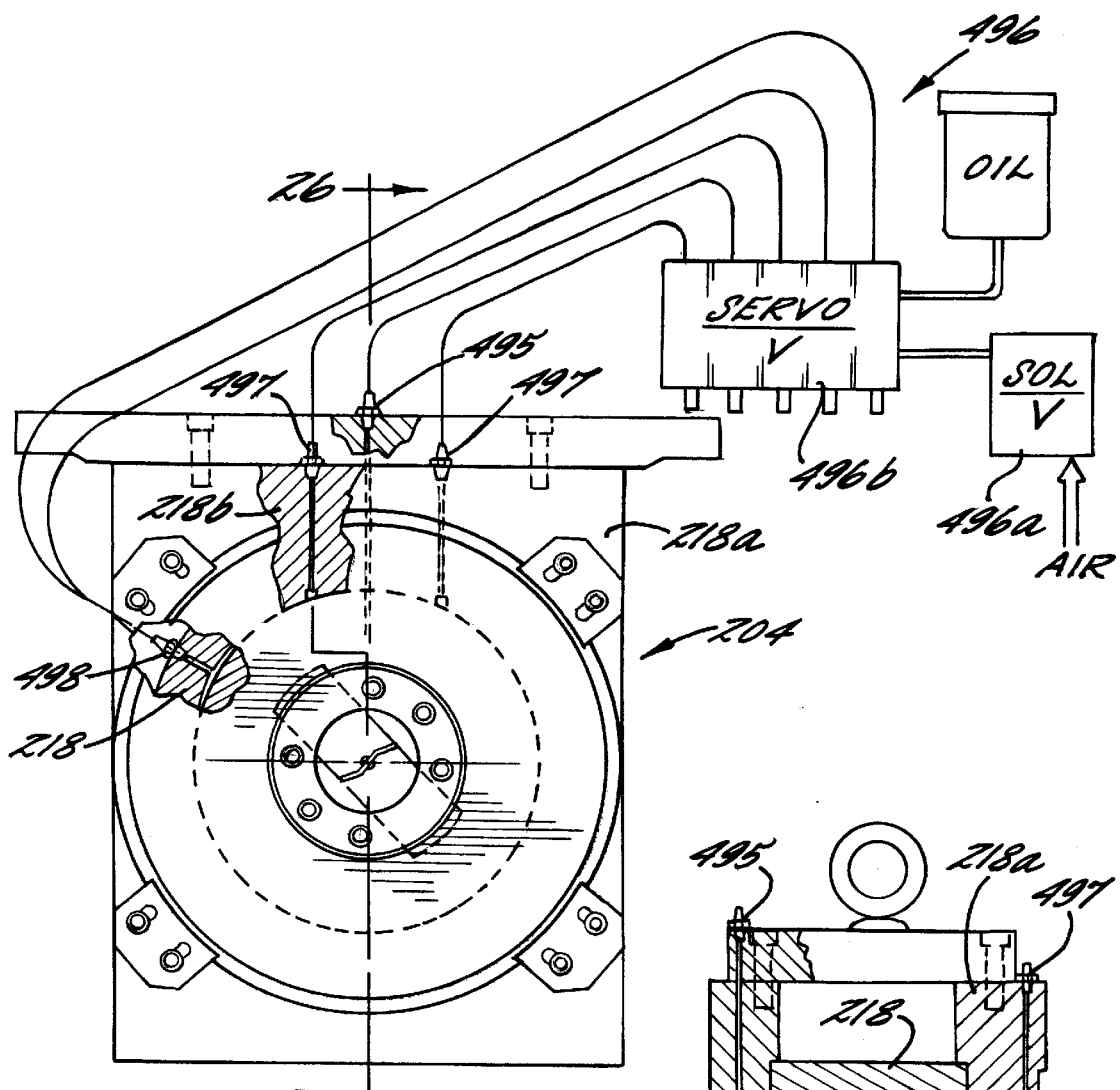
FIG. 25 is a partial fragmentary cross-sectional end view of the blade press forge taken along line 25—25 of FIG. 24 which illustrates the lubrication system for lubricating the various components of the blade press forge.
Figure 26:
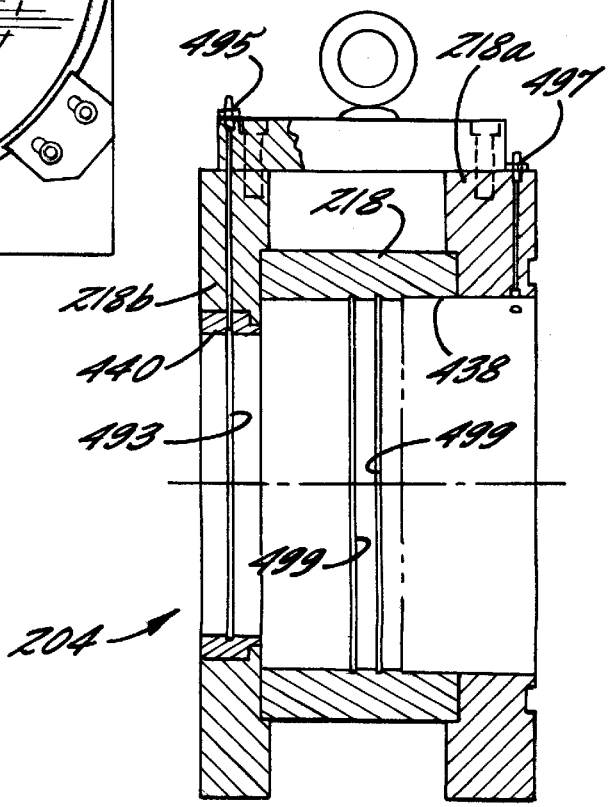
FIG. 26 is a partial fragmentary cross-sectional side view of the blade press forge taken along line 26—26 of FIG. 25 which further illustrates the manner in which lubricant is introduced to the various components of the blade press forge.

As shown in FIGS. 24–26, an additional port 495 can be defined by a rear portion of the head 218 and the bushing 440 to provide lubricant between the bushing and the ram 217. In a like manner to that described above, bushing and/or the ram can define a circumferentially extending groove 493 in order to spread the lubricant evenly about the circumference of the bushing and the ram.

As described above, the controller 30 typically directs the lubrication system 496 to inject lubricant once the ram 217 has been fully retracted. However, lubricant can be injected at other times during the forging process, if desired. Thus, the lubrication system of the blade press 204 forge of this advantageous embodiment can repeatedly lubricate the various components of the forge in order to reduce wear and increase the effective life of the components without applying enough lubricant to the continuous stock material 12 that the continuous stock material becomes difficult to grip during downstream operations.

In the illustrated embodiment, once all of the forging operations have been completed, the controller 30 can extend the annular piston rod of the indexer 14 such that the indexer clamp 16 is brought to a predetermined starting or initial position. See blocks 626–630. Thereafter, the controller can close the indexer clamp as described above so as to securely grip a portion of the continuous stock material 12 and, following a predetermined dwell time, such as 0.1 seconds, the controller can release the upstream turning head clamp 44. See blocks 632–636 of FIG. 55I. In embodiments of the present invention in which the spur trimming station 116 and/or the outside diameter trimming station 138 are utilized as a downstream indexer, the spur trim clamps 134 and the outside diameter trim clamps 156 are also extended so as to securely grip the continuous stock material along with the upstream indexer. Thereafter, the steps of the forging method of the present invention which are described above and illustrated in FIGS. 55A–55I can be repeated. See block 638.

Following separation of a forged part from the continuous stock material 12, the part preferably undergoes a number of finishing operations. In order to further increase the efficiency of the forming method and apparatus 10 of the present invention, these finishing steps can be conducted at the same time as the second or blade forging operations. However, these finishing operations can also be performed at a later time without departing from the spirit and scope of the present invention.

As shown schematically in FIGS. 1 and 2, the forming apparatus 10 of one embodiment of the present invention can include a conveyor or other type of collection system for collecting and transporting the resulting parts in a controlled fashion. According to one embodiment of the present invention, the resulting parts are thereafter heat treated and shot blasted, prior to undergoing finishing operations and being packaged for shipment and sale. See blocks 308–312 of FIG. 1. These finishing operations can include grinding operations and rust inhibiting operations. The grinding operations are typically performed by a numerically controlled grinder which, in one embodiment, serves to further sharpen and define the forward cutting edges of the resulting spade bit. In contrast to conventional grinding process which grind the outer diameter of the spade bit 410 prior to grinding the spur and the forward cutting edges, the grinding process of one advantageous embodiment initially grinds the cutting edges including the forward cutting edges 434 and the spur cutting edges 432. Thereafter, the outer diameter can be ground without damaging the previously ground cutting edges. In addition, the clamps utilized to hold the spade bit during the grinding operations can also be utilized to check the straightness of the spade bit and to check the shape of the hexagonal rear portion 416 of the shank 412 such that imperfectly formed spade bits can be detected and removed prior to the final finishing operations.

As depicted in block 500 of FIG. 55A, the forming apparatus 10 must be initially loaded prior to commencing the forming operations. Thus, the forming apparatus preferably includes a load clamp 314 for securely gripping the continuous stock material 12 during loading operations. As shown in FIG. 7, the load clamp preferably includes an annular collet 315 through which the continuous stock material extends. The load clamp can also include a load closure 317 and a hydraulic cylinder assembly 319, operably connected to the load closure and responsive to commands from the controller 30. In order to load the continuous stock material into the forming apparatus of this advantageous embodiment, the controller can close the load clamp, such as by hydraulically advancing the load closure over the load collet such that the load collet moves radially inward and securely grips the continuous stock material. The controller also preferably opens all of the other clamps, such as the indexer clamp 16, the upstream and downstream turning head clamps 44 and 47 and the upstream and downstream blade press clamps 244 and 252, such that the continuous stock material can be extended therethrough.

The forming apparatus 10 and, more particularly, the controller 30 then advances the load clamp 314 by a predetermined linear distance in a downstream longitudinal direction such that the continuous stock material 12 is also advanced by the predetermined linear distance in the downstream longitudinal direction. In particular, the indexer piston rod can be operably connected to the load clamp such that hydraulic actuation of the indexer clamp cylinder can advance the load clamp in the downstream longitudinal direction. In this regard, the load clamp can include one or more slides 321 which ride upon or cooperate with the longitudinally extending, parallel rails or tracks 39.

The controller 30 then opens the load clamp 314, such as hydraulically retracting the load closure such that the annular load collet opens. Once the load clamp has been opened, the controller moves the load clamp by the same predetermined linear distance in the upstream longitudinal direction such that the load clamp returns to a predetermined initial or rest position as shown by FIG. 7. For example, in the illustrated embodiment, the controller can hydraulically actuate the indexer clamp cylinder so as to urge the indexer piston rod and, therefore, the load clamp in an upstream longitudinal direction. The controller can then repeat the steps of closing the load clamp about the continuous stock material, advancing the load clamp in the downstream longitudinal direction, opening the load clamp and returning the load clamp to the predetermined initial or rest position for as many cycles as required in order to feed the leading end of the continuous stock material 12 through the forming apparatus 10.

Although the forming method and apparatus 10 of one embodiment of the present invention has been described above in considerable detail, it should be apparent to those skilled in the art that various modifications can be made to the forming method and apparatus without departing from the spirit and scope of the present invention. For example, in one alternative embodiment of the forming method and apparatus of the present invention, the turning head 45 is not disposed between the hex forge 50 and the blade press forge 204, but is, instead, disposed downstream of the forging, trimming and sawing operations. As such, the turning head can machine the ball groove 110 and chamfered edge 112 in an extremely precise manner with respect to one end, typically the rear end, of the resulting part. If the turning head were disposed downstream of the forging, trimming and sawing operations, the forming apparatus of this embodiment would preferably include a clamp disposed between the hex forge and the blade press forge so as to clamp a fixed portion of the continuous stock material 12 during the forging and trimming operations. Thus, the fixed clamp functions would in a similar fashion to the upstream turning head clamp 44 of the embodiment described hereinabove.

For a forming apparatus 10 adapted to fabricate parts of a predetermined length, the initial or rest position of the blade press forge 204 can be fixed and need not be adjusted to compensate for the longitudinal growth of the continuous stock material 12 created during the hex forging operations. Instead, the separation between the respective initial or rest positions of the hex forge 50 and the blade press forge 204 can be determined based upon the length of the resulting part, the stroke of the indexer 14 and the anticipated longitudinal growth of the continuous stock material in a downstream longitudinal direction during the hex forging operations. Preferably, the separation between the hex forge and the blade press forge is minimized in order to further improve the quality and tolerance control of the resulting parts. For example, the hex forge and the blade press forge of one advantageous embodiment are separated by about 24 inches.

As described above, the predetermined initial or rest position of the blade press forge 204 need not be adjusted to compensate for variations in the growth of the continuous stock material 12 in the downstream longitudinal direction which were created during the hex forging operations, such as by detecting a registration feature 104 and adjusting the position of the blade press forge relative to the detected registration feature. If desired, however, the continuous stock material can include a plurality of registration features spaced longitudinally along its length which can be detected by the blade press forge in the manner described above. Thus, the forming apparatus can include a blade press forge which is adapted to detect registration features during the intermittent advance of the continuous stock material and to adjust its position relative to the most recently detected registration feature prior to blade press forging operations. For example, the blade press forge 204 of this embodiment can include a registration monitor for detecting the registration feature such that the relative position of the blade press forge can be thereafter adjusted relative to the detected registration feature in a similar manner to that described above.

Although one advantageous set of trimming and sawing operations has been described above, the forming method and apparatus 10 of the present invention can include a variety of trimming operations without departing from the spirit and scope of the present invention. For example, the forming method and apparatus and apparatus of the present invention can include a left side trimming station and a right side trimming station for trimming the left and right sides of the resulting part, respectively. With respect to a forming method and apparatus adapted to fabricate spade bits, the left and right side trimming stations can trim the left and right sides, respectively, of the blade portion of the spade bit, including the left and right sides, respectively, of the spur. Thus, upon the completion of the final trimming operation, the resulting part will be separated from the preceding or downstream part and the leading end of the part, such as the spur, will be completely trimmed.

In this embodiment, the left and right side trimming stations preferably include respective registration monitors, such as photosensors, for detecting the registration features. The left and right side trimming stations also preferably include means, such as a hydraulic cylinder assembly or an AC servomotor and an associated ballscrew, for moving the respective stations in a longitudinal direction relative to the detected hole such that the left and right side trimming stations are precisely aligned with the portion of the part to be trimmed. As also described above, the left side trimming station and the right side trimming station can be operating on different ones of the plurality of parts at the same time.

For embodiments of the forming method and apparatus 10 which are adapted to fabricate spade bits, it has been observed that the blade forging operation requires a significantly longer time to complete than the other operations which are performed. Thus, even though the above-described forming method and apparatus is particularly well suited for processing a continuous stock material 12, it is contemplated that the forming method and apparatus of one embodiment could include a plurality of blade press forges 204. As described hereinbelow, the plurality of blade press forges can operate in parallel in order to increase the throughput of the resulting forming apparatus. Alternatively, the plurality of blade press forges can be disposed in series such that different ones of the forges operate on different ones of the parts.

Therefore, the saw station 160 of the forming apparatus 10 of this embodiment can be disposed downstream of the hex forge 50 so as to separate the continuous stock material 12 into a number of discrete, partially formed parts. The forming apparatus of this embodiment can also include a plurality of transfer mechanisms which engage respective ones of the discrete parts and which transfer the respective parts to corresponding blade press forges 204. For example, the transfer mechanism can include a clamp for engaging a predetermined portion of the partially formed part. Thereafter, the transfer mechanism can either transport the respective part to the corresponding blade press forge or, alternatively, the respective blade press forge can be moved into engagement with the respective part. Since the transfer mechanism has already engaged a predetermined portion of the respective part, such as the connector 200 which extends between adjacent parts, the transfer mechanism can serve as the downstream blade press clamp during the ensuing blade forging operations. Thereafter, the forged parts can be trimmed and processed as described above. For example, the forged parts can be trimmed and processed by a single trimming and processing line, disposed downstream at the plurality of blade press forges. Alternatively, the forged parts can be trimmed and processed in parallel by separate trimming and processing lines without departing from the spirit and scope of this aspect of the present invention.

While the forming method and apparatus 10 of the present invention can be employed to manufacture a number of different types of parts, the forming method and apparatus of one advantageous embodiment fabricates a plurality of spade bits 410 from a continuous stock material 12. Thus, a spade bit which could be manufactured according to one advantageous embodiment of the present invention will be described in more detail hereinbelow.

As illustrated in FIGS. 4–6, a spade bit 410 of the present invention includes an elongate shank 412 defining a central longitudinal axis 414. The rear portion 416 of the shank is adapted to be received and held by a drill (not illustrated). For example, the elongate shank typically includes a cylindrical forward portion and a rear portion that is hexagonal in transverse cross-section so as to be securely received and held by the chuck of a drill (not illustrated).

The spade bit 410 also includes a blade portion 418 joined to a forward end of the elongate shank 412. The blade portion includes a pair of generally flat side segments 420 which extend laterally in opposite directions from the central longitudinal axis 414. The side segments preferably define respective lateral planes which are parallel to each other and the central longitudinal axis. According to this embodiment of the present invention, the blade portion also includes a generally flat central segment 424 disposed along the central longitudinal axis and defining a central plane. More particularly, the central segment includes opposite sides 428 which are parallel to the central longitudinal axis, a rear end which is continuous with the forward end of the shank and an opposite forward end. According to this embodiment, the pair of side segments or wings are continuous with the central segment along respective sides of the central segment. In particular, the pair of side segments are continuous with respective sides of the central segment such that lateral planes defined by the respective side segments intersect the central plane defined by the central segment at an oblique angle.

Each side segment 420 can also include a respective chamfered corner portion 435. Each chamfered corner portion includes a chamfered edge which extends both axially rearward and laterally outward from the respective forward cutting edge 434, 436. In particular, the forward cutting edge of each side segment typically extends laterally outward from an inner portion to an outer portion. Accordingly, the chamfered edge of each chamfered corner portion preferably extends both axially rearward and laterally outward from the outer portion of the respective forward cutting edge. Preferably, the chamfered edges are defined such that a line parallel to the central longitudinal axis 414 and the chamfered edge of each respective side segment defines a chamfer angle 435a of between about 30° and about 60° therebetween.

Each chamfered corner portion 435 also includes a chamfer surface which slopes radially inward from the respective chamfered edge to a rear edge. Preferably, the chamfer surfaces are defined so as to have a chamfered clearance angle 437 of between about 10° and about 20°, as shown in FIG. 6A. In this regard, the chamfered clearance angle is defined as the angle between a chamfered plane defined by a chamfer surface and a plane perpendicular to a lateral plane defined by a respective side segment.

By extending both axially rearward and laterally outward from the respective forward cutting edge 434, 436, the chamfered corner portions 435 can repeatedly cut the peripheral wall of the resulting hole as the spade bit 410 of the present invention is rotatably advanced through the workpiece. Therefore, the spade bit of the present invention can efficiently produce high-quality holes having smooth peripheral walls and relatively clean entry and exit points.

The blade portion 418 also includes a spur 430 extending axially from the forward end of the blade portion to center and to guide the spade bit 410 during drilling operations. As best illustrated in FIG. 6, the spur of this embodiment is of a generally triangular shape and extends to a spur point on the central longitudinal axis 414. The spur also includes a pair of spur cutting edges 432 extending along opposite sides of the spur between the spur point and a base of the spur at the forward end of the blade portion. The spur cutting edges are positioned to initially contact the workpiece during rotation of the spade bit in the predetermined direction of rotation as indicated by the clockwise arrow in FIG. 4.

Each side segment 420 also includes a respective forward cutting edge. According to one advantageous embodiment, the respective forward cutting edges of each side segment are preferably axially offset. In other words, the spade bit of one advantageous embodiment includes an axially advanced forward cutting edge 434 and an axially rearward cutting edge 436. In particular, the respective forward cutting edges of the side segments are preferably axially offset by a predetermined axial amount D, such as between about 0.010 inch and about 0.012 inch in one advantageous embodiment. Typically, the axial offset of the respective forward cutting edges is ground into the forward cutting edges during grinding operations following the forming method and apparatus 10 described above. By being axially offset, the respective forward cutting edges contact and remove material in an efficient manner as the spade bit 410 rotates in a predetermined direction of rotation during drilling operations. In addition, since the forward cutting edges are axially offset, the spade bit of this advantageous embodiment of the present invention preferably has a relatively long life due to the efficient removal of material as a spade bit advances through a workpiece.

The alignment of the forward cutting edges 434, 436 of the side segments 420 along a centerline 421 that passes through the central longitudinal axis 414 further improves the performance of the spade bit 410 by directing the removed chip swarf perpendicularly from the cutting edge and upwardly, and not radially outwardly. As a result, the chip swarf does not hinder subsequent rotation of the spade bit by binding between the spade bit and the sidewalls of the hole formed thereby. Accordingly, the longevity of the spade bit is increased by reducing the wear on the spade bit and the efficiency with which the spade bit drills a hole of a predetermined diameter is enhanced.

According to one advantageous embodiment, each spur cutting edge 432 preferably extends radially outward of at least an innermost portion of the forward cutting edge of the adjacent side segment 420. Thus, each spur cutting edge is radially separated from the forward cutting edge of the adjacent side segment. In addition, the spur 430 preferably defines a spur plane which is oblique to the respective lateral planes defined by the side segments such that each spur cutting edge is also preferably angularly offset as shown in 431 from the forward cutting edge of the adjacent side segment in the predetermined direction of rotation of the spade bit 410 when viewed along the central longitudinal axis 414. In particular, each spur cutting edge is positioned angularly rearward of the forward cutting edge of the adjacent side segment in the predetermined direction of rotation. Thus, each spur cutting edge is also angularly separated from the forward cutting edge of the adjacent side segment. Further, at least a portion of each spur cutting edge extends axially rearward of the forward cutting edge of the adjacent side segment in the longitudinal direction so that each spur cutting edge is also axially separated from the forward cutting edge of the adjacent side segment.

A forward portion of each side segment preferably defines a cutting plane. The cutting plane intersects the lateral plane defined by the respective side segment 420 to define a hook angle therebetween. Preferably, the hook angle 433 is between about 10° and about 20° and, more preferably, is about 15°, as shown in FIG. 6B. The forward cutting edges of the illustrated embodiment are disposed angularly in advance of the lateral planes of the respective side segments in the predetermined direction of rotation of the spade bit 410 when viewed along the central longitudinal axis 414. Chips removed from the workpiece by the forward cutting edge are thereby directed upwardly or rearwardly along the spade bit and away from the cutting surface by further rotation of the spade bit, and, in part, by the hook angle defined between the cutting plane and the lateral plane.

Further, each side segment 420 of the spade bit 410 can also include a forward end having a forward end surface 425 extending between the respective forward cutting edge and a rear edge 426. Advantageously, the forward end surface slopes rearwardly from the forward cutting edge to the rear edge such that only the forward cutting edge contacts the cutting surface during drilling operations. Thus, the drag or other frictional forces generated between the rotating spade bit and the workpiece are reduced and the efficiency with which the spade bit of the present invention drills is further improved.

Each forward end surface preferably includes first and second forward end planes which intersect a plane perpendicular to the central longitudinal axis 414 to define primary and secondary lip clearance angles, respectively, therebetween. The secondary lip clearance angle is typically larger than the primary lip clearance angle in order to further reduce drag or other frictional forces generated between the rotating spade bit and the workpiece. For example, in one embodiment, the primary and secondary lip clearance angles are about 5° and 8°, respectively, as shown in FIG. 6B. However, the primary and secondary lip clearance angles can be varied without departing from the spirit and scope of the present invention. In addition, the forward end surface need not include both first and second forward end planes as illustrated, but can, instead, include a single forward end plane without departing from the spirit and scope of the present invention.

Still further, each side segment 420 of the illustrated embodiment of the spade bit 410 of the present invention includes a first side joined to the central segment 424 along a side 428 thereof, and an opposed second side 429 defining a second or outer side surface. The second or outer side surface extends between respective forward and rear edges and preferably follows the arc of a circle in lateral cross-section to further reduce the drag or other frictional forces generated by the rotation of the spade bit within the hole. Alternatively, the side surface can taper radially inwardly from the forward edge to the rear edge such that only the forward edge of the side surface of the side segment contacts the sidewalls of the hole to thereby further reduce binding of the spade bit.

The second sides 429 of the respective side segments 420 also preferably taper inwardly in an axial direction from the forward end to the rear end of the blade portion 418. Thus, a side surface taper angle 429a, typically, about one-half of 1°, or ½°, is defined between the side surface plane and a line parallel to the central longitudinal axis 414. By tapering the second sides of the side segments inwardly, the side surfaces preferably only contact the workpiece near the cutting surface such that drag or other frictional forces are still further reduced.

While one particularly advantageous spade bit 410 is illustrated in FIGS. 4–6 and described herein, the spade bit can have many other configurations without departing from the spirit and scope of the present invention. In this regard, U.S. Pat. Nos. 5,697,738 and 5,700,113, the contents of both of which have been expressly incorporated by reference herein, describe several other embodiments of a spade bit which could also be fabricated by the forming method and apparatus 10 of the present invention.

Regardless of the type of part, the forming method and apparatus 10 of the present invention provides numerous advantages over conventional fabrication processes. In particular, by processing the plurality of parts while still joined by the continuous stock material 12, the amount of handling and transporting of discrete parts is significantly reduced. In addition, the forming method and apparatus of the present invention is able to maintain a precise alignment between the partially formed parts and the various stations of the forming apparatus so as to produce high quality parts having sharply defined features, such as, for example, the above-described radial, angular and longitudinal separation of the spur cutting edge 432 from the forward cutting edges 434 and 436 of the respective side segments 420 of the blade portion 418 of the spade bit 410 of the present invention. By altering the stroke of the indexer 14, parts of various lengths can be produced from the same continuous metal stock, such as spade bits having an elongate shank of various lengths. Moreover, since the forming method and apparatus of the present invention performs several operations at the same time, albeit on different parts at different positions along the fabrication line, the forming method and apparatus can efficiently form a plurality of parts of a predetermined shape.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A spade-type boring bit comprising:
   an elongate shank defining a central longitudinal axis; and
   a blade portion joined at a rear end to one end of said shank along the central longitudinal axis, said blade portion including:
      a pair of generally flat side segments which extend laterally in opposite directions from the central longitudinal axis, said side segments including respective forward cutting edges and respective chamfered corner portions, wherein said side segments are axially offset relative to each other such that one of said forward cutting edges is axially rearward of the other one of said forward cutting edges, and wherein each chamfered corner portion includes a chamfered edge extending both axially rearward and laterally outward from the respective forward cutting edge; and
      a spur extending axially from a forward end of said blade portion opposite the rear end.

2. A spade-type boring bit according to claim 1 wherein said forward cutting edges are axially offset relative to each other by a predetermined axial offset of about 0.010 inch to about 0.012 inch.

3. A spade-type boring bit according to claim 1 wherein said respective forward cutting edges of said side segments are aligned with each other along a centerline which passes through the central longitudinal axis of said elongate shaft.

4. A spade-type boring bit according to claim 1 wherein said spur is of a generally triangular shape extending in the central plane to a spur point on the central longitudinal axis, said spur including a pair of spur cutting edges extending along opposite sides of said spur between the spur point and the forward end of said blade portion such that each spur cutting edge extends radially outward of at least an innermost portion of the forward cutting edge of the adjacent side segment, and wherein each spur cutting edge is angularly offset from the forward cutting edge of the adjacent side segment in a predetermined direction of rotation of the spade-type boring bit when viewed along the central longitudinal axis, such that each spur cutting edge is both radially and angularly separated from the forward cutting edge of the adjacent side segment.

5. A spade-type boring bit according to claim 4 wherein at least a portion of each spur cutting edge extends axially rearward of the forward cutting edge of the adjacent side segment such that each spur cutting edge is axially separated from the forward cutting edge of the adjacent side segment.

6. A spade-type boring bit according to claim 1 wherein each chamfered corner portion includes a chamfer surface which slopes radially inward from the respective chamfered edge to a rear edge.

7. A spade-type boring bit according to claim 6 wherein said pair of side segments define respective lateral planes, and wherein each chamfer surface defines a chamfer plane which intersects a plane perpendicular to the lateral plane defined by the respective side segment to thereby define a chamfer clearance angle.

8. A spade-type boring bit according to claim 7 wherein the chamfer clearance angle is between about 10° and about 20°.

9. A spade-type boring bit according to claim 1 wherein a line parallel to the central longitudinal axis and the chamfered edge of each respective side segment defines a chamfer angle therebetween, the chamfer angle being between about 30° and about 60°.

10. A spade-type boring bit according to claim 1 wherein the forward cutting edge of each side segment extends laterally outward from an inner portion to an outer portion, and wherein the chamfered edge of the chamfered corner portion of each side segment extends both axially rearward and laterally outward from the outer portion of the respective forward cutting edge.

\* \* \* \* \*